US011550467B2

(12) United States Patent
Yanagihara et al.

(10) Patent No.: US 11,550,467 B2
(45) Date of Patent: Jan. 10, 2023

(54) DEVICE, METHOD, AND GRAPHICAL USER INTERFACE FOR MANAGING DATA STORED ON A DEVICE

(71) Applicant: Apple Inc., Cupertino, CA (US)

(72) Inventors: Kazuhisa Yanagihara, Cupertino, CA (US); Frank de Jong, San Francisco, CA (US); Patrick Lee Coffman, San Francisco, CA (US); Robert Ulrich, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,124

(22) Filed: May 12, 2018

(65) Prior Publication Data

US 2018/0373409 A1  Dec. 27, 2018

Related U.S. Application Data

(60) Provisional application No. 62/506,735, filed on May 16, 2017.

(51) Int. Cl.
*G06F 3/0488* (2022.01)
*G06F 3/0484* (2022.01)
(Continued)

(52) U.S. Cl.
CPC .......... *G06F 3/0488* (2013.01); *G06F 3/0482* (2013.01); *G06F 3/04842* (2013.01);
(Continued)

(58) Field of Classification Search
CPC ... H04L 43/045; H04L 67/36; G06F 3/04812; G06F 3/0488; G06F 8/61; G06F 3/04842;
(Continued)

(56) References Cited

U.S. PATENT DOCUMENTS 6,483,524 B1\* 11/2002 Petchenkine ......... G06F 3/1205
715/763
2014/0237402 A1\* 8/2014 Pang .................... G06F 3/04817
715/765

(Continued)

OTHER PUBLICATIONS

Melissa RioFrio, "Windows 10 reinstallation tip: How to reset your PC and keep your files", PC World, Jun. 28, 2016, pp. 1-4 (https://www.pcworld.com/article/3088710/windows-10-reinstallation-tip-how-to-reset-your-pc-and-keep-your-files.html).\*

(Continued)

*Primary Examiner* — Jennifer N Welch
*Assistant Examiner* — Parmanand D Patel
(74) *Attorney, Agent, or Firm* — Fernando & Partners, LLP

(57) ABSTRACT

A method includes, while an application is installed on a device and a representation of the application has a designated location in a respective portion of an application launching user interface, detecting an application-demotion request to delete the application from the device without deleting associated data for the application. In response to detecting the application-demotion request, deleting the application from the device without deleting the associated data for the application. After deleting the application from the device, detecting a request to display the respective portion of the application launching user interface and, in response to detecting the request to display the respective portion of the application launching user interface, displaying the respective portion of the application launching user (Continued)

interface, including displaying the representation of the application in the designated location in the respective portion of the application launching user interface.

22 Claims, 57 Drawing Sheets

(51) Int. Cl.
*G06F 3/0482* (2013.01)
*G06F 9/451* (2018.01)
*G06F 8/61* (2018.01)
*G06F 3/04842* (2022.01)
*H04M 1/72403* (2021.01)
*H04M 1/72406* (2021.01)
*H04M 1/72469* (2021.01)

(52) U.S. Cl.
CPC .................. *G06F 8/61* (2013.01); *G06F 8/62* (2013.01); *G06F 9/451* (2018.02); *H04M 1/72403* (2021.01); *H04M 1/72406* (2021.01); *H04M 1/72469* (2021.01)

(58) Field of Classification Search
CPC .......... G06F 3/0482; G06F 8/62; G06F 9/451; H04M 1/72522; H04M 1/72583; H04M 1/72525; H04M 1/72403; H04M 1/72406; H04M 1/72469
See application file for complete search history.

(56) References Cited

U.S. PATENT DOCUMENTS

| | | | | |
|---|---|---|---|---|
| 2015/0370428 | A1* | 12/2015 | Chan | G06F 16/27 715/739 |
| 2016/0098260 | A1* | 4/2016 | Bodor | G06F 3/0482 717/178 |
| 2018/0018158 | A1* | 1/2018 | Kalke | G06F 8/65 |
| 2019/0095385 | A1* | 3/2019 | Yu | G06F 16/906 |

OTHER PUBLICATIONS

"Is it possible to delete a game but keep the saves?", Jan. 31, 2017, Reddit, pp. 1-3 (Year: 2017).*

* cited by examiner

600

> Displaying, on the display, the storage management user interface including the second storage management affordance and a third storage management affordance that is associated with a third storage management operation that is different from the first storage management operation and the second storage management operation — 618
>
> > The first storage management operation and the second storage management operation are selected for inclusion in the storage management user interface based on a set of one or more rules prioritizing a plurality of storage management operations — 620
> >
> > (B)
> >
> > > The set of one or more rules includes a rule that prioritizes the plurality of storage management operations based on respective amounts of storage of the device freed by different storage management operations in the plurality of storage management operations — 632
> > >
> > > The set of one or more rules includes a rule that prioritizes the plurality of storage management operations based on respective timeframes in which storage of the device is freed by the different storage management operations in the plurality of storage management operations — 634
> > >
> > > The set of one or more rules includes a rule that prioritizes the plurality of storage management operations based on respective data loss of the different storage management operations in the plurality of storage management operations — 636

| At a device with one or more processors, a display, and one or more input devices: | |
|---|---|
| While an application is installed on the device and a representation of the application has a designated location in a respective portion of an application launching user interface, detecting, via the one or more input devices, an application-demotion request to delete the application from the device without deleting the associated data for the application | 702 |
|     Detecting, via the one or more input devices, selection of an application-demotion affordance associated with application | 704 |
|     Detecting, via the one or more input devices, selection of an option to enable automatic demotion of applications | 706 |
|         The automatic demotion of application is based on one or more of an amount of free storage of the device, a size of an application, and a time of last-use of an application | 708 |
|             The time of last-use is based on use of an extension of the application | 710 |

Deleting the application from the device without deleting the associated data for the application — 712

Detecting a request to display the respective portion of the application launching user interface — 714

DEVICE, METHOD, AND GRAPHICAL USER INTERFACE FOR MANAGING DATA STORED ON A DEVICE

RELATED APPLICATION

This application claims priority to U.S. Provisional Patent Application No. 62/506,735, filed on May 16, 2017, entitled "Device, Method, and Graphical User Interface for Managing Data Stored on a Device," the entire contents of which are incorporated herein by reference.

TECHNICAL FIELD

The present disclosure relates generally to electronic devices with touch-sensitive surfaces, including but not limited to electronic devices with touch-sensitive surfaces that manage data stored on a device.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display. Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

Some devices present user interfaces that can be manipulated to manage data stored on the device (e.g., within a non-transitory memory of the device), such as deleting data from the device, compressing data on the device, or organizing data on the device. But methods for performing these manipulations are cumbersome and inefficient. For example, these methods take longer than necessary, thereby wasting energy, a consideration that is particularly important in battery-operated devices. In addition, these methods manage the data inefficiently, thereby wasting storage space on the device, a consideration that is particularly important for portable devices with limited storage space.

SUMMARY

Accordingly, there is a need for electronic devices with faster, more efficient methods and interfaces for managing data stored on a device. Such methods and interfaces optionally complement or replace conventional methods for managing data stored on a device. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, a display, and one or more input devices. The method includes detecting, via the one or more input devices, a storage management input indicative of a request to manage data stored on the device. In response to detecting the storage management input, the method includes displaying, on the display, a storage management user interface including a first storage management affordance that is associated with a first storage management operation and a second storage management affordance that is associated with a second storage management operation that is different from the first storage management operation. While displaying the storage management user interface, the method includes detecting, via the one or more input devices, a selection input selecting the first storage management affordance. In response to detecting the selection input, the method includes initiating a process for performing the first storage management operation. After initiating the process for performing the first storage management operation, the method includes displaying, on the display, the storage management user interface including the second storage management affordance and a third storage management affordance that is associated with a third storage management operation that is different from the first storage management operation and the second storage management operation.

In accordance with some embodiments, a method is performed at a device with one or more processors, a display, and one or more input devices. The method includes, while an application is installed on the device and a representation of the application has a designated location in a respective portion of an application launching user interface, detecting, via the one or more input devices, an application-demotion request to delete the application from the device without deleting the associated data for the application. In response to detecting the application-demotion request, the method includes deleting the application from the device without deleting the associated data for the application. After deleting the application from the device, the method includes detecting a request to display the respective portion of the application launching user interface. In response to detecting the request to display the respective portion of the application launching user interface, the method includes displaying, on the display, the respective portion of the application launching user interface, including displaying the representation of the application in the designated location in the respective portion of the application launching user interface.

In accordance with some embodiments, an electronic device includes one or more processors, a display, and one or more input devices. The one or more processors are configured to detect, via the one or more input devices, a storage management input indicative of a request to manage data stored on the device. In response to detecting the storage management input, the one or more processors are configured to display, on the display, a storage management user interface including a first storage management affordance that is associated with a first storage management operation and a second storage management affordance that is associated with a second storage management operation that is different from the first storage management operation. While displaying the storage management user interface, the one or more processors are configured to detect, via the one or more input devices, a selection input selecting the first storage management affordance. In response to detecting the selection input, the one or more processors are configured to initiate a process for performing the first storage management operation. After initiating the process for performing the first storage management operation, the one or more processors are configured to display, on the display, the storage management user interface including the second storage management affordance and a third storage management affordance that is associated with a third storage management operation that is different from the first storage management operation and the second storage management operation.

In accordance with some embodiments, an electronic device includes one or more processors, a display, and one or more input devices. The one or more processors are configured to, while an application is installed on the device and a representation of the application has a designated location in a respective portion of an application launching user interface, detect, via the one or more input devices, an application-demotion request to delete the application from the device without deleting the associated data for the application. In response to detecting the application-demotion request, the one or more processors are configured to delete the application from the device without deleting the associated data for the application. After deleting the application from the device, the one or more processors are configured to detect a request to display the respective portion of the application launching user interface. In response to detecting the request to display the respective portion of the application launching user interface, the one or more processors are configured to display, on the display, the respective portion of the application launching user interface, including displaying the representation of the application in the designated location in the respective portion of the application launching user interface.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays and one or more input devices are provided with faster, more efficient methods and interfaces for managing data stored on a device, thereby increasing the effectiveness, efficiency, and user satisfaction with such devices. Such methods and interfaces may complement or replace conventional methods for managing data stored on a device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flow diagrams illustrating a method of managing data stored on a device in accordance with some embodiments.

FIGS. 7A-7B are flow diagrams illustrating a method of demoting an application in accordance with some embodiments.

DESCRIPTION OF EMBODIMENTS

Many electronic devices have a limited available storage capacity. For example, in various implementations, a portable electronic device has an internal hard drive with a limited available stored capacity. Because the device has a limited available storage capacity, a user may desire to delete (or compress) data stored on the device in order to store other data on the device. Accordingly, in embodiments described below, a storage management user interface is presented to allow a user to efficiently manage storage at the storage location.

Figure 2:
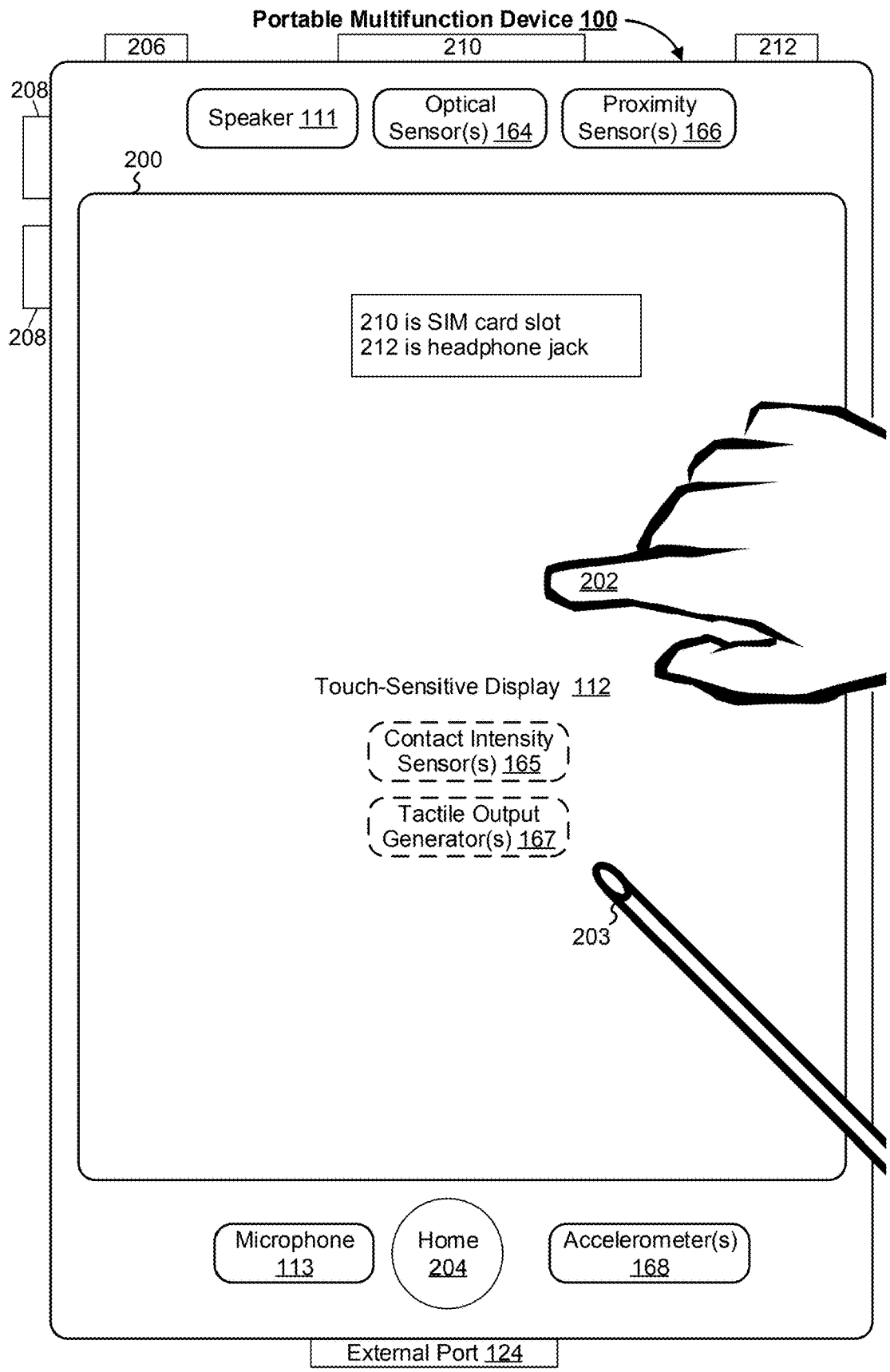
FIG. 2 illustrates a portable multifunction device having a touch screen in accordance with some embodiments.
Figure 3:
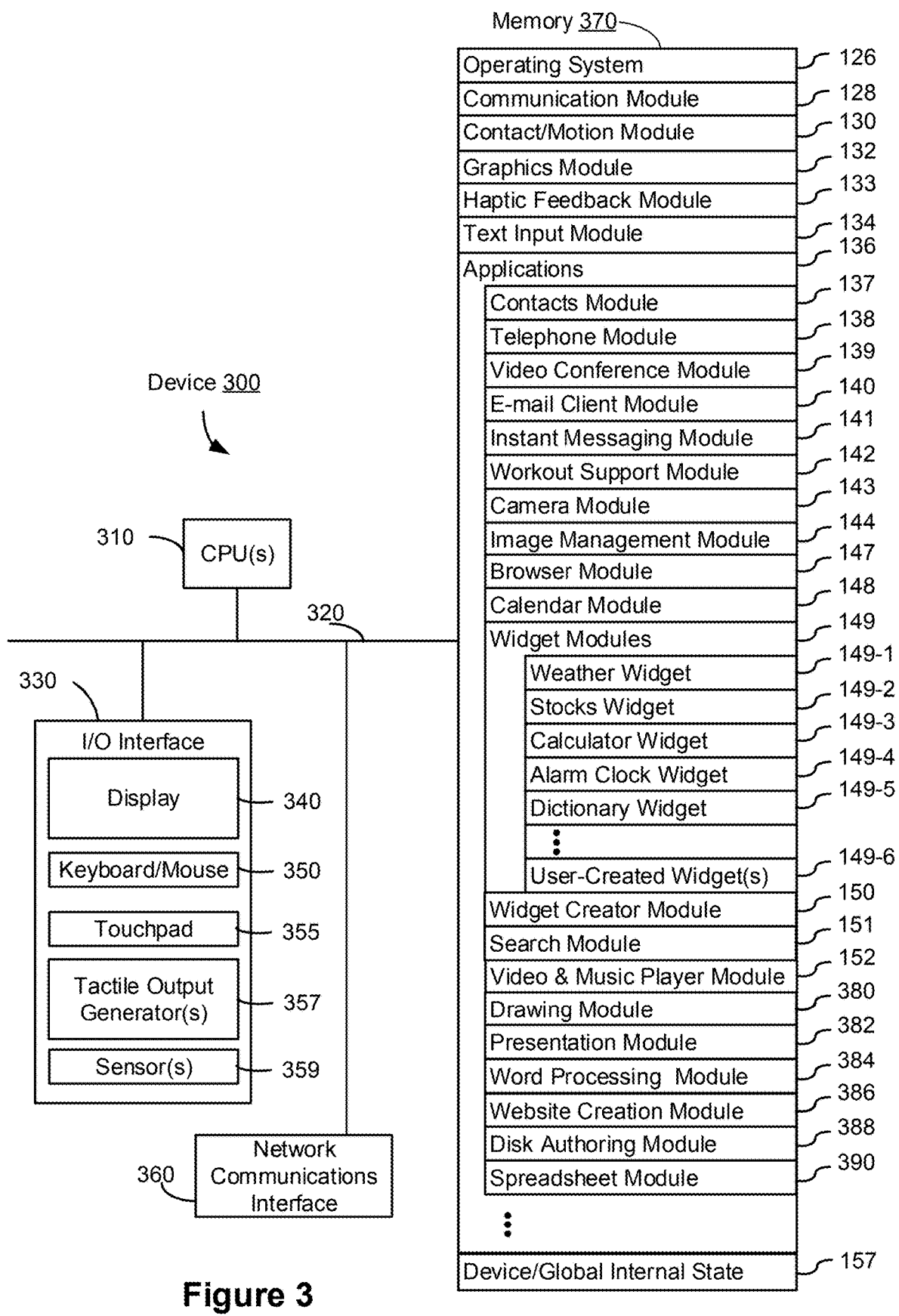
FIG. 3 is a block diagram of an example multifunction device with a display and a touch-sensitive surface in accordance with some embodiments.
Figure 4A:
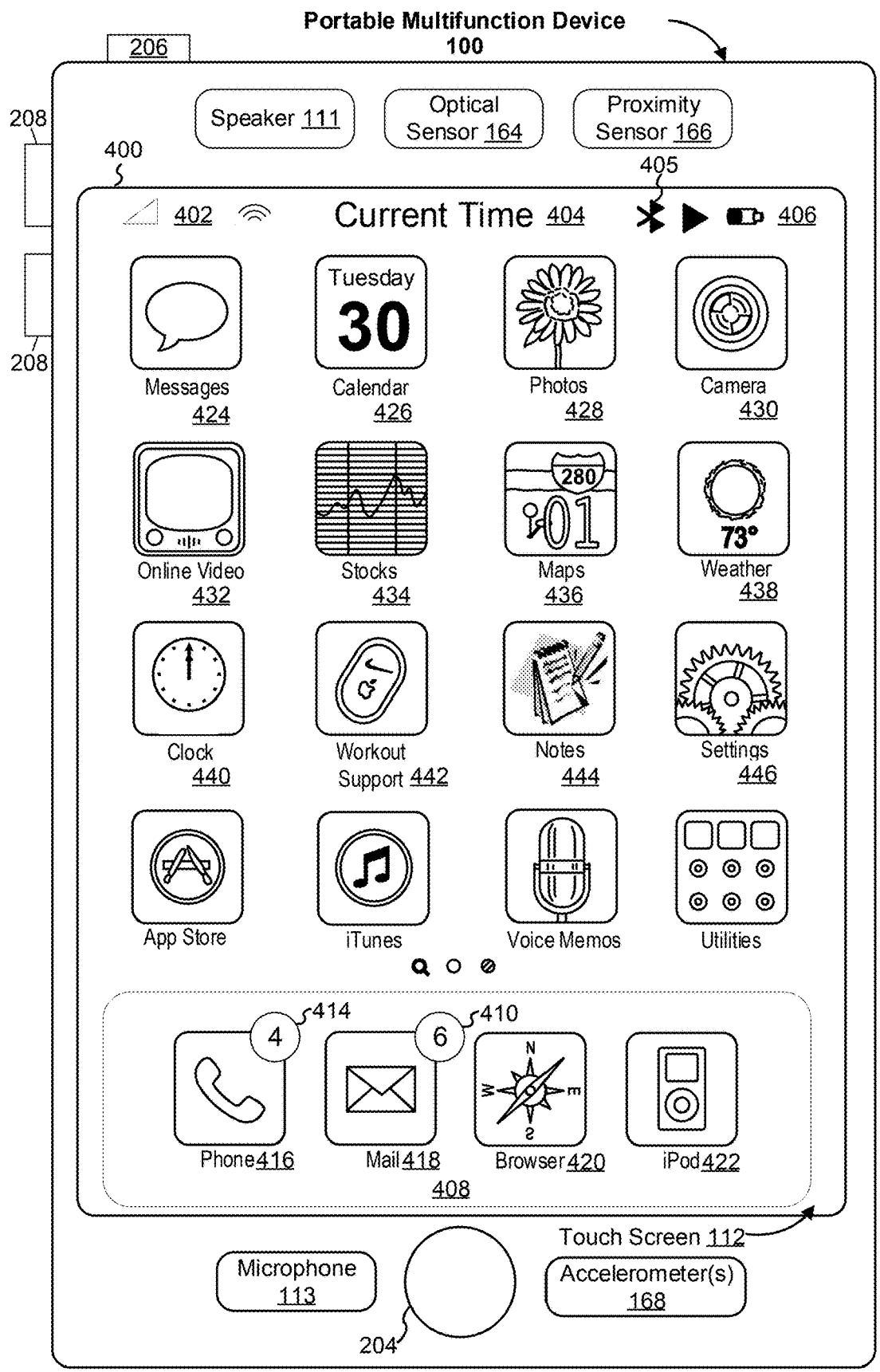
FIG. 4A illustrates an example user interface for a menu of applications on a portable multifunction device in accordance with some embodiments.
Figure 4B:
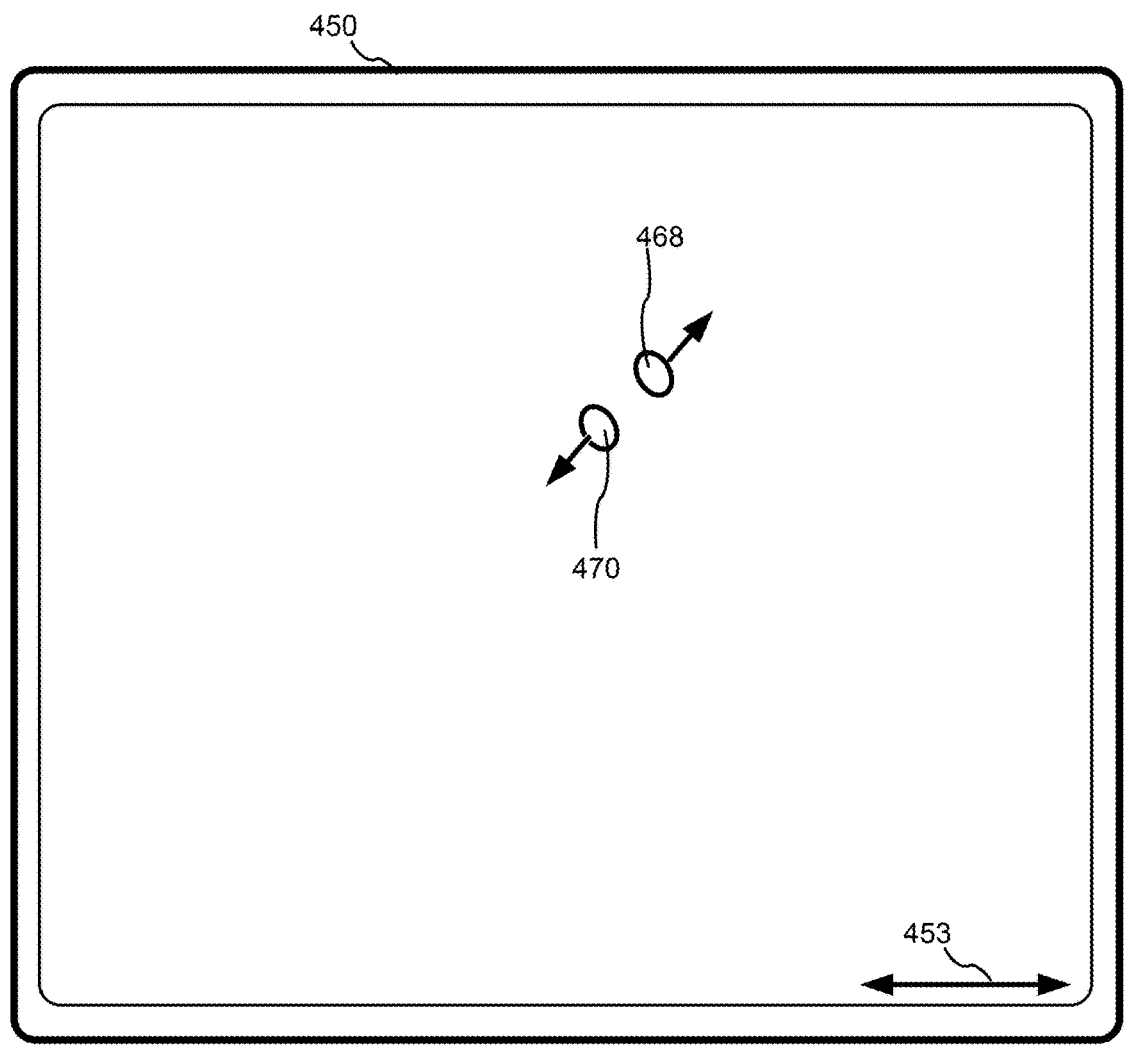
FIG. 4B illustrates an example user interface for a multifunction device with a touch-sensitive surface that is separate from the display in accordance with some embodiments.
Figure 4B:
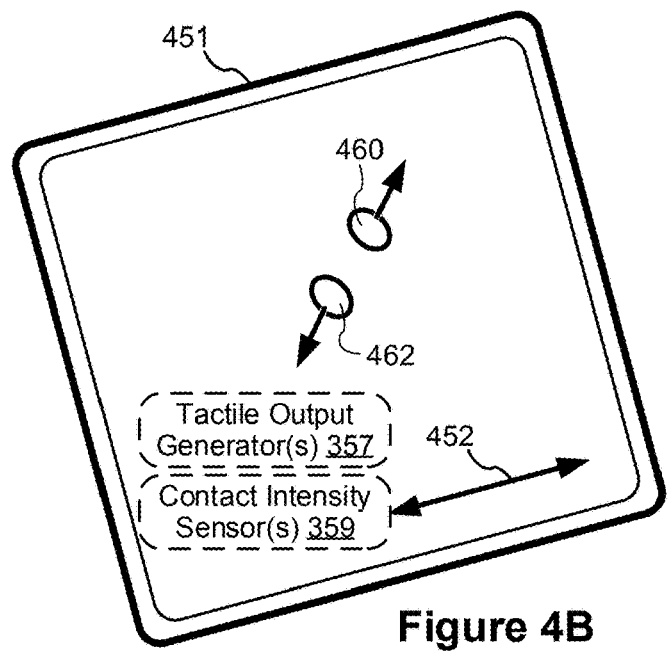
Figure 5A:
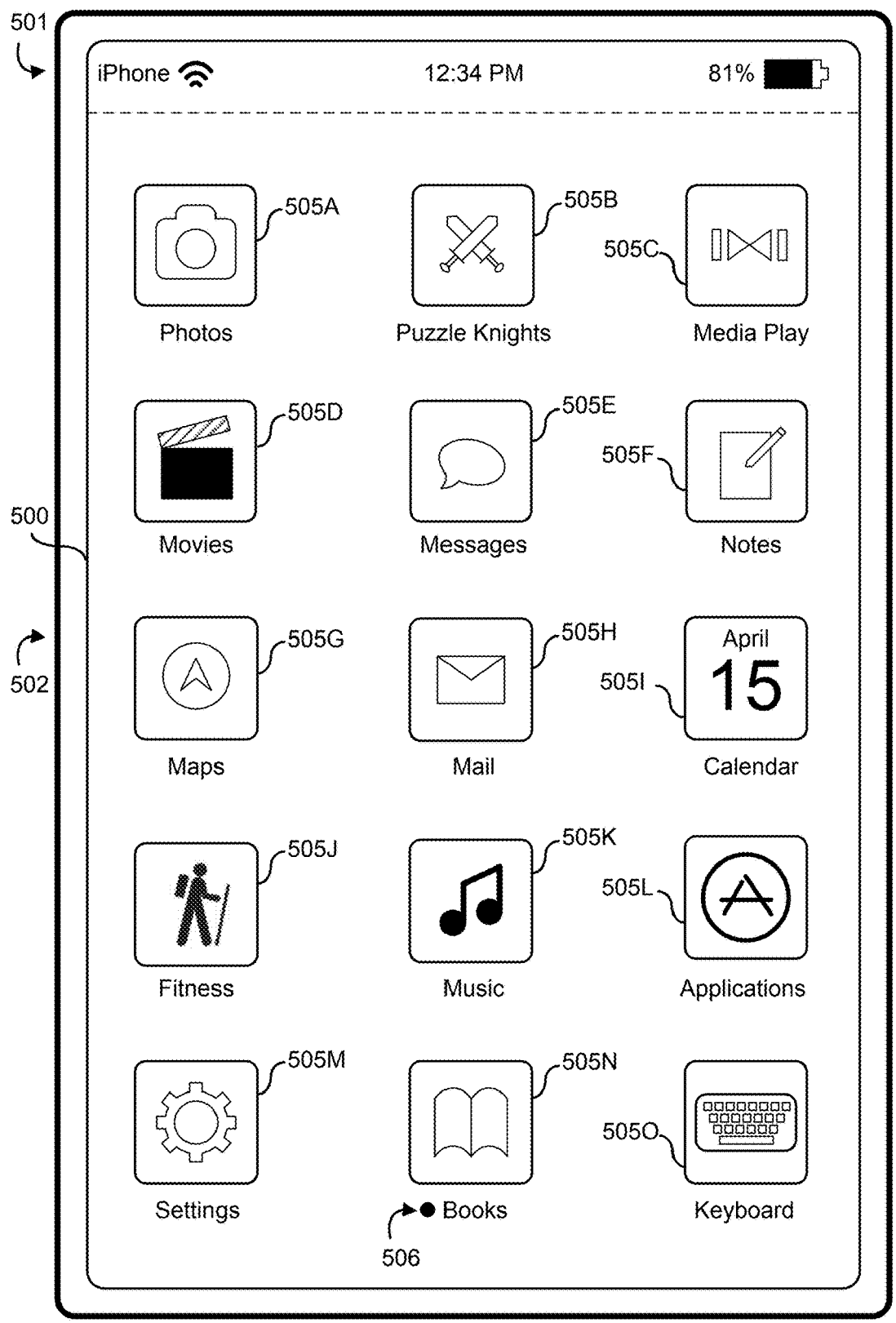
FIGS. 5A-5AQ illustrate example user interfaces for managing data stored on a device in accordance with some embodiments.
Figure 7B:
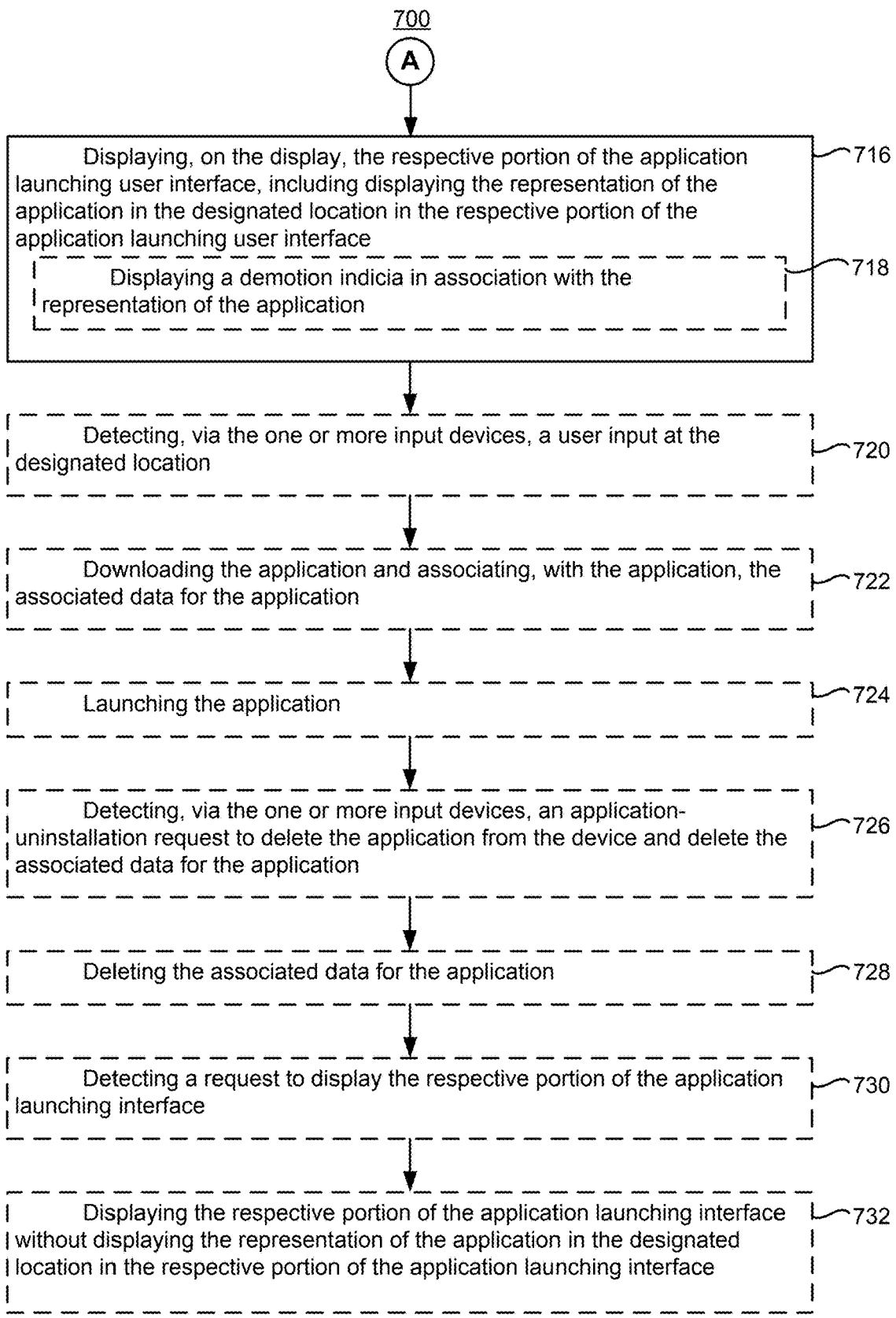

Below, a description of example devices illustrated in FIGS. 1A-1B, 2, and 3 is provided. FIGS. 4A-4B and 5A-5AQ illustrate example user interfaces for managing data stored on a device. FIGS. 6A-6F illustrate a flow diagram of a method of managing data stored on device. FIGS. 7A-7B illustrate a flow diagram of a method of demoting an application. The user interfaces in FIGS. 5A-5AQ are used to illustrate the processes in FIGS. 6A-6F and 7A-7B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
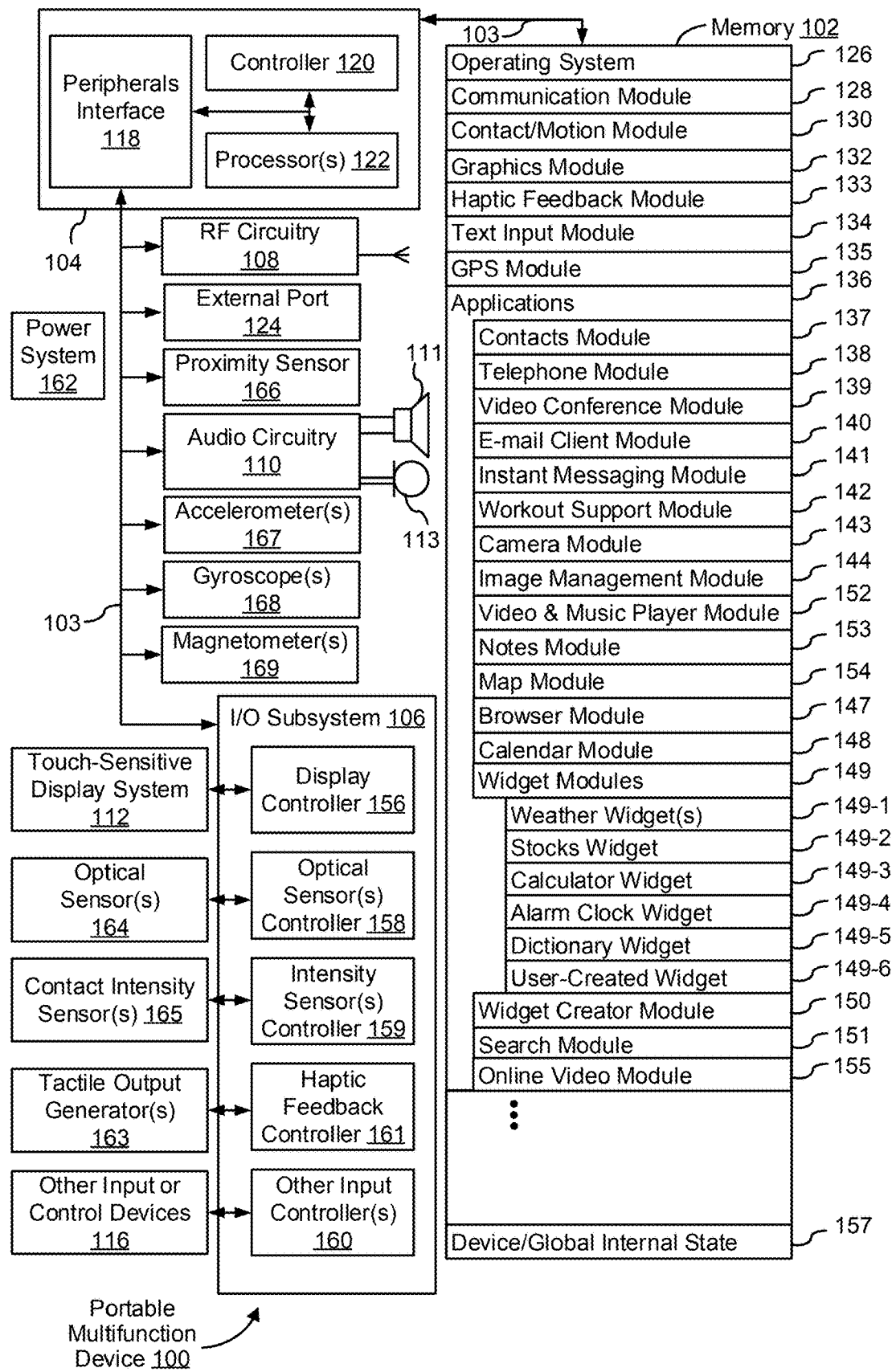
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or an "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conference module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail client 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, video conference module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
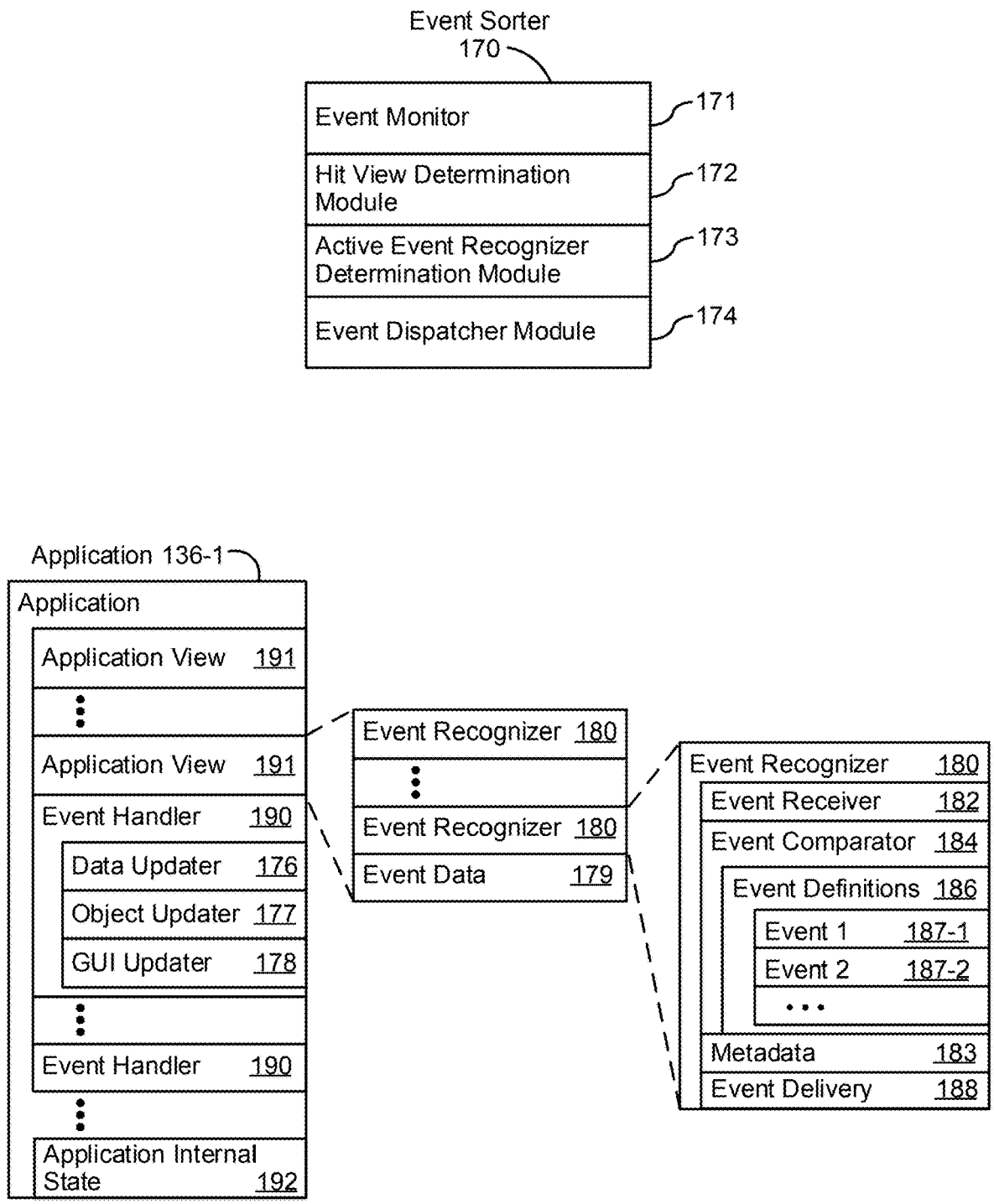
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2) includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser"; and

Icon 422 for video and music player module 152, also referred to as iPod (trademark of Apple Inc.) module 152, labeled "iPod"; and Icons for other applications, such as:
- Icon 424 for IM module 141, labeled "Text";
- Icon 426 for calendar module 148, labeled "Calendar";
- Icon 428 for image management module 144, labeled "Photos";
- Icon 430 for camera module 143, labeled "Camera";
- Icon 432 for online video module 155, labeled "Online Video";
- Icon 434 for stocks widget 149-2, labeled "Stocks";
- Icon 436 for map module 154, labeled "Map";
- Icon 438 for weather widget 149-1, labeled "Weather";
- Icon 440 for alarm clock widget 169-6, labeled "Clock";
- Icon 442 for workout support module 142, labeled "Workout Support";
- Icon 444 for notes module 153, labeled "Notes"; and
- Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device, such as portable multifunction device (PMD) 100 or device 300, with a display, a touch-sensitive surface, and one or more sensors to detect intensity of contacts with the touch-sensitive surface.

FIGS. 5A-5AQ illustrate example user interfaces for managing data stored on a device in accordance with some embodiments. The user interfaces in these figures are used to illustrate the processes described below, including the processes in FIGS. 6A-6F and FIGS. 7A-7B. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates an application launching user interface 502 as part of a user interface 500 displayed by a portable multifunctional device 100 (hereinafter "device 100"). The user interface 500 includes, in addition to the application launching user interface 502, a device bar 501 at the top of the display including an identifier of the device 100 (e.g., "iPhone"), a wireless connection indicator, a current time, and a battery indicator indicating a charge level of the device 100.

The user interface 500 includes, below the device bar 501, and spanning the rest of the display, an application launching user interface 502. The application launching user interface 502 includes a plurality of representations 505A-505O of applications installed on the device 100. Each representation 505A-505O has a designated location in a respective portion of the application launching user interface 502. As shown in FIG. 5A, the plurality of representations 505A-505O are arranged in a grid.

As shown in FIG. 5A, each representation 505A-505O includes an icon associated with the corresponding application and text describing the application (e.g., a name or function of the application). One of the representations 505N includes a recency indicator 506 displayed next to the text. The recency indicator 506 indicates that the application (e.g., "Books") has been installed or updated without having been subsequently launched.

As an application launching user interface 502, in response to detecting a user input at the designated location of the representation of a particular application, the device 100 launches the particular application.

Although FIG. 5A illustrates an application launching user interface 502 in the form of a home screen, in various implementations, the application launching user interface 502 is a taskbar or a file manager. Further, although FIG. 5A illustrates only a single page of a home screen, in various implementations, the application launching user interface 502 includes multiple pages.

Figure 5B:
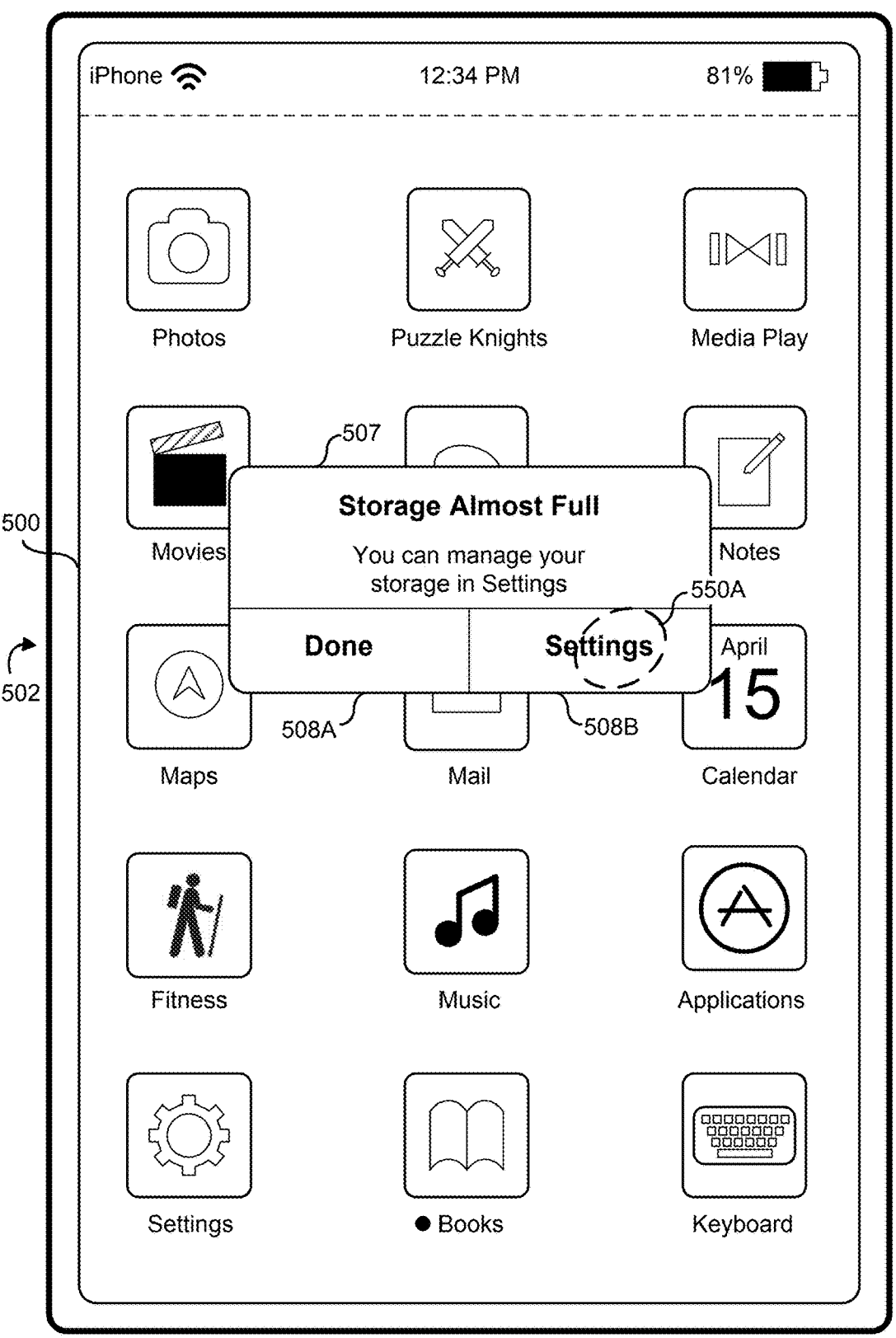

FIG. 5B illustrates the user interface 500 of FIG. 5A with a low free storage notification window 507 displayed over the application launching user interface 502. In various implementations, such a low free storage notification window 507 is displayed in response to a determination that a low free storage condition exists. In various implementations, the device 100 determines that a low free storage condition exists when an amount of free storage of the device 100 is below a threshold. In various implementations, the threshold is an amount of free storage needed to complete an operation, such as downloading a file or application or storing a photo.

The low free storage notification window 507 indicates (via displayed text) a low free storage condition and includes a dismiss affordance 508A and a management affordance 508B. In response to a user input detected at the location of the dismiss affordance 508A, the low free storage notification window 507 ceases to be displayed. In response to a user input detected at the location of the management affordance 508B, a storage management user interface is displayed. FIG. 5B illustrates a contact 550A detected at a location of the management affordance 508B.

Figure 5C:
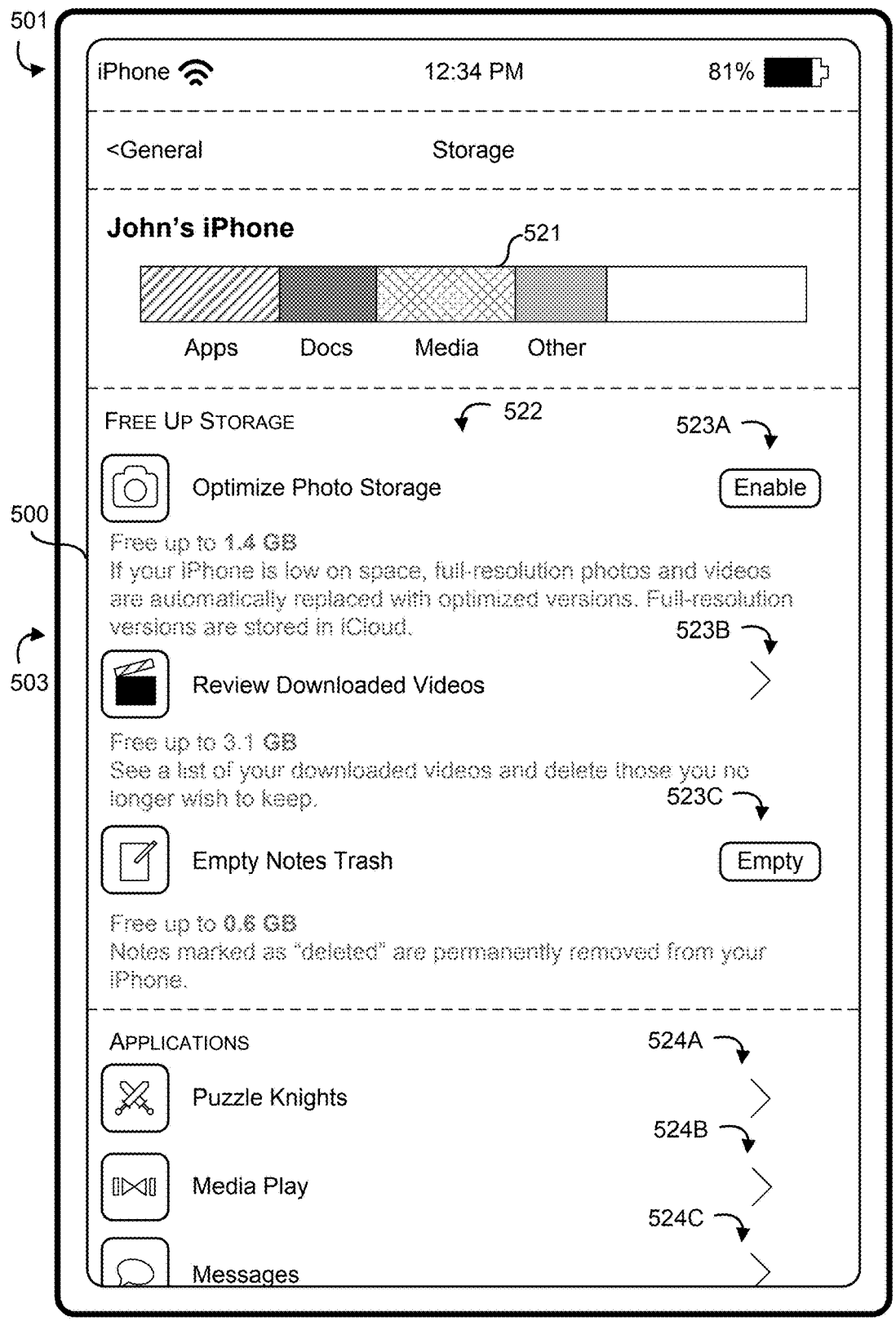

FIG. 5C illustrate the user interface 500 of FIG. 5B in response to detecting the contact 550A at the location of the management affordance 508B. FIG. 5C illustrates a storage management user interface 503 (in a region of the of user interface 500 beneath the device bar 501).

The storage management user interface 503 includes a size bar 521 indicating respective amounts of storage of the device 100 used by a plurality of data types (e.g., applications, documents, media content, and other data) as well as an amount of free storage of the device. In various implementations, the respective amounts of storage of the device 100 used by the plurality of data types excludes purgeable data. Purgeable data includes data the device 100 can delete without further authorization by the user, such as data that is already stored in the cloud.

The storage management user interface 503 includes a plurality of recommendations 522. Each recommendation 522 is associated with a storage management operation and includes a description of the storage management operation and a storage management affordance 523A-523C for initiating a process for performing the storage management operation.

Due to the limited amount of space of the user interface 500, in various implementations, the device 100 selects a small number (e.g., 2 or 3) of storage management operations for inclusion as recommendations in the storage management user interface 503 based on a set of one or more rules prioritizing a plurality of storage management operations.

In various implementations, the plurality of storage management operations includes one or more storage management operations that immediately free at least a predetermined amount of storage on the device 100. In various implementations, such storage management operations includes emptying trash, marking content that can be reacquired from other sources (such as email messages, photos, music, cached video) for deletion. For example, in FIG. 5C, one of the storage management affordances 523C initiates a process for permanently deleting notes marked for deletion. In various implementations, one or more storage management operations that immediately free at least a predetermined amount of storage on the device include one or more of permanently deleting items that have been marked for deletion (such as an empty trash operation), deleting one or more applications (such as an operation to delete applications that can be redownloaded from an application store), or presenting selectable options to delete respective data containers associated with a particular application (such as removing watched videos or offline maps).

In various implementations, the plurality of storage management operations includes one or more storage management operations that, once performed, will enable a reduction of data stored on the device over time. For example, in FIG. 5C, one of the storage management affordances 523A initiates a process for moving photographs to a cloud storage (while storing optimizes versions of the photos (e.g., compressed versions) on the device 100). In various implementations, the one or more storage management operations that, once performed, will enable a reduction of data stored on the device over time include storing data from the device at a remote storage location (such as moving photos or message attachments to a cloud storage) or an option to delete data stored for more than a threshold amount of time (such as deleting messages that are older than a threshold number of days).

As noted above, the device 100 selects storage management operations for inclusion as recommendations in the storage management user interface 503 based on a set of one or more rules prioritizing a plurality of storage management operations. In various implementations, the set of one or more rules includes a rule that prioritizes the plurality of storage management operations based on respective amounts of storage of the device 100 freed by the different storage management operations in the plurality of storage management operations. For example, in various implementations, the rule prioritizes storage management operations that free more storage higher than storage management operations that free less storage. Thus, in FIG. 5C, the storage management affordance 523C that initiates a process for permanently deleting notes marked for deletion (freeing 0.6 GB) is displayed, whereas a storage management affordance that initiates a process for permanently deleting photos marked for deletion (shown later in FIG. 5G and freeing 0.3 GB) is not displayed.

In various implementations, the set of one or more rules includes a rule that prioritizes the plurality of storage management operations based on respective timeframes in which storage of the device is freed by the plurality of storage management operations. For example, in various implementations, the rule prioritizes storage management operations that, operations that, once performed, will enable a reduction of data stored on the device 100 (and may only be selected by a user once) higher than storage management operations that free storage immediately (and may selected by a user periodically). Thus, in FIG. 5C, the storage management affordance 523A that initiates a process for moving photographs to a cloud storage is displayed, whereas a storage management affordance that initiates a process for permanently deleting photos marked for deletion (shown later in FIG. 5G) is not displayed. As another example, in various implementations, the rule prioritizes storage management operations that free storage immediately higher than storage management operations that, once performed, will enable reduction of data stored on the device 100.

In various implementations, the set of one or more rules includes a rule that prioritizes the plurality of storage management operations based on respective data loss of the plurality of storage management operations. For example, in various implementations, the rule prioritizes storage management operations that remove data that can be reacquired from another source at a later point in time higher than storage management operations that remove data that is not guaranteed to be available from another source at a later time. Thus, in FIG. 5C, the storage management affordance 523A that initiates a process for moving photographs to a cloud storage (an operation without data loss as the photographs can be retrieved from the cloud storage to the device 100) is displayed, whereas a storage management affordance that initiates a process for permanently deleting photos marked for deletion (shown later in FIG. 5G and an operation with data loss as the deleted photos cannot be recovered) is not displayed.

The storage management user interface 503 further includes a plurality of application affordances 524A-524C respectively associated with a plurality of applications. In various implementations, the application affordances 524A-524C are sorted according to a size of the application (including associated data for the application). Upon detecting selection of an application affordance 524A-524C, the device 100 displays an application management user interface for managing data stored on the device by the particular application as described in detail further below.

Figure 5D:
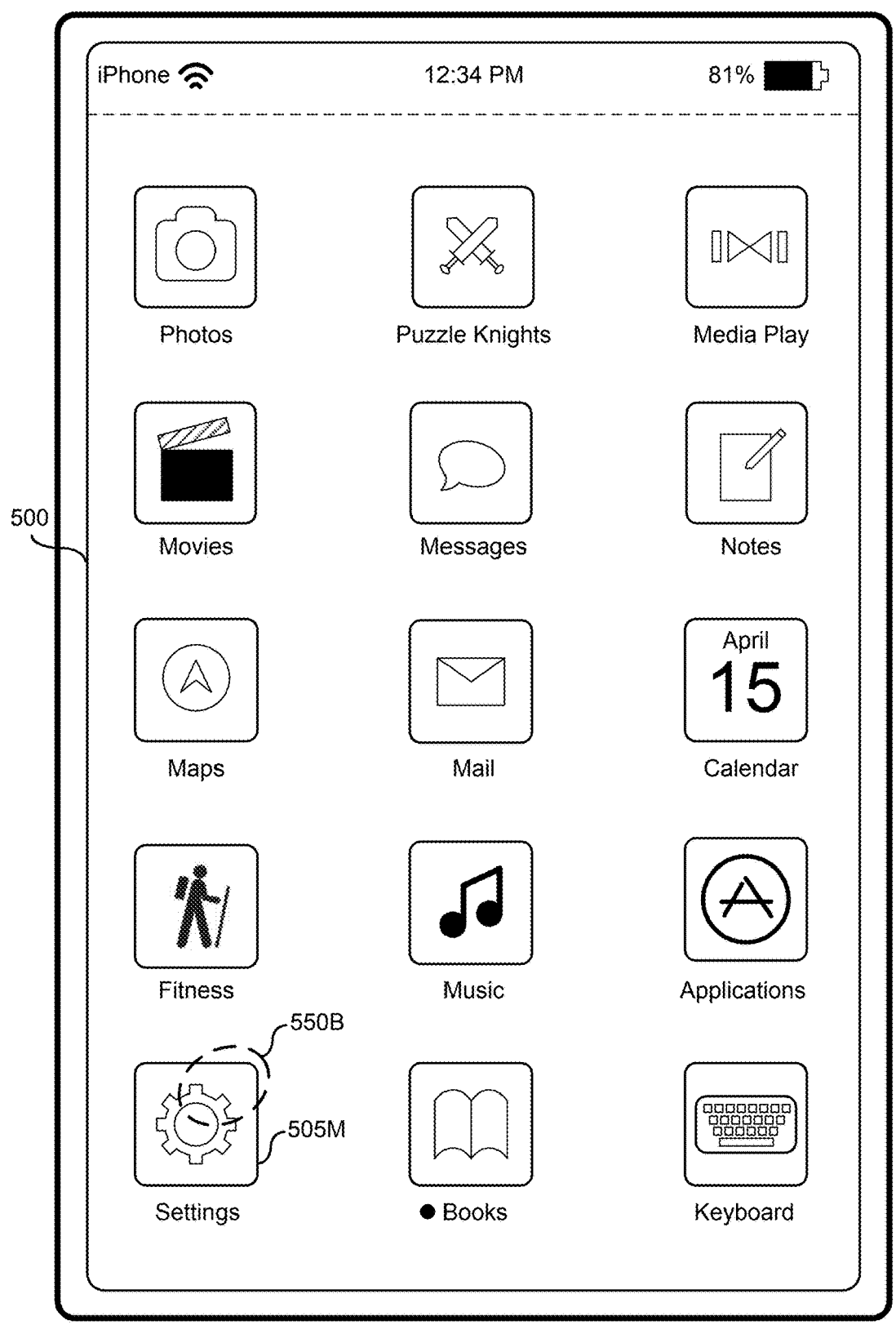
Figure 5E:
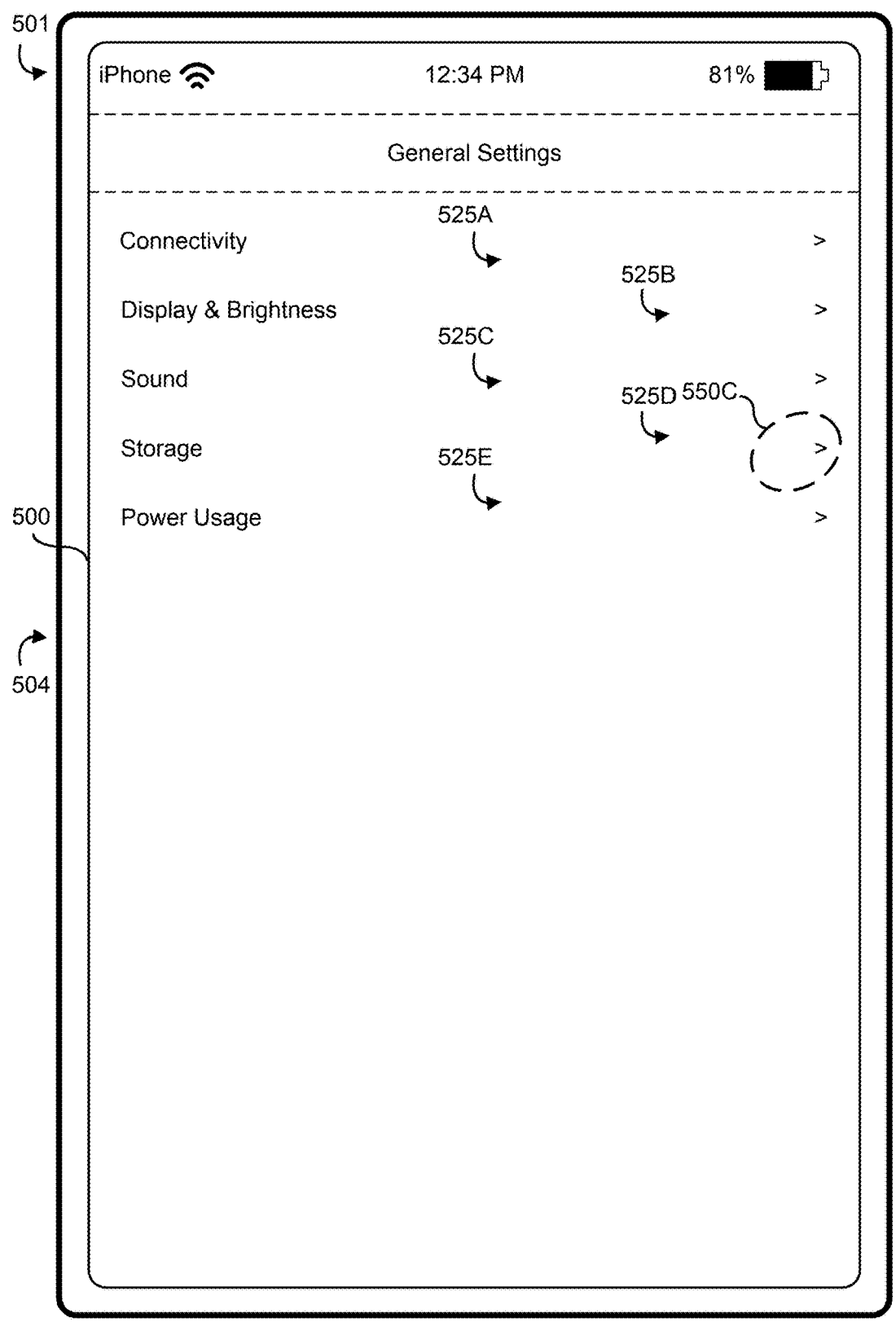

Whereas FIG. 5B illustrates one method of causing display of the storage management user interface 503, FIGS. 5D-5E illustrate another method of causing display of the storage management user interface 503. FIG. 5D illustrates the user interface 500 of FIG. 5A with a contact 550B detected at the designated location of the representation 505M of a settings application.

FIG. 5E illustrates the user interface 500 of FIG. 5D in response to detecting the contact 550B at the location of the representation 505M of a settings application. FIG. 5E illustrates a general settings user interface 504 (in a region of the of user interface 500 beneath the device bar 501).

The general settings user interface 504 includes a plurality of settings affordances 525A-525E including a connectivity management affordance 525A, a display management affordance 525B, a sound management affordance 525C, a storage management affordance 525D, and a power management affordance 525E. In various implementations, the general settings user interface 504 can include additional, fewer, or other management affordances. FIG. 5E illustrates a contact 550C detected at a location of the storage management affordance 525D.

Figure 5F:
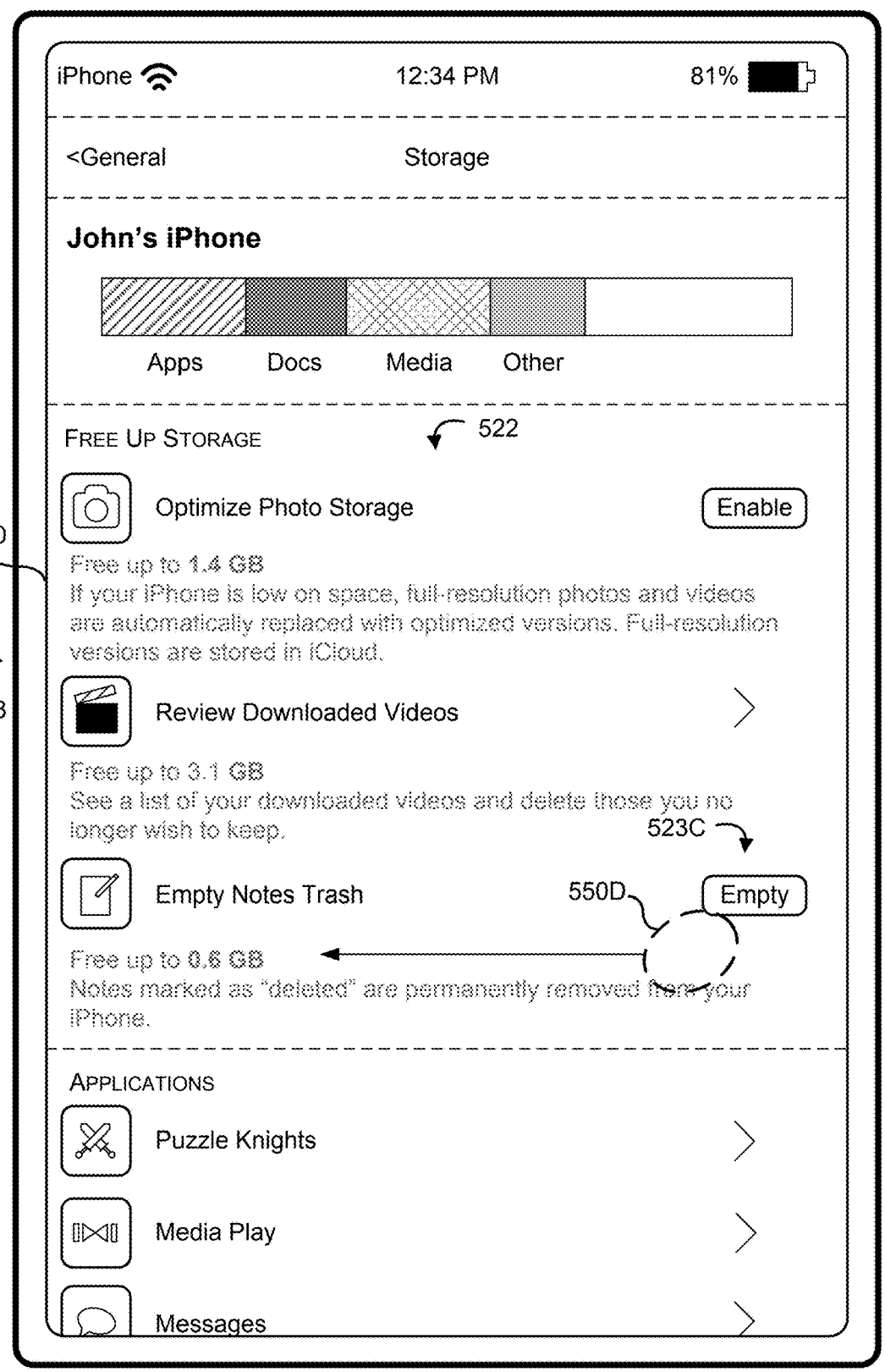

FIG. 5F illustrates the user interface 500 of FIG. 5E in response to detecting the contact 550C at the location of the storage management affordance 525D. The user interface 500 of FIG. 5F, identical to the user interface of FIG. 5C, includes the storage management user interface 503. FIG. 5F illustrates initiation of a swipe 550D detected at a location of one of the recommendations 522 corresponding to the storage management affordance 523C for initiating a process for permanently deleting notes marked for deletion.

Figure 5G:
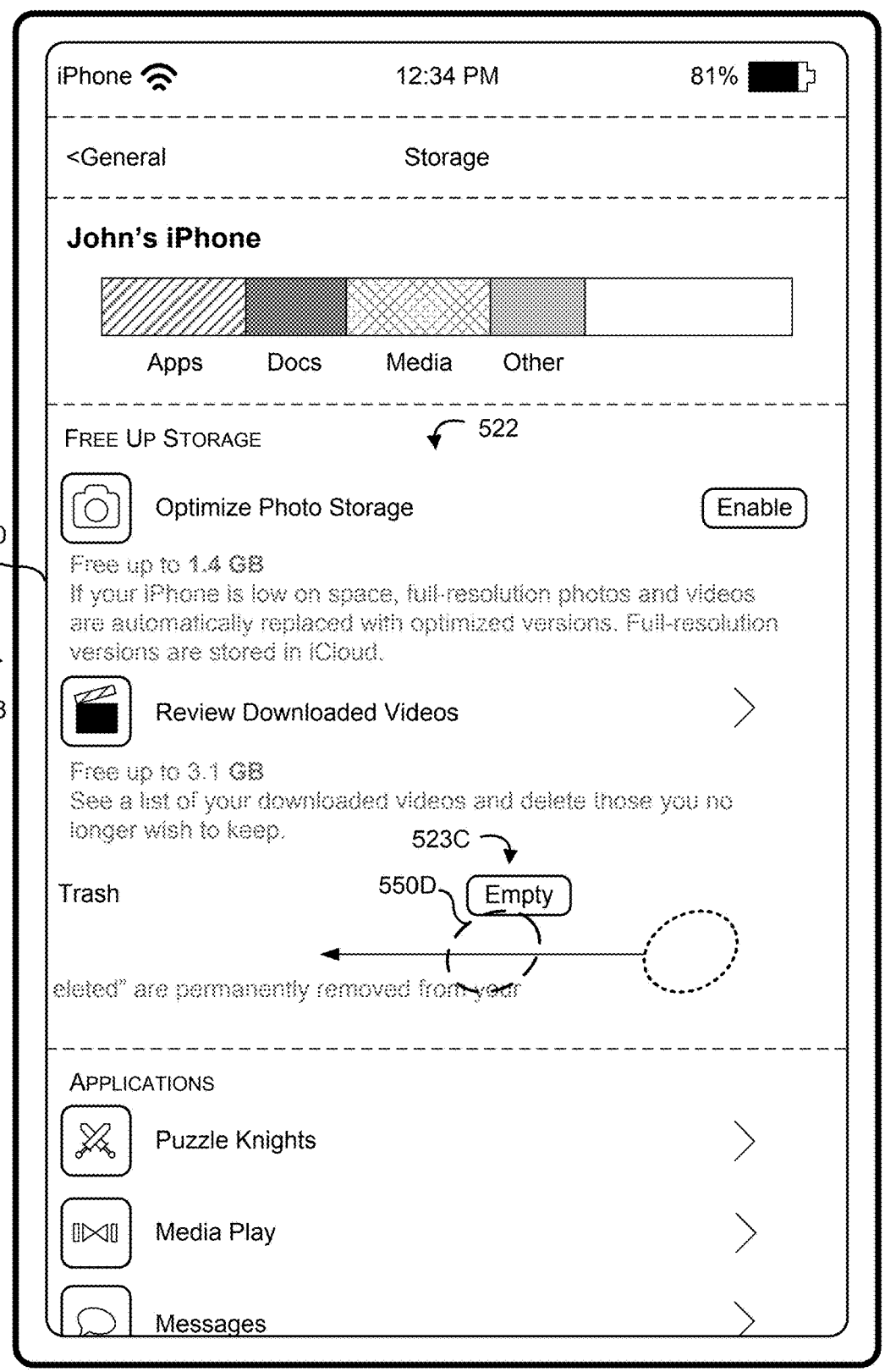

FIG. 5G illustrates the user interface 500 of FIG. 5F in response to detecting a first portion of the swipe 550D. In response to a first portion of the swipe 550D, the recommendation corresponding to the storage management affordance 523C is moved to indicate that completion of the swipe 550D will remove the recommendation.

Figure 5H:
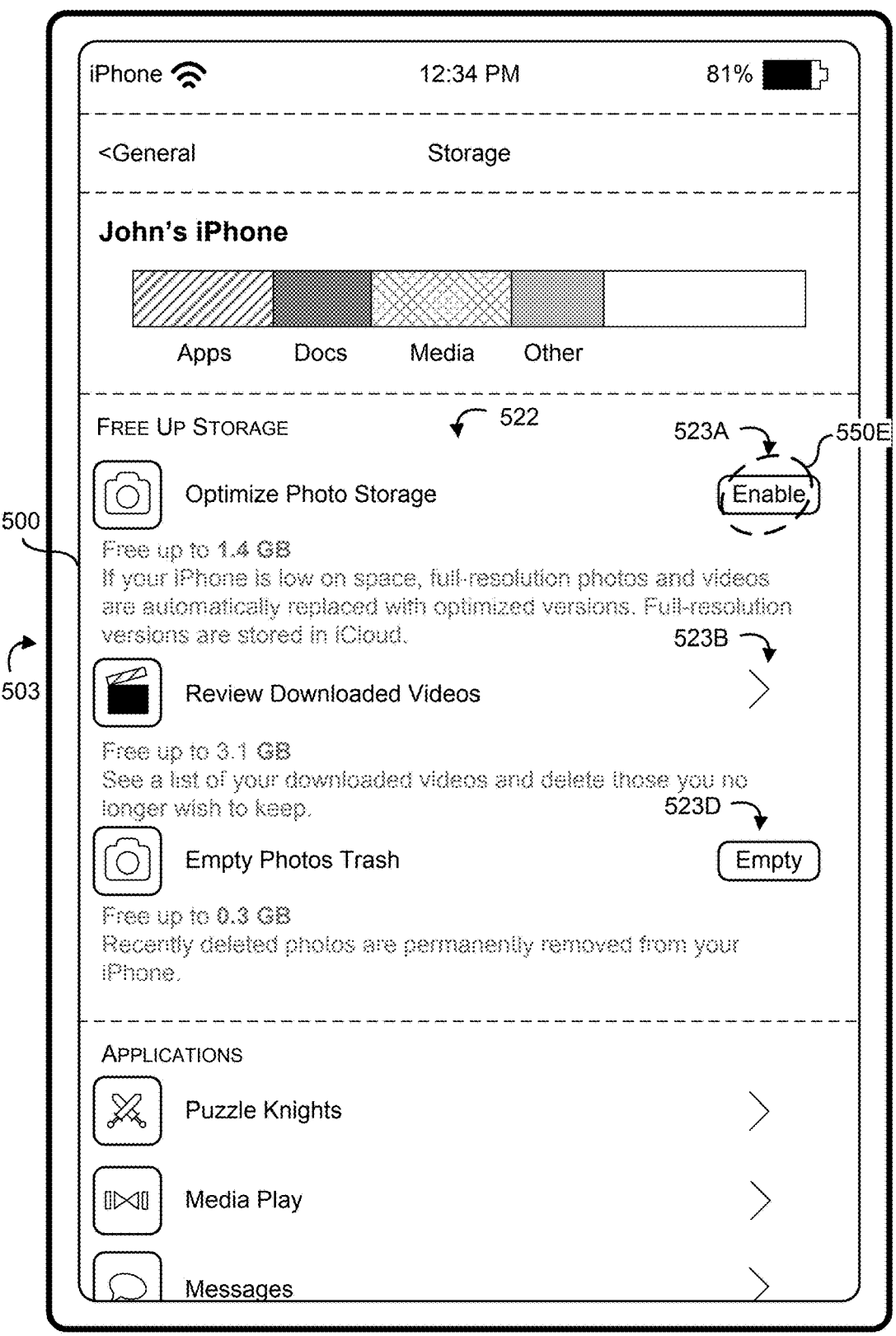

FIG. 5H illustrates the user interface 500 of FIG. 5G in response to detecting completion of the swipe 550D. In FIG. 5H, the recommendations 522 of the storage management user interface 503 have changed in that the storage management affordance 523C for initiating a process for permanently deleting notes marked for deletion is replaced with a storage management affordance 523D for initiating a process for permanently deleting photos marked for deletion.

Thus, in response to detecting an option-removal user input (e.g., the swipe 550D) indicative of a request to remove a particular storage management affordance (e.g., the storage management affordance 523C) of the storage management user interface 503, the storage management user interface 503 ceases to display the particular storage management affordance and displays, instead, a replacement storage management affordance (e.g., the storage management affordance 523D).

Although FIGS. 5F-5H illustrate removal of a recommendation using a swipe gesture, in various implementations, the option-removal user input indicative of a request to remove a particular storage management affordance is selection of a remove affordance displayed in association with the particular storage management affordance or another gesture.

FIG. 5H illustrates a contact 550E detected at the location of the storage management affordance 523A that initiates a process for moving photographs to a cloud storage.

Figure 5I:
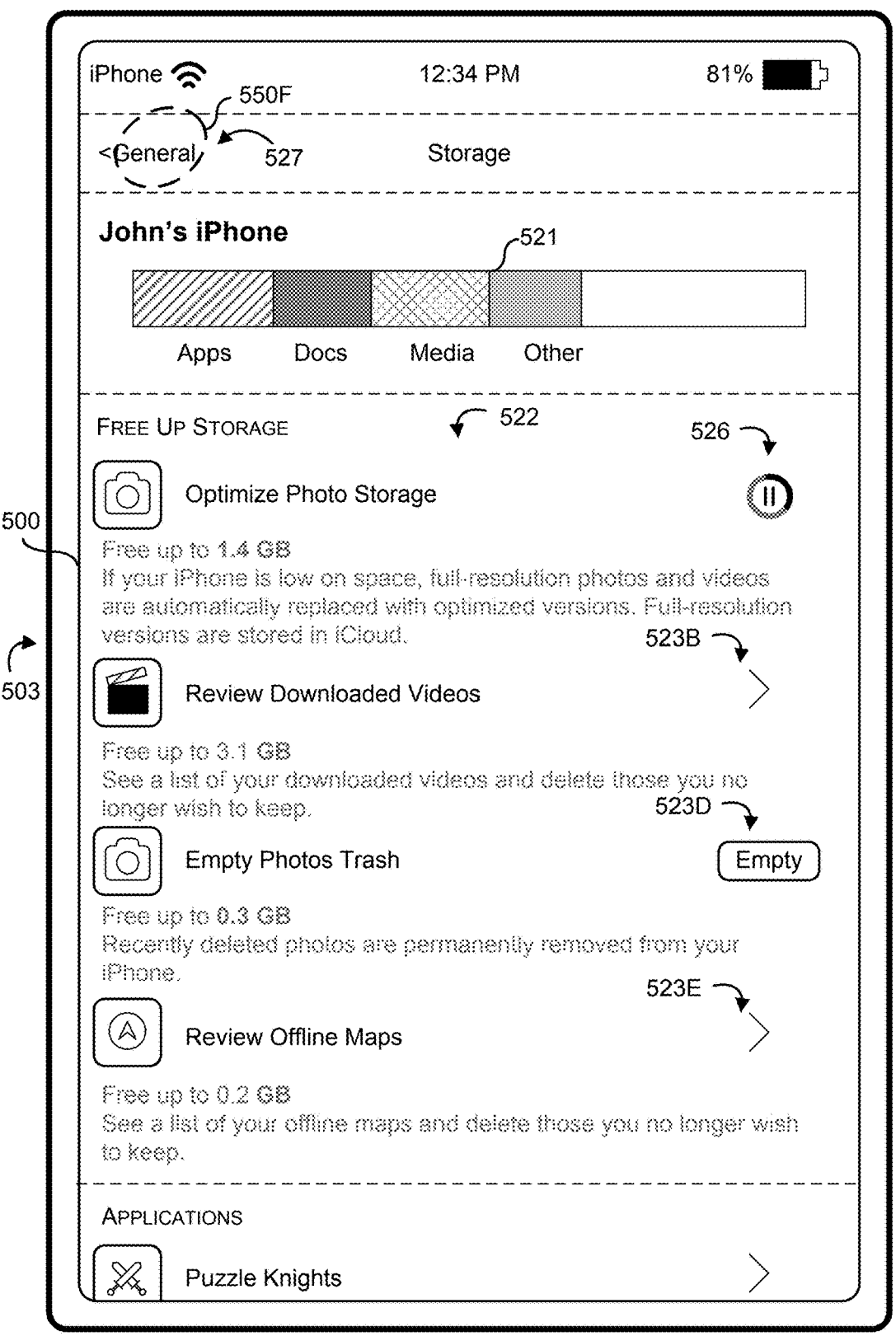

FIG. 5I illustrates the user interface 500 of FIG. 5G in response to detecting the contact 550E at the location of the storage management affordance 523A. In response to detecting the contact 550E, the device 100 initiates the process for moving photographs to a cloud storage. Further, in response to detecting the contact 550E, the storage management user interface 503 includes, in addition to the previously displayed storage management affordances 523B and 523D, an additional storage management affordance 523E that initiates a process for reviewing offline maps for deletion.

Further, in FIG. 5I, replacing the selected storage management affordance 523A is a progress indicator 526 indicative of a progress of the process for performing the selected storage management operation. Progression of the process is also indicated by the change in the size bar 521 indicating that less storage is being used for media content.

FIG. 5I illustrates a contact 550F at the location of a return affordance 527 of the storage management user interface 503.

Figure 5J:
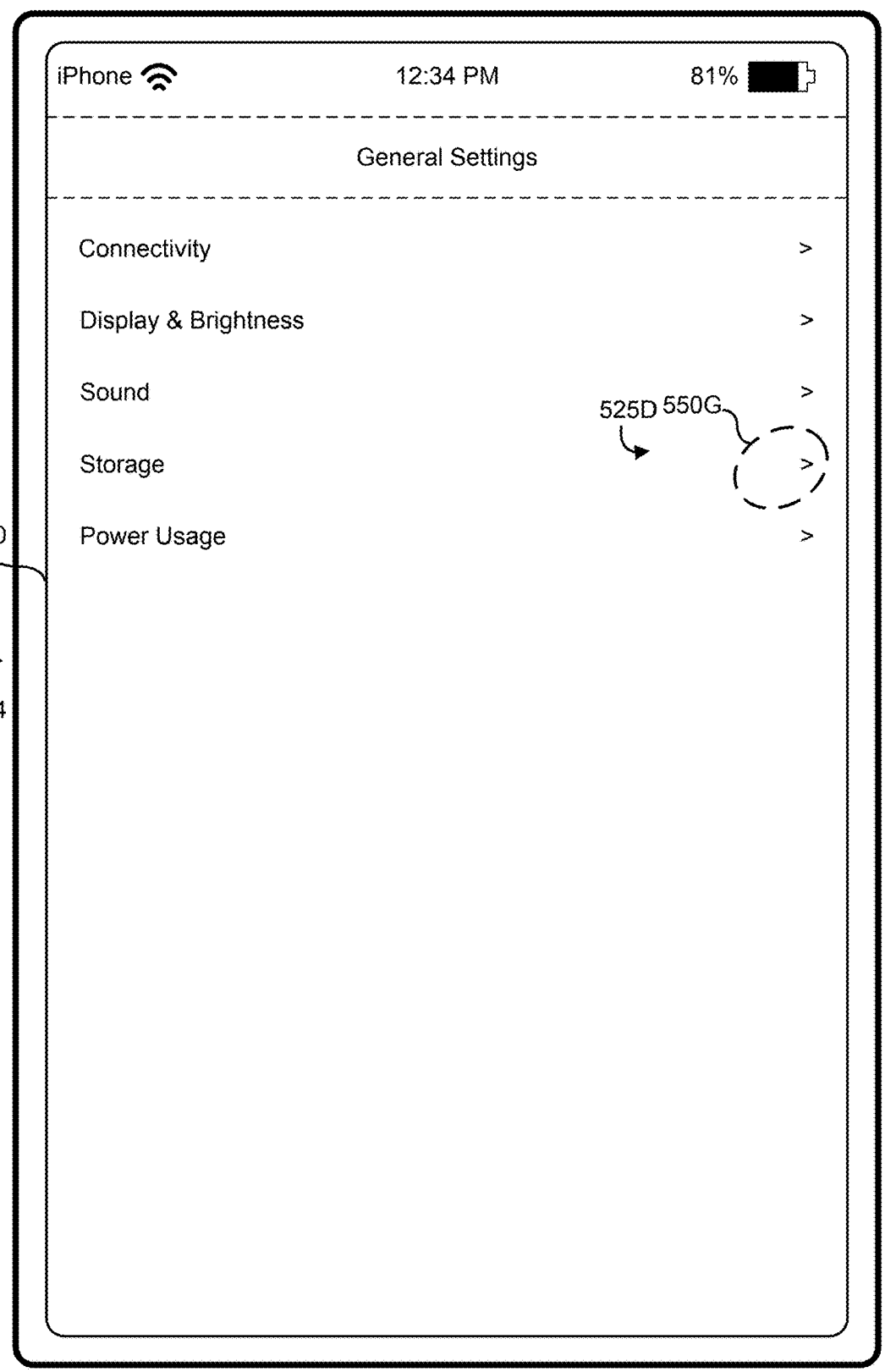

FIG. 5J illustrates the user interface 500 of FIG. 5I in response to detecting the contact 550F at the location of the return affordance 527. In FIG. 5J, the storage management user interface 503 is replaced with the general settings user interface 504. FIG. 5J illustrates a contact 550G at the location of the storage management affordance 525D of the general settings user interface 504.

Figure 5K:
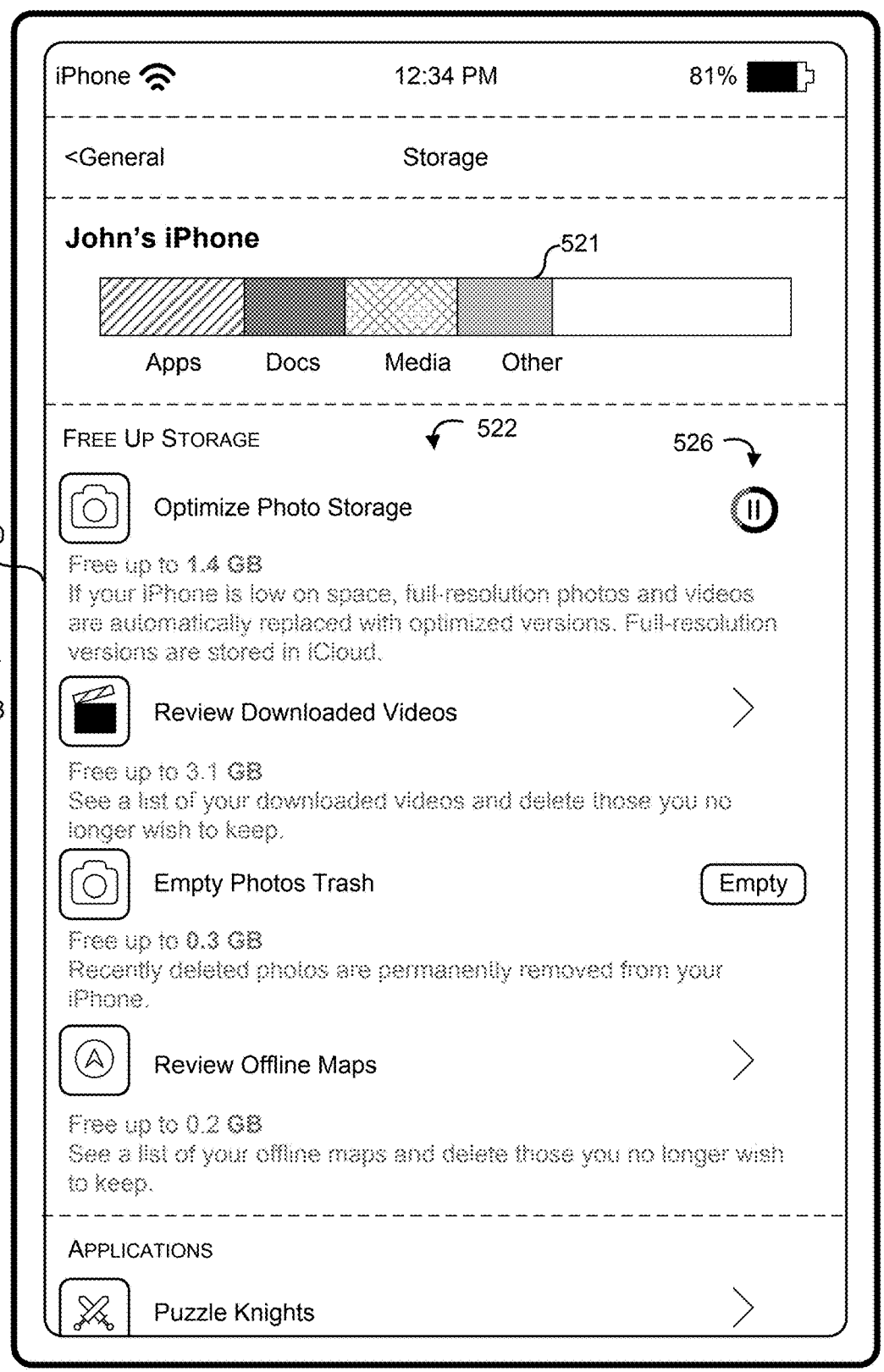

FIG. 5K illustrates the user interface 500 of FIG. 5I in response to detecting the contact 550G at the location of the storage management affordance 525D. In FIG. 5J, the general settings user interface 504 is replaced with the storage management user interface 503. In FIG. 5K, the progress indicator 526 indicates that additional progress has been made in the time elapsed by exiting to the general settings user interface 504 and returning to the storage management user interface 504 from the general settings user interface 503. Further, the size bar 521 is changed to indicate that even less storage is being used for media content. Accordingly, in some implementations, when a user exits the storage management user interface 503 and returns to the storage management user interface 503, in-progress storage management operations are shown in the recommendations 522. In various implementations, the representation of the in-progress storage management operation remains displayed in the storage management user interface when the user revisits the storage management interface until the in-progress storage-management operation has finished.

Thus, in some circumstances, after initiating the process for performing a storage management operation, the device 100 ceases to display the storage management user interface 503 and detects a user input indicative of a request to redisplay the storage management user interface 503. In response, the device displays the storage management user interface 503 including the progress indicator 526.

Figure 5L:
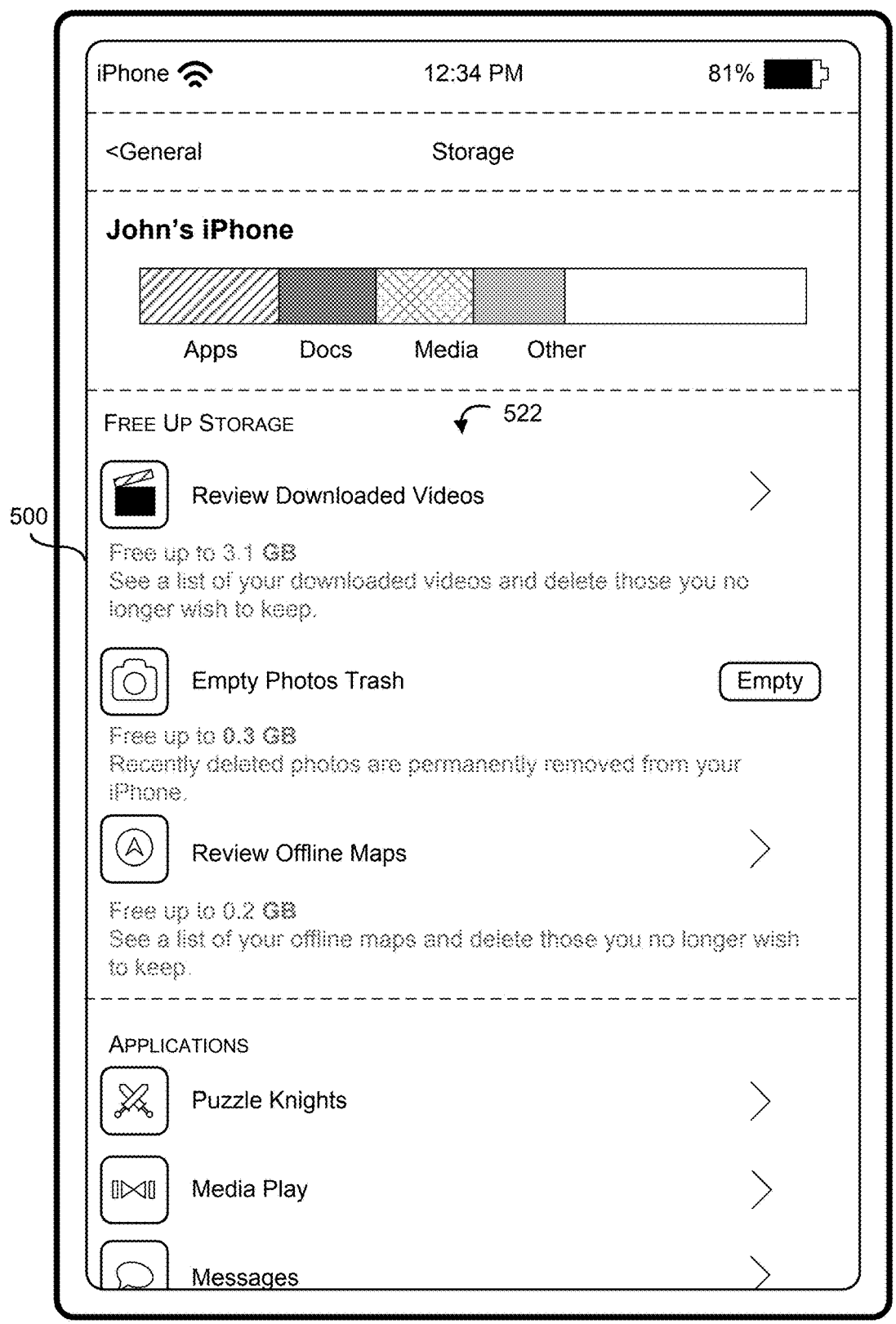

FIG. 5L illustrates the user interface 500 of FIG. 5K after the selected storage management operation is completed, according to one implementation. In FIG. 5L, the recommendations 522 cease to include a recommendation for the selected (and now completed) storage management operation. Likewise, the recommendations 522 cease to include the progress indicator 526.

Figure 5M:
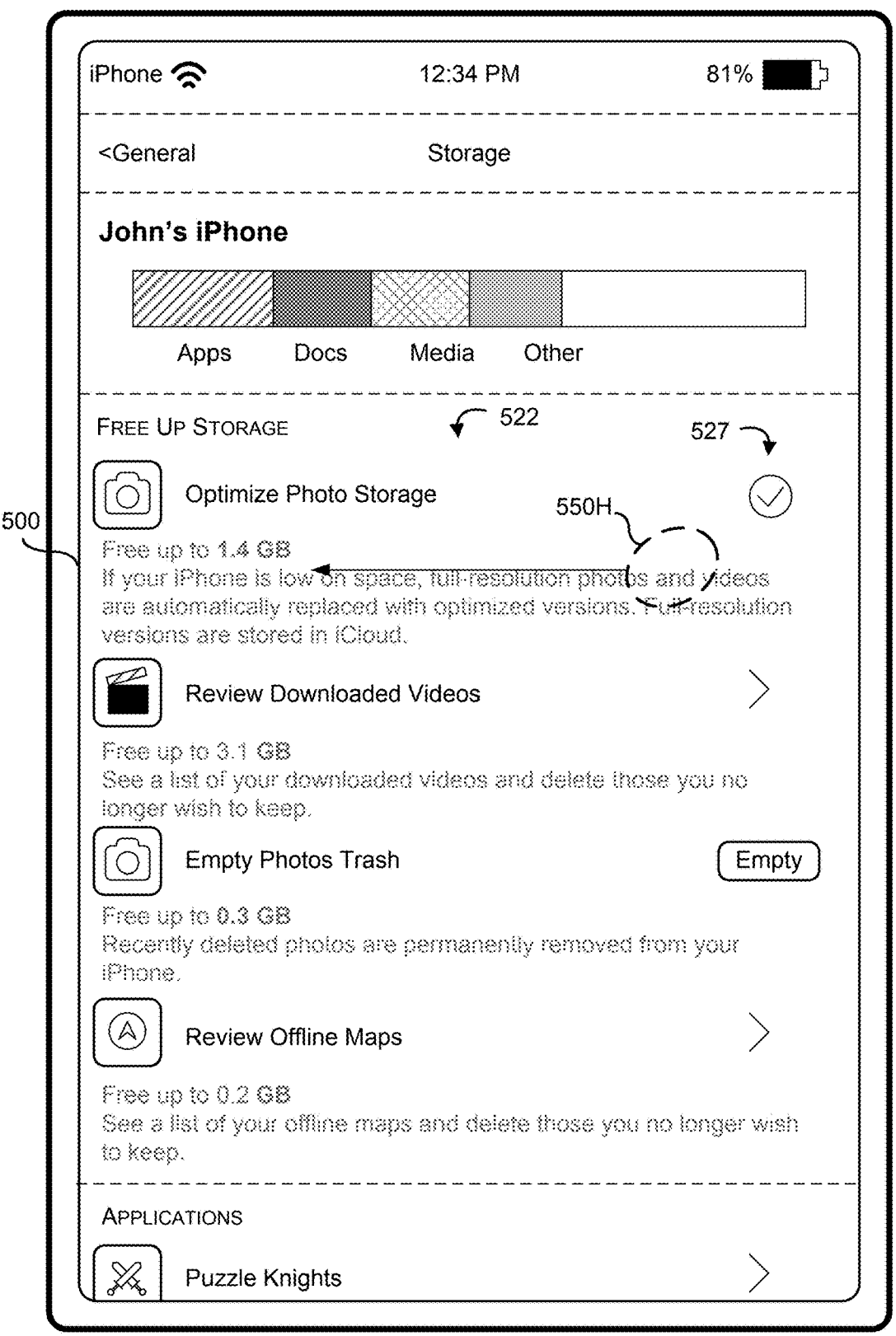

FIG. 5M illustrates the user interface 500 of FIG. 5K after the selected storage management operation is completed, according to another implementation. In FIG. 5M, the recommendations 522 include a recommendation for the selected (and now completed) storage management operation, with the progress indicator 526 updated to a completion indicator 527 indicative of completion of the process for performing the selected storage management operation. It is to be appreciated that the completion indicator 527 is a type of progress indicator that indicates that progress is 100% complete.

FIG. 5M illustrates a swipe 550H detected at a location of the recommendation corresponding to the completed storage management operation.

Figure 5N:
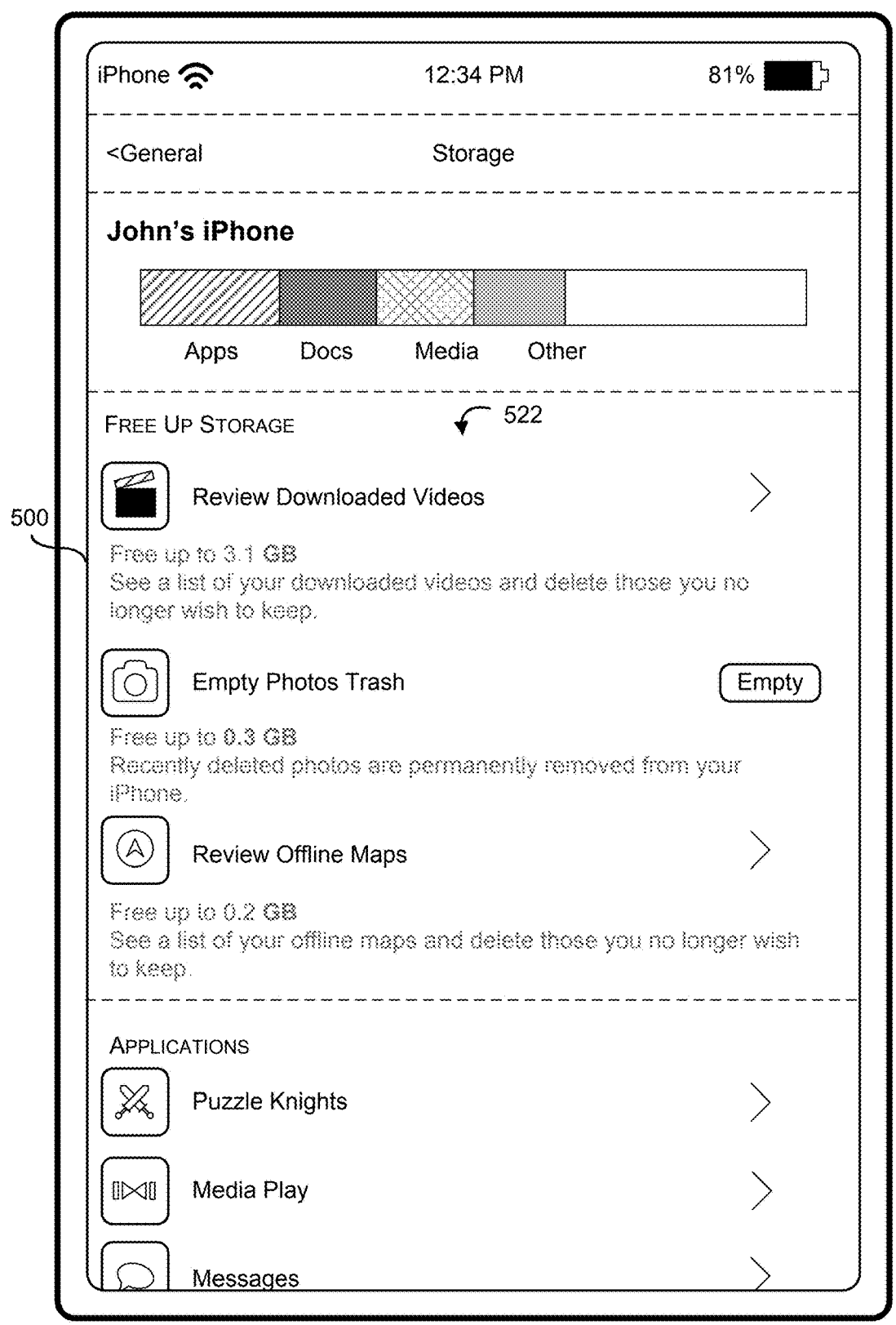

FIG. 5N illustrates the user interface 500 of FIG. 5M in response to detecting the swipe 550H at the location of the recommendation corresponding to the completed storage management operation. In FIG. 5N, identical to FIG. 5L, the recommendations 522 cease to include a recommendation for the selected (and now completed) storage management operation. Likewise, the recommendations 522 cease to include the completion indicator 527.

Figure 5O:
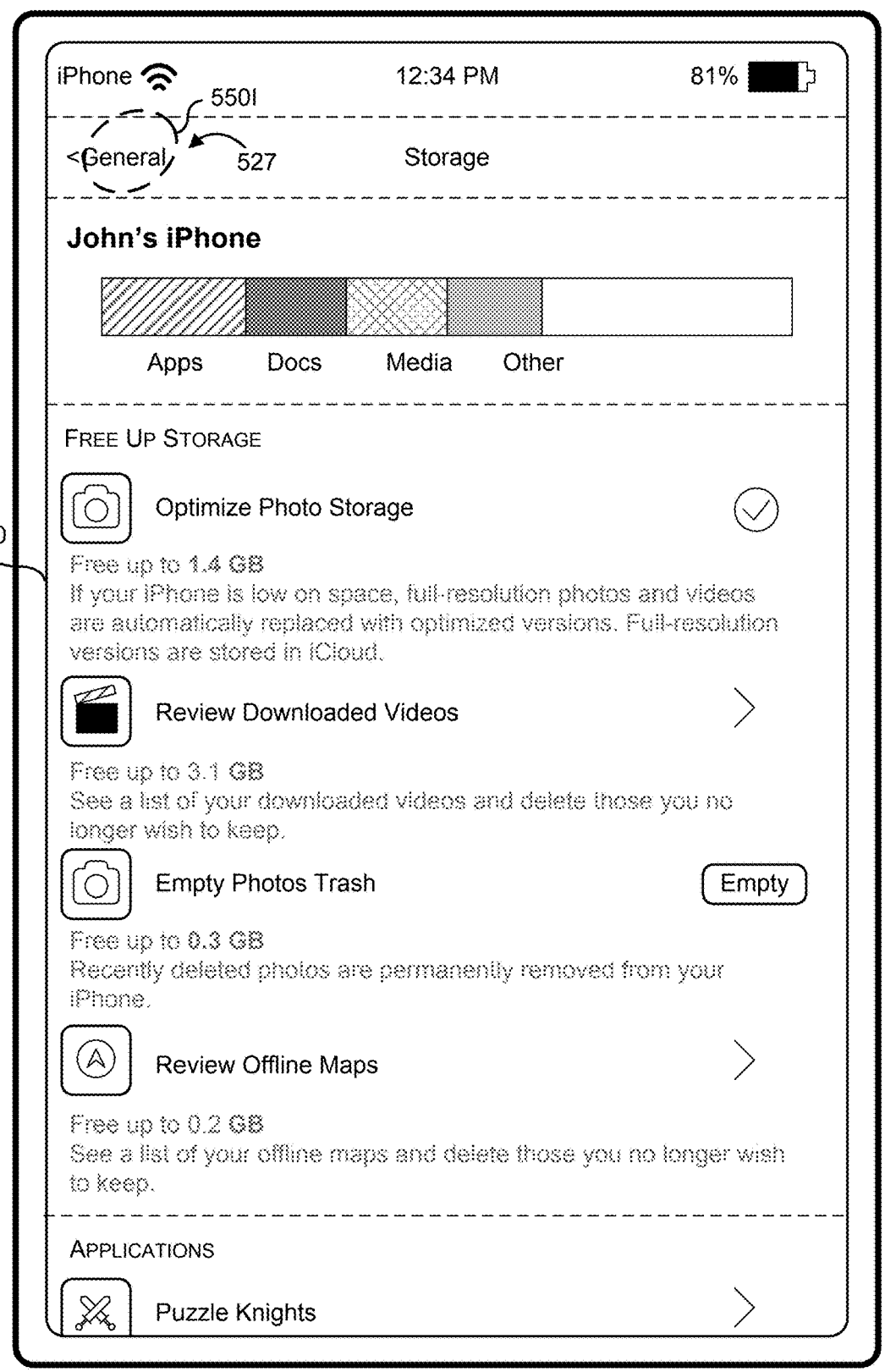

FIG. 5O illustrates the user interface of 500 of FIG. 5M with, rather than swipe 550H detected, a contact 550I detected at the location of the return affordance 527.

Figure 5P:
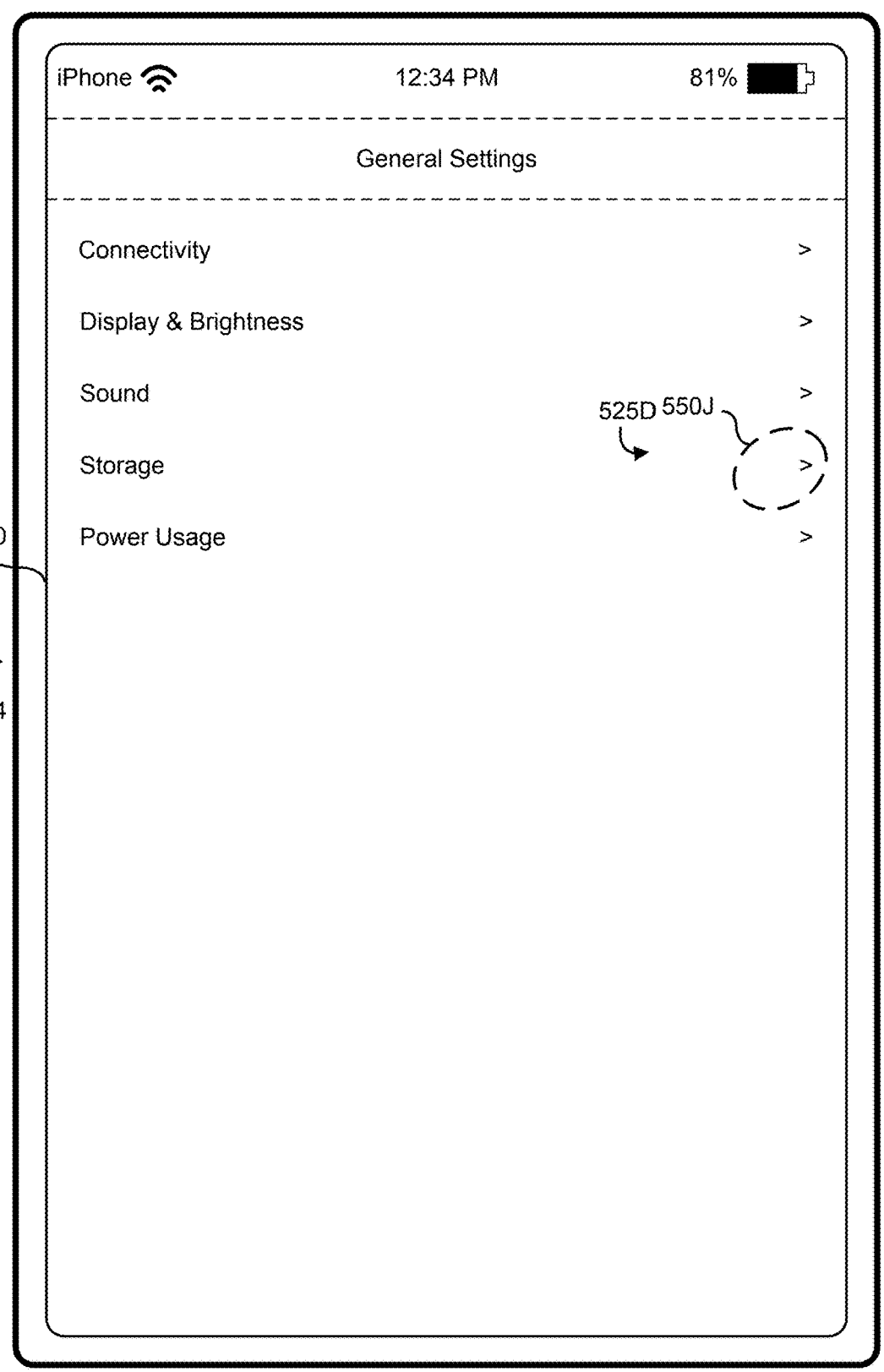

FIG. 5P illustrates the user interface 500 of FIG. 5N in response to detecting the contact 550I at the location of the return affordance 527. In FIG. 5P, the storage management user interface 503 is replaced with the general settings user interface 504. FIG. 5O illustrates a contact 550J at the location of the storage management affordance 525D of the general settings user interface 504.

Figure 5Q:
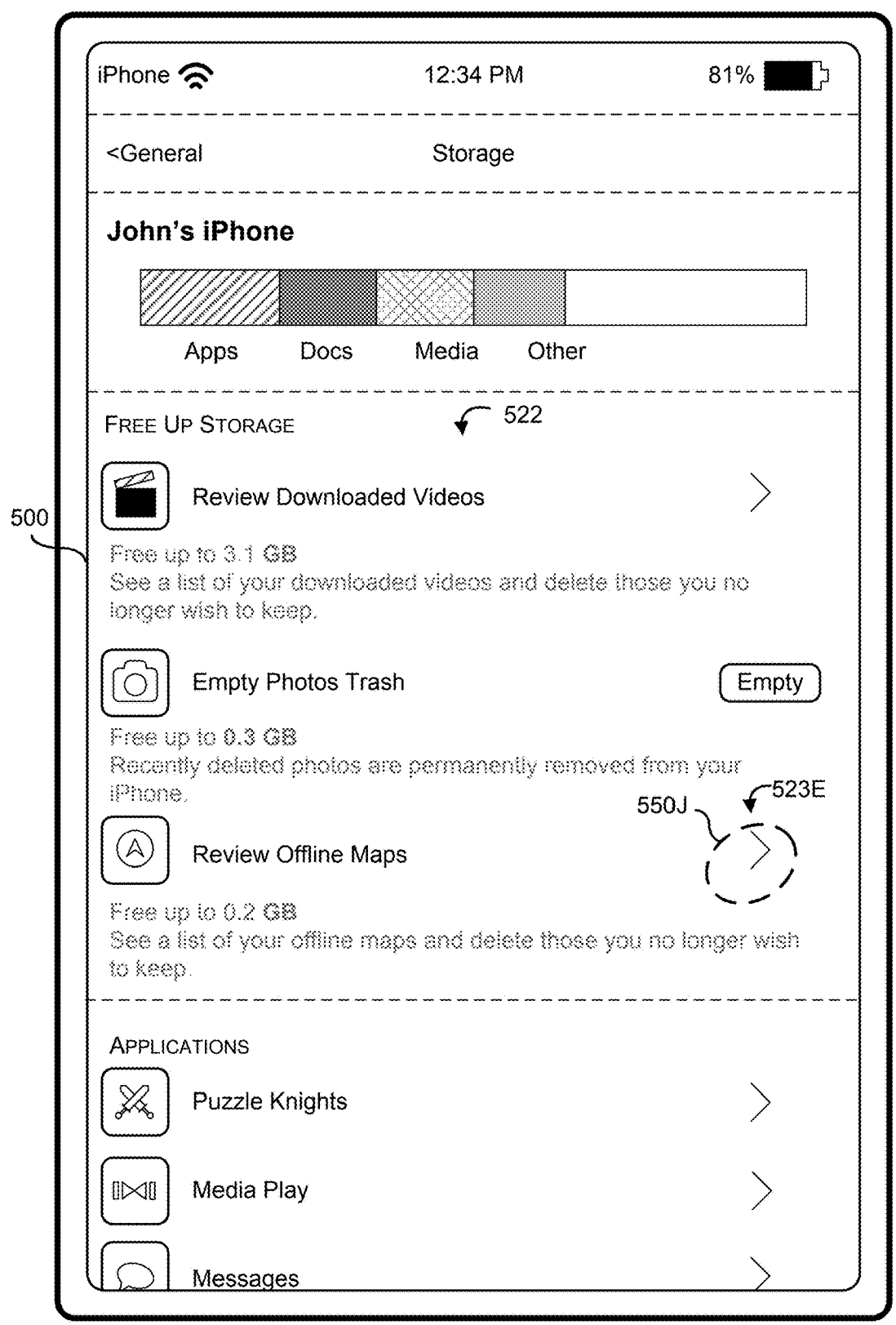

FIG. 5Q illustrates the user interface 500 of FIG. 5P in response to detecting the contact 550J at the location of the storage management affordance 525D. In FIG. 5Q, the general settings user interface 504 is replaced with the storage management user interface 503. In FIG. 5Q, identical to FIG. 5L, the recommendations 522 cease to include a recommendation for the selected (and now completed) storage management operation. Likewise, the recommendations 522 cease to include the completion indicator 527.

Thus, in some circumstances, after completing the process for performing a storage management operation, the device 100 ceases to display the storage management user interface 503 and detects a user input indicative of a request to redisplay the storage management user interface 503. In response, the device displays the storage management user interface 503 without the completion indicator 527.

Thus, in various implementations, the recommendation associated with a completed storage management operation ceases to be displayed in response to the storage management operation completing. In various implementations, the recommendation associated with a completed storage management operation (and the completion indicator 527) ceases to be displayed in response to a user input (such as swipe). In various implementations, the recommendation associated with a completed storage management operation (and the completion indicator 527) ceases to be displayed in response to exiting the storage management user interface 503 and returning to it.

FIG. 5Q illustrates a contact 550K at the location of a storage management affordance 523E that initiates a process for reviewing offline maps for deletion.

Figure 5R:
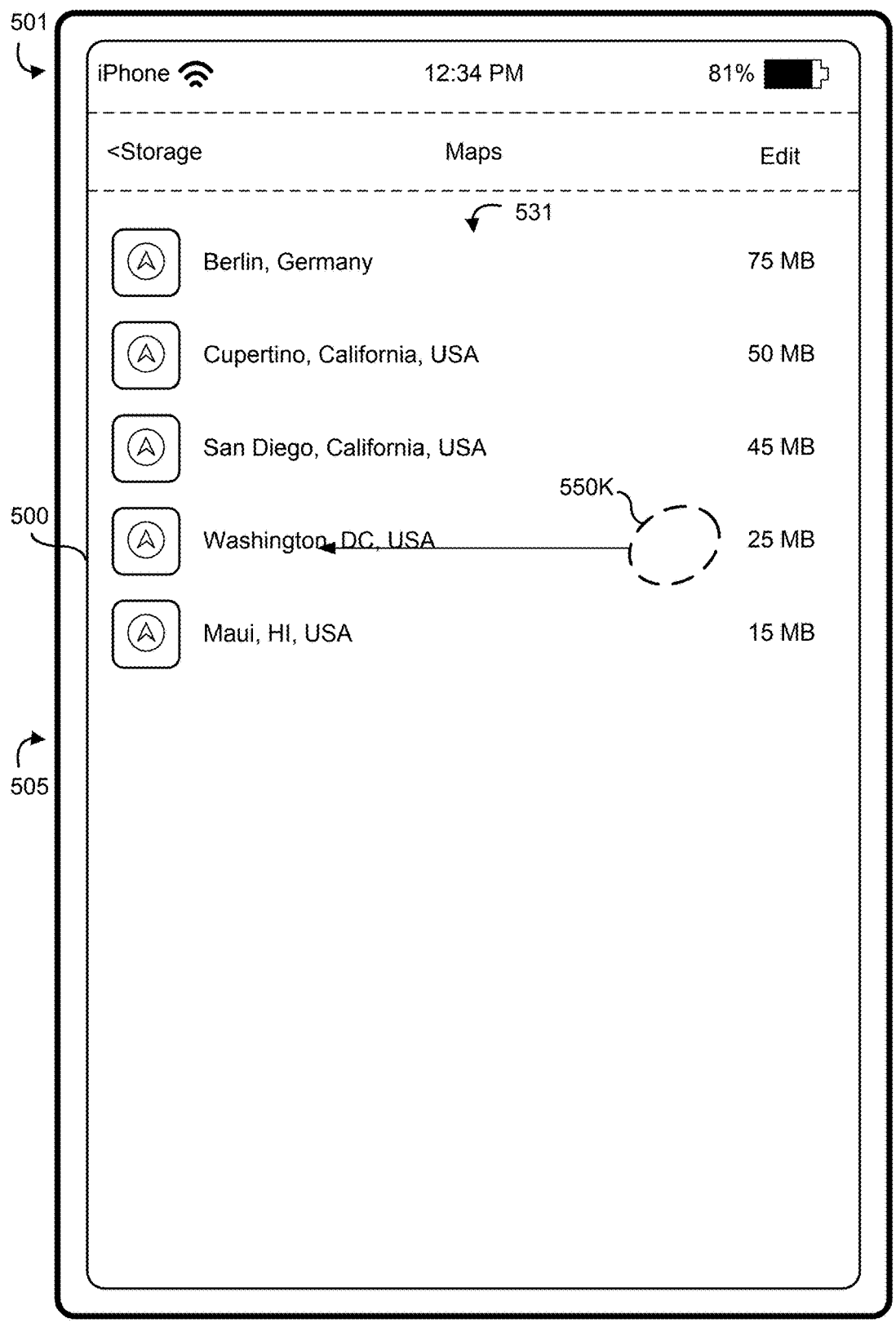

FIG. 5R illustrates the user interface 500 of FIG. 5Q in response to detecting the contact 550K at the location of the storage management affordance 523E that initiates the process for reviewing offline maps for deletion. In FIG. 5R, the user interface 500 includes an offline map deletion user interface 505 (displayed below the device bar 501).

The offline map deletion user interface 505 includes representations 531 for a plurality of offline maps stored on the device 100. In various implementations, each representation includes an icon, a description of the map (e.g., text indicating the geographical location the map represents), and an amount of storage used by the offline map. In various implementations, the representations 531 are displayed ordered by the amount of storage used.

FIG. 5R illustrates a swipe 550K detected at a location of one of the representations 531 corresponding to an offline map of Washington, D.C.

Figure 5S:
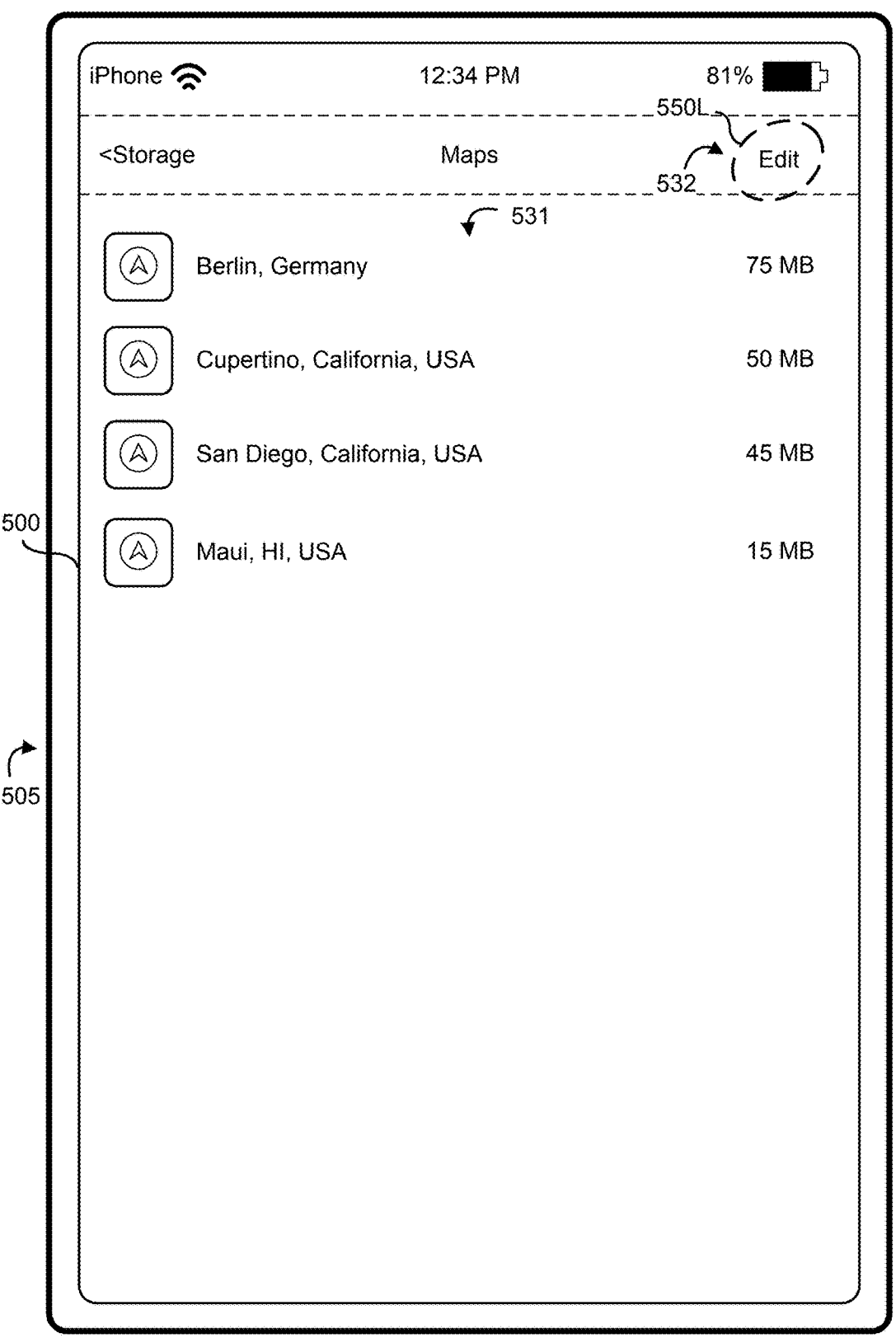

FIG. 5S illustrates the user interface 500 of FIG. 5R in response to detecting the swipe 550K at the location of one of the representations. In FIG. 5S, the representations 531 cease to include the selected representation, indicating the offline map of Washington, D.C., USA has been deleted from the device 100.

FIG. 5S illustrates a contact 550L at location of an edit affordance 532 of the offline map deletion user interface 505.

Figure 5T:
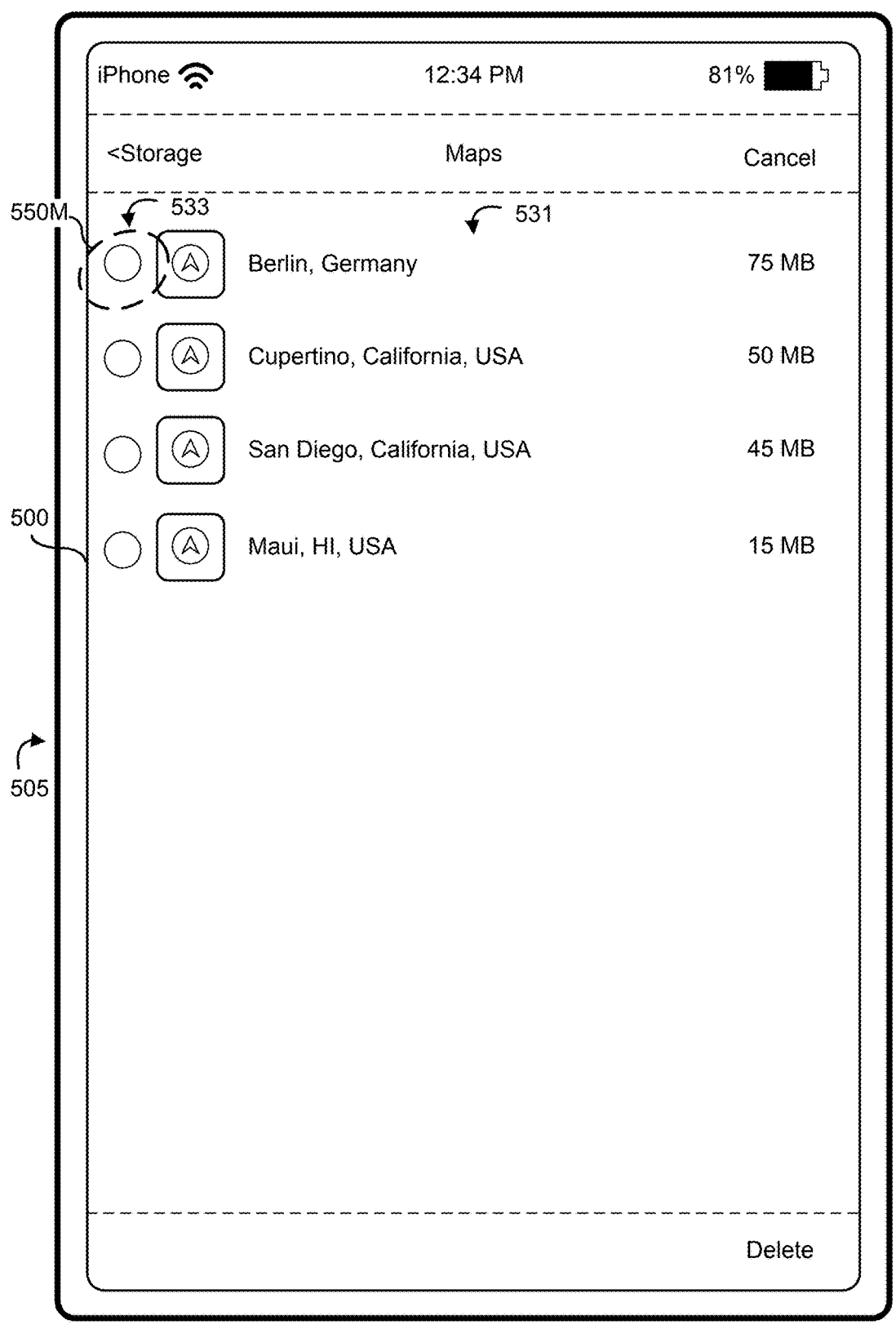

FIG. 5T illustrates the user interface 500 of FIG. 5S in response to detecting the contact 550L at the location of the edit affordance 532. In FIG. 5T, each representation 531 is displayed with a corresponding selection affordance 533. FIG. 5T illustrates a contact 550M detected at the location of one of the selection affordances 533 corresponding to an offline map of Berlin, Germany.

Figure 5U:
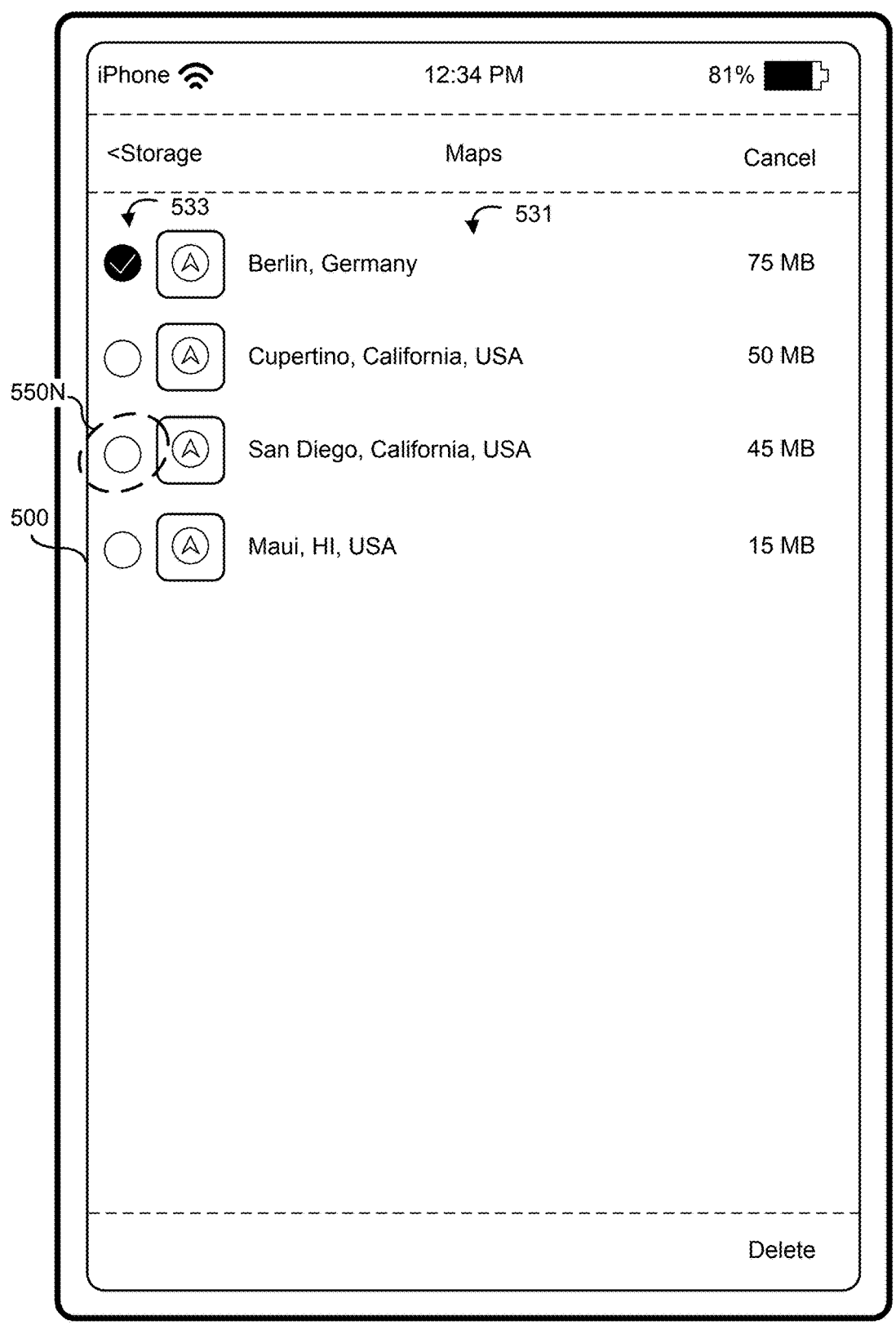

FIG. 5U illustrates the user interface 500 of FIG. 5T in response to detecting the contact 550M at the location of the selection affordance 533 corresponding to the offline map of Berlin, Germany. In FIG. 5U, the selection affordance 533 corresponding to the offline map of Berlin, Germany has changed to indicate that the offline map of Berlin, Germany has been selected. FIG. 5U illustrates a contact 550N at the location of another one of the selection affordances 533 corresponding to an offline map of San Diego, Calif., USA.

Figure 5V:
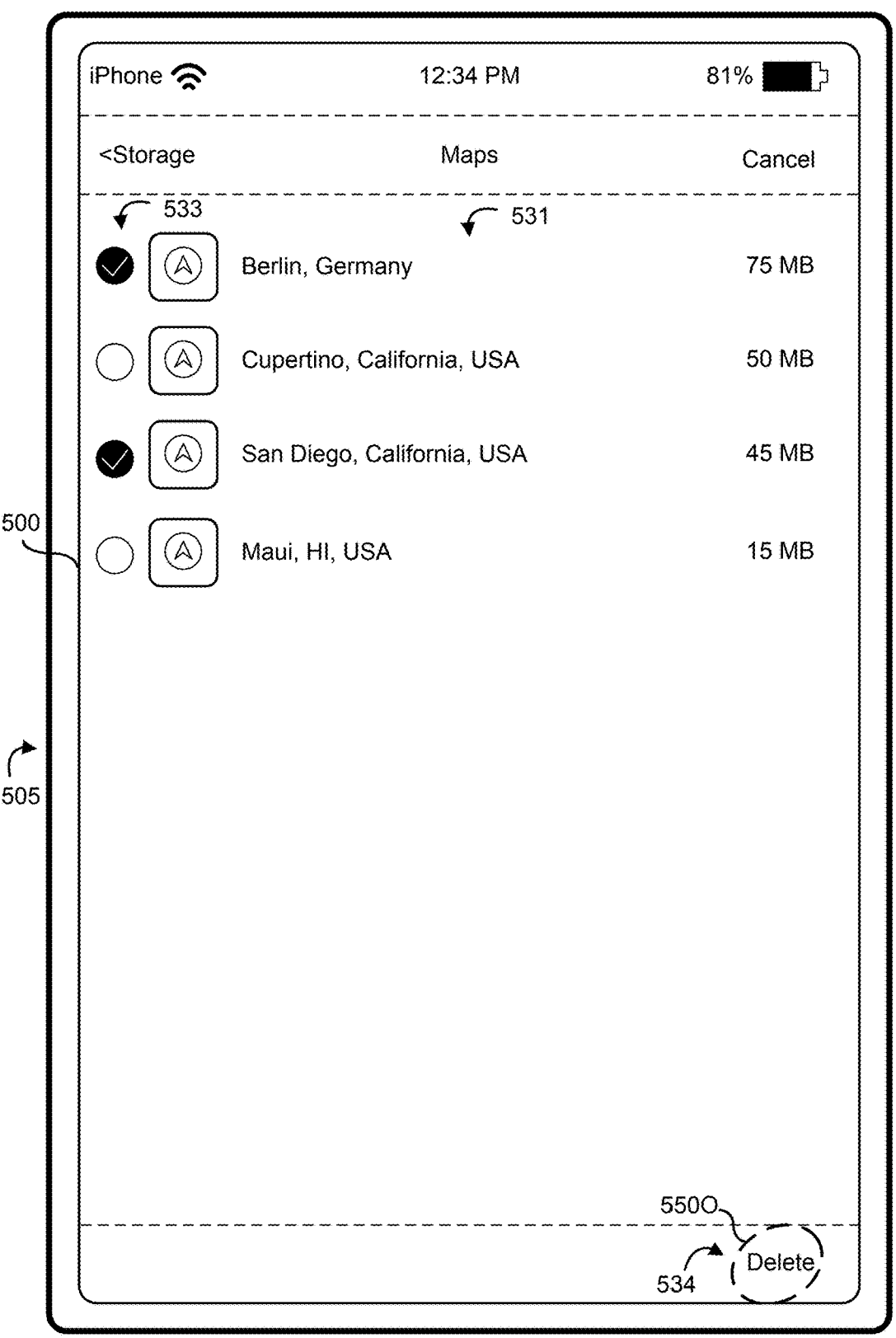

FIG. 5V illustrates the user interface 500 of FIG. 5U in response to detecting the contact 550N at the location of the selection affordance 533 corresponding to the offline map of San Diego, Calif., USA. In FIG. 5V, the selection affordance 533 corresponding to the offline map of San Diego, Calif., USA has changed to indicate that the offline map of San Diego, Calif., USA has been selected. FIG. 5V illustrates a contact 550O at the location of a delete affordance 534 of the offline map deletion user interface 505.

Figure 5W:
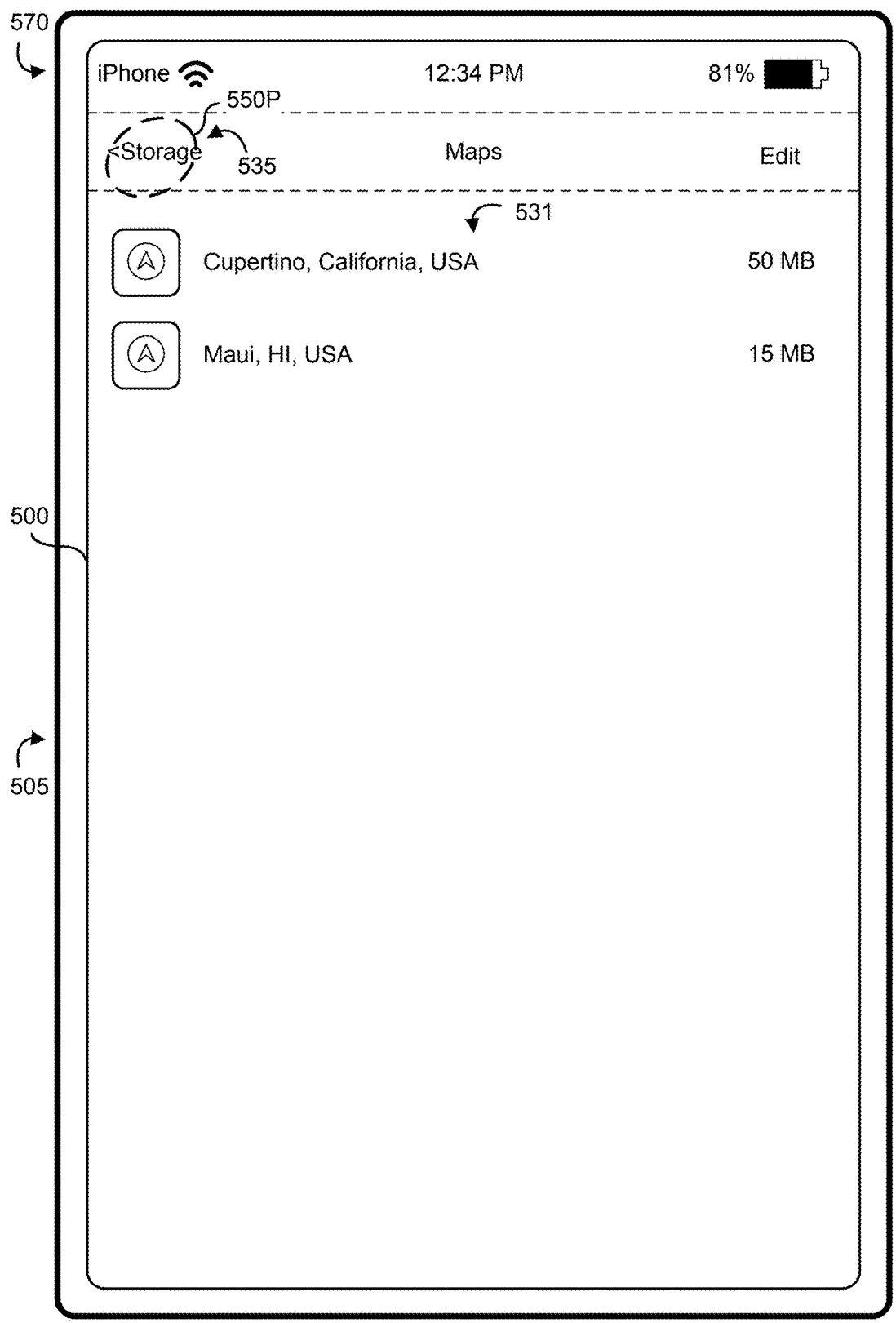

FIG. 5W illustrates the user interface 500 of FIG. 5V in response to detecting the contact 550O at the location of the delete affordance 534. In FIG. 5W, the representations 531 cease to include the selected representation, indicating the offline maps of Berlin, Germany and San Diego, Calif., USA have been deleted from the device 100. FIG. 5W illustrates a contact 550P at the location of a return affordance 535 of the offline map deletion user interface 505.

Figure 5X:
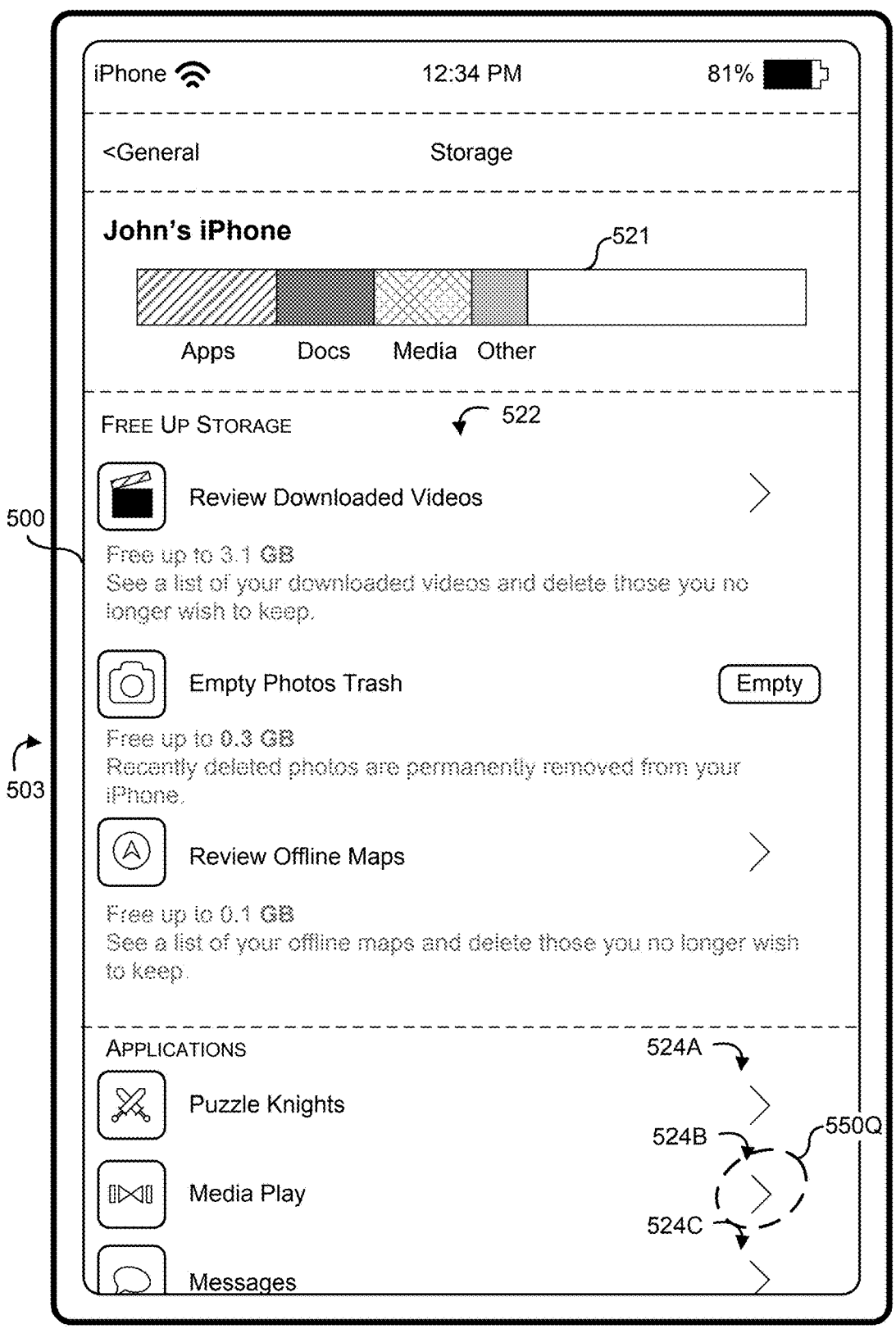

FIG. 5X illustrates the user interface 500 of FIG. 5W in response to detecting the contact 550P at the location of the return affordance 535. In FIG. 5X, the storage management user interface 503 is displayed. The storage management user interface 503 differs slightly from that of FIG. 5Q in that the recommendation corresponding to the storage management operation to review offline maps for deletion indicates that only 0.1 GB can be freed by the operation (as opposed to 0.2 GB indicated in FIG. 5Q).

FIG. 5X illustrates a contact 550Q detected at the location of an application affordance 524B associated with a video player application.

Figure 5Y:
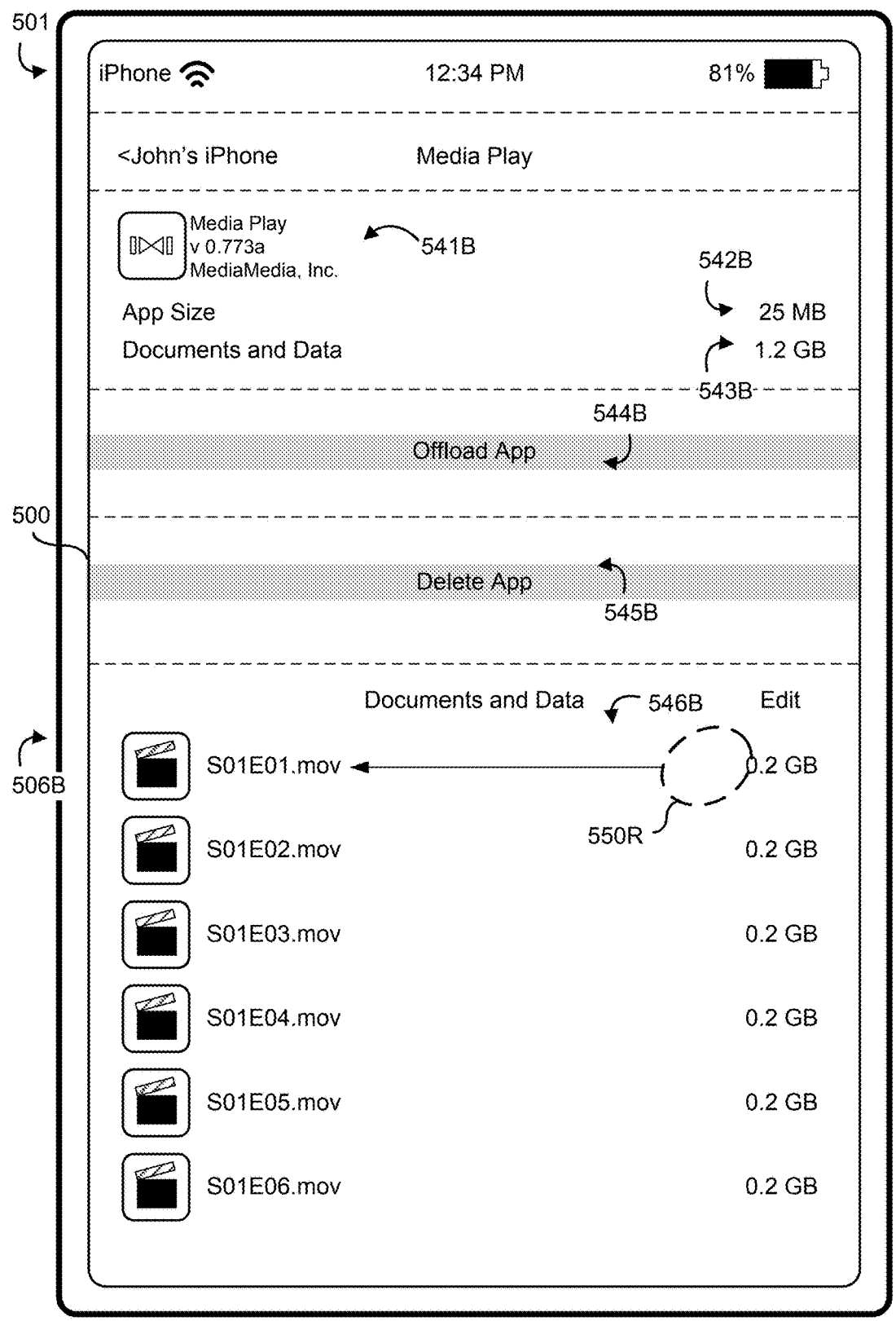

FIG. 5Y illustrates the user interface 500 of FIG. 5X in response to detecting the contact 550Q at the location of the application affordance 524B associated with the video player application. In FIG. 5Y, the user interface 500 includes a video player management user interface 506B (displayed below the device bar 501). The video player management user interface 506B is an application management user interface for managing data stored on the device by the video player application.

The video player management user interface 506B includes a metadata region 541B displaying information regarding the video player application, such as title, version number, and developer.

The video player management user interface 506B includes an application size indication 542B of the amount of storage of the device 100 used by the video player application itself and an associated data size indication 543B of the amount of storage of the device 100 used by the video player application for associated data. In various implementations, the associated data includes save files, game states, login information, player info, media content, documents, etc.

The video player management user interface 506B includes a demote affordance 544B for deleting the video player application without deleting associated data for the video player application (e.g., video content). The video player management user interface 506B includes a delete affordance 545B for deleting the video player application and associated data for the video player application.

The video player management user interface 506B includes a number of affordances 546B representing data items of associated data of the video player application, e.g., video file. The affordances 546B can be manipulated to delete respective data items of associated data. In various implementations, in accordance with a determination that a particular application uses an application programming interface to cache content items, the application management user interface includes one or more affordances to delete respective content items that are cached using the application programming interface. Thus, in FIG. 5Y, in accordance with a determination that the video player application uses an application programming interface to cache video files, the video player management user interface 506B includes affordances 546B to delete respective video files that are cached using the application programming interface. Accordingly, in various implementations, by using the application programming interface for caching content, the application opts in to displaying options in a storage management user interface for deleting the cached content that was cached using the application programming interface.

FIG. 5Y illustrates a swipe 550R detected at a location of one of the affordances 546B to delete respective video files.

Figure 5Z:
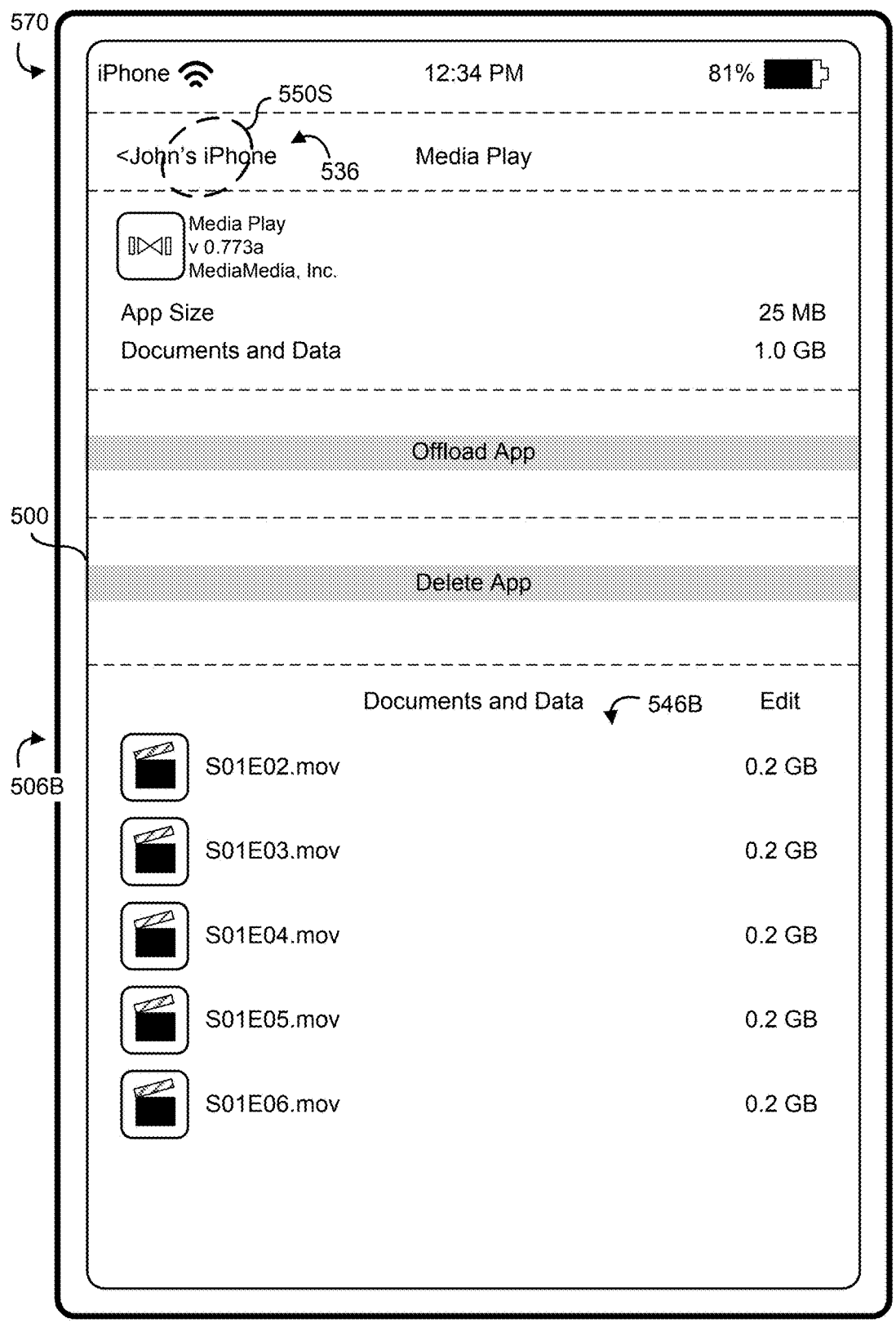
Figure 5A:
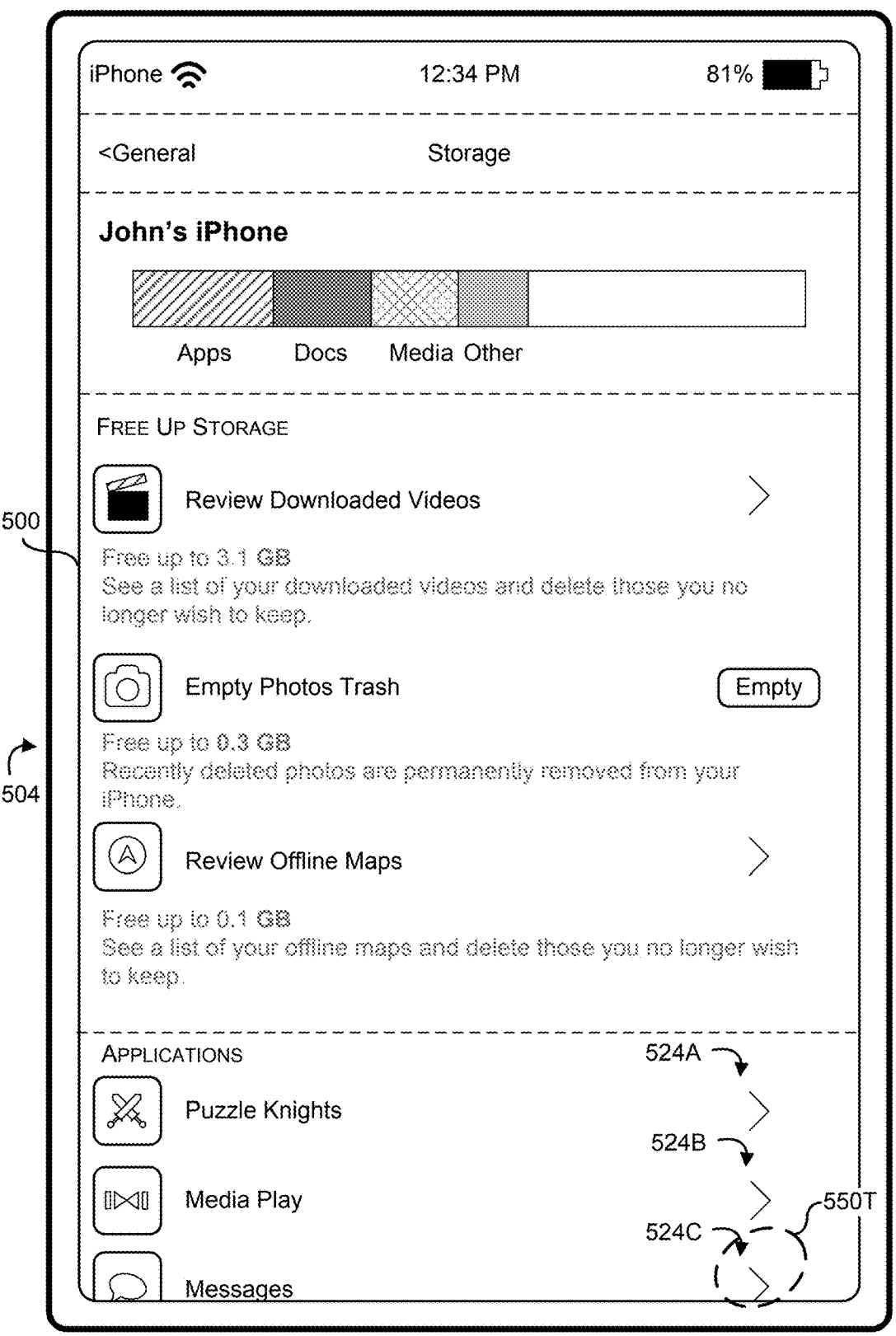
Figure 5A:
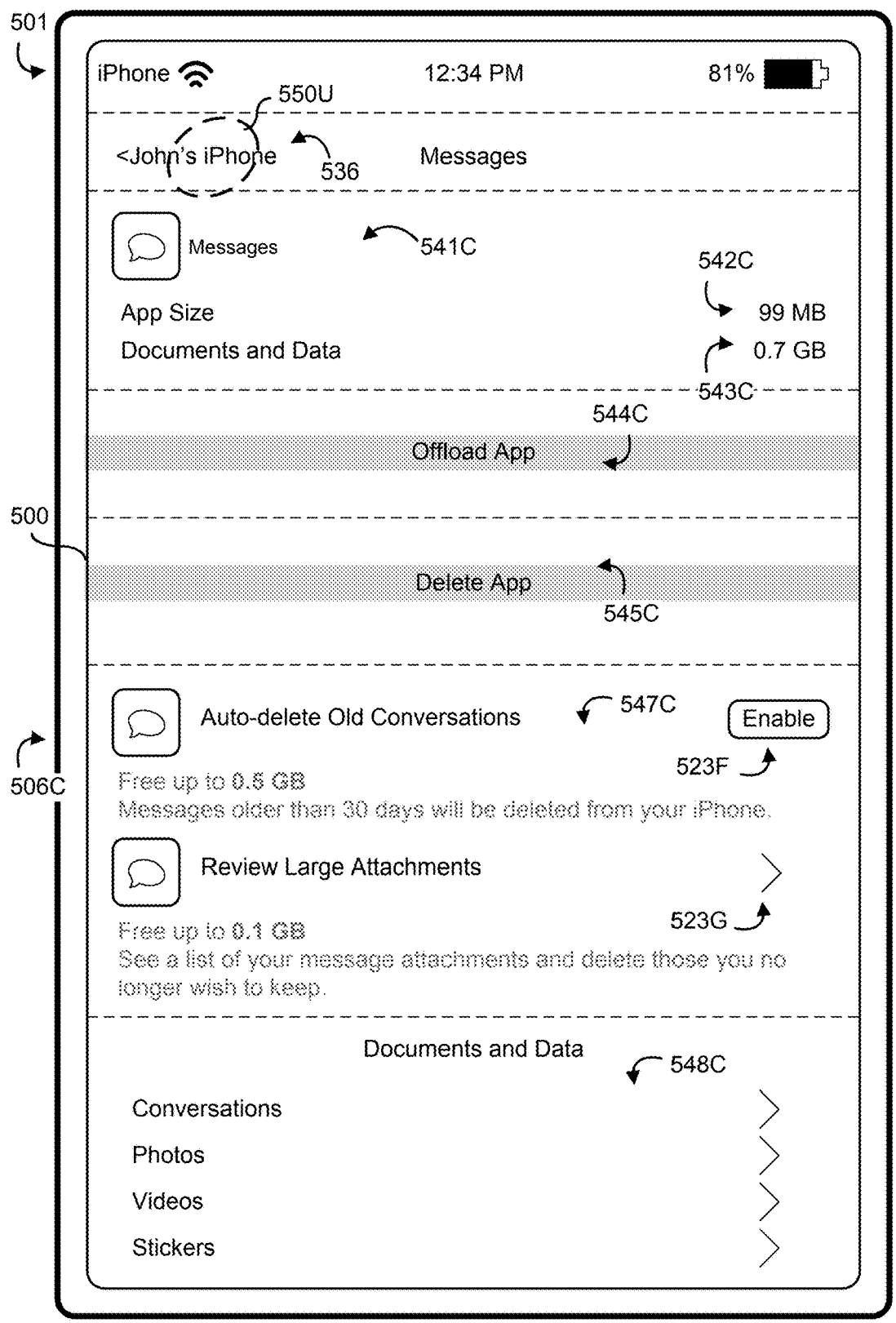
Figure 5A:
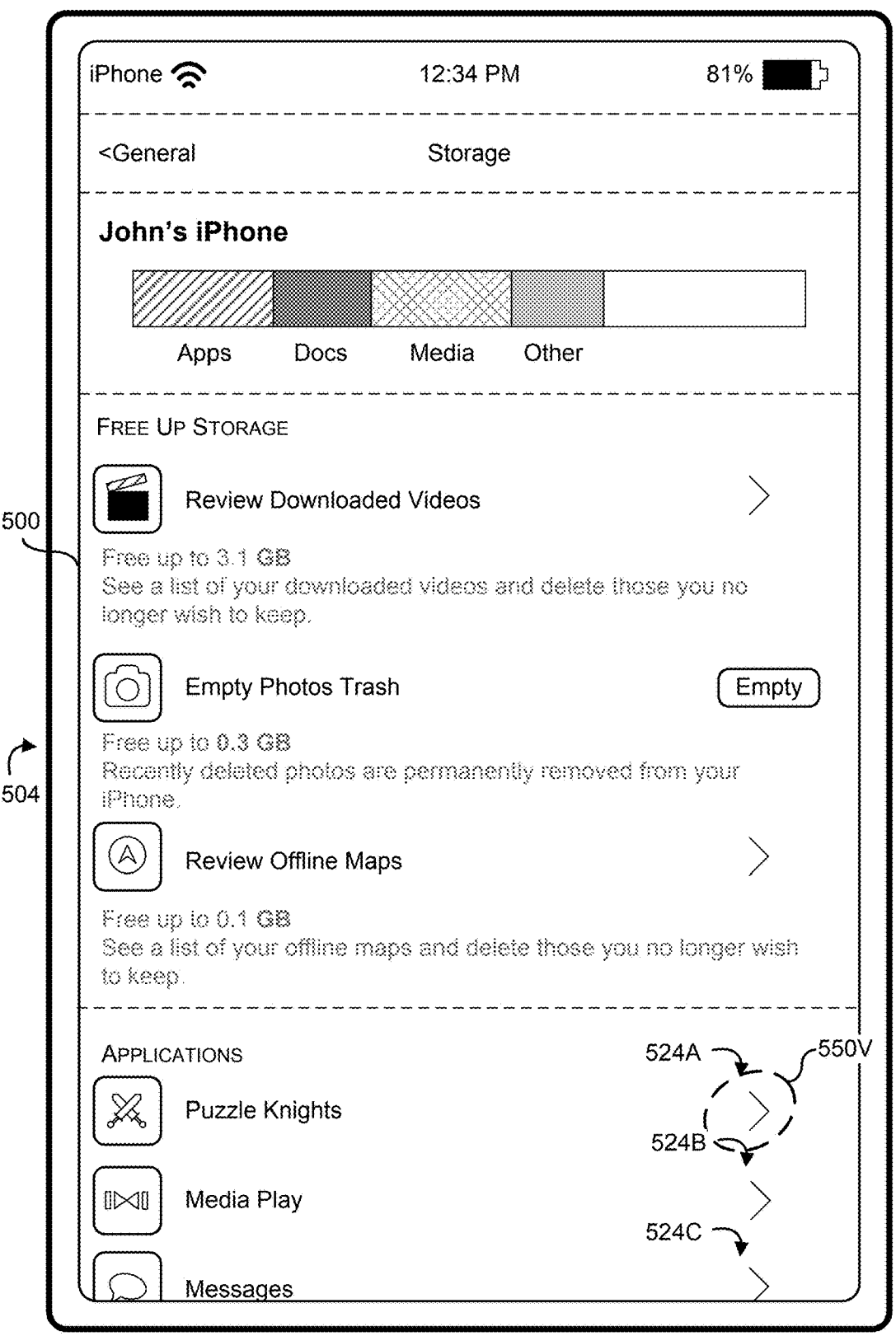
Figure 5A:
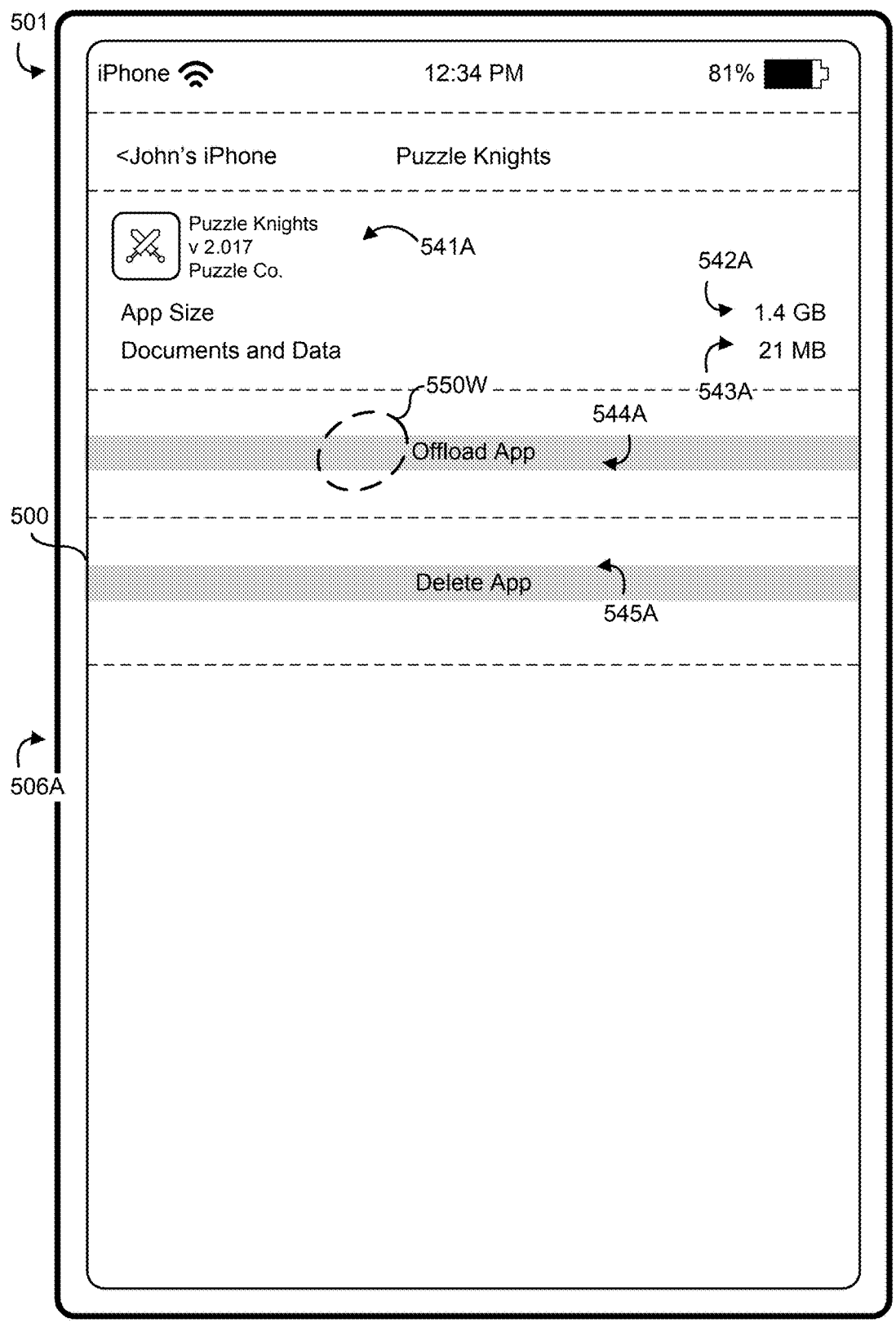
Figure 5A:
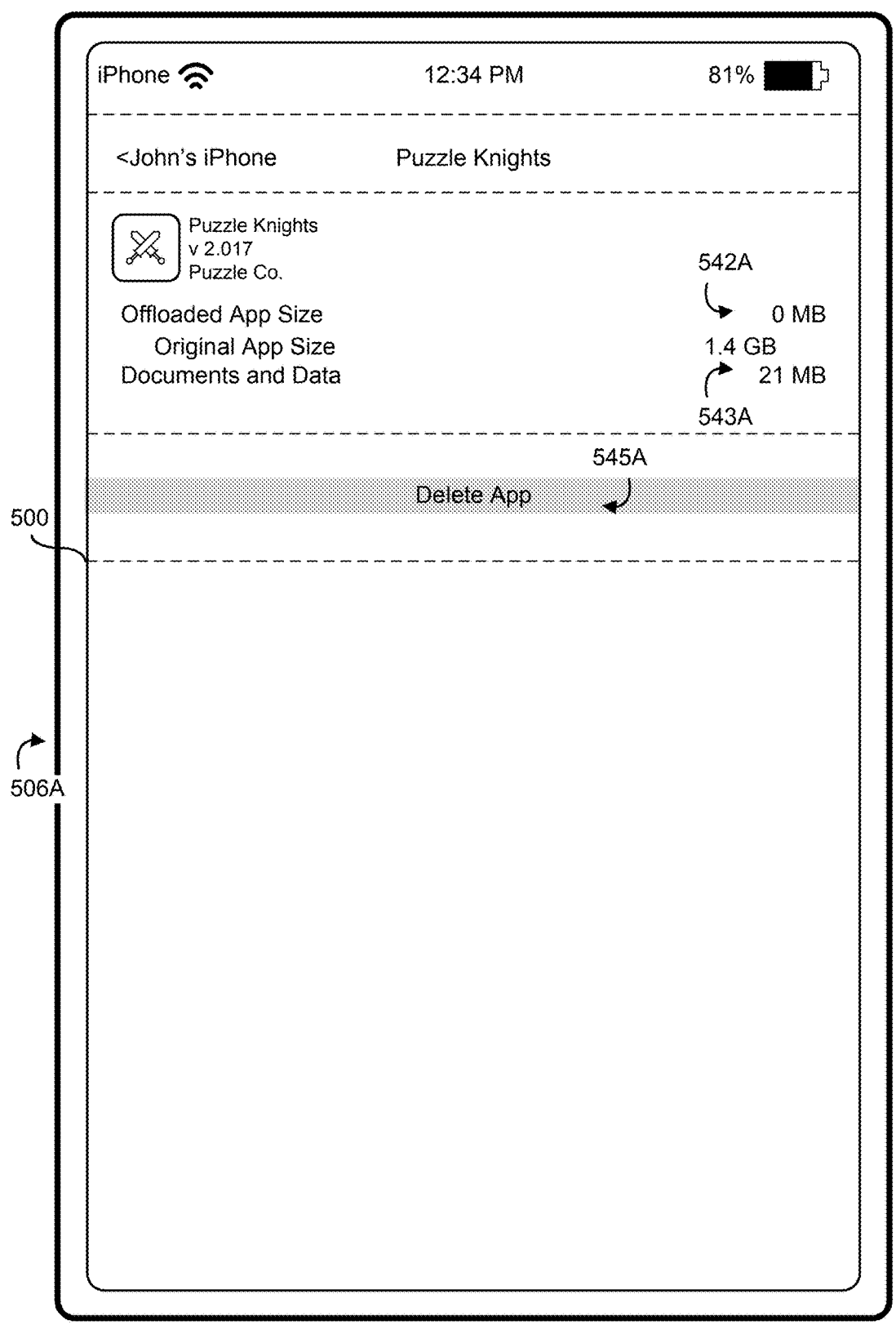
Figure 5A:
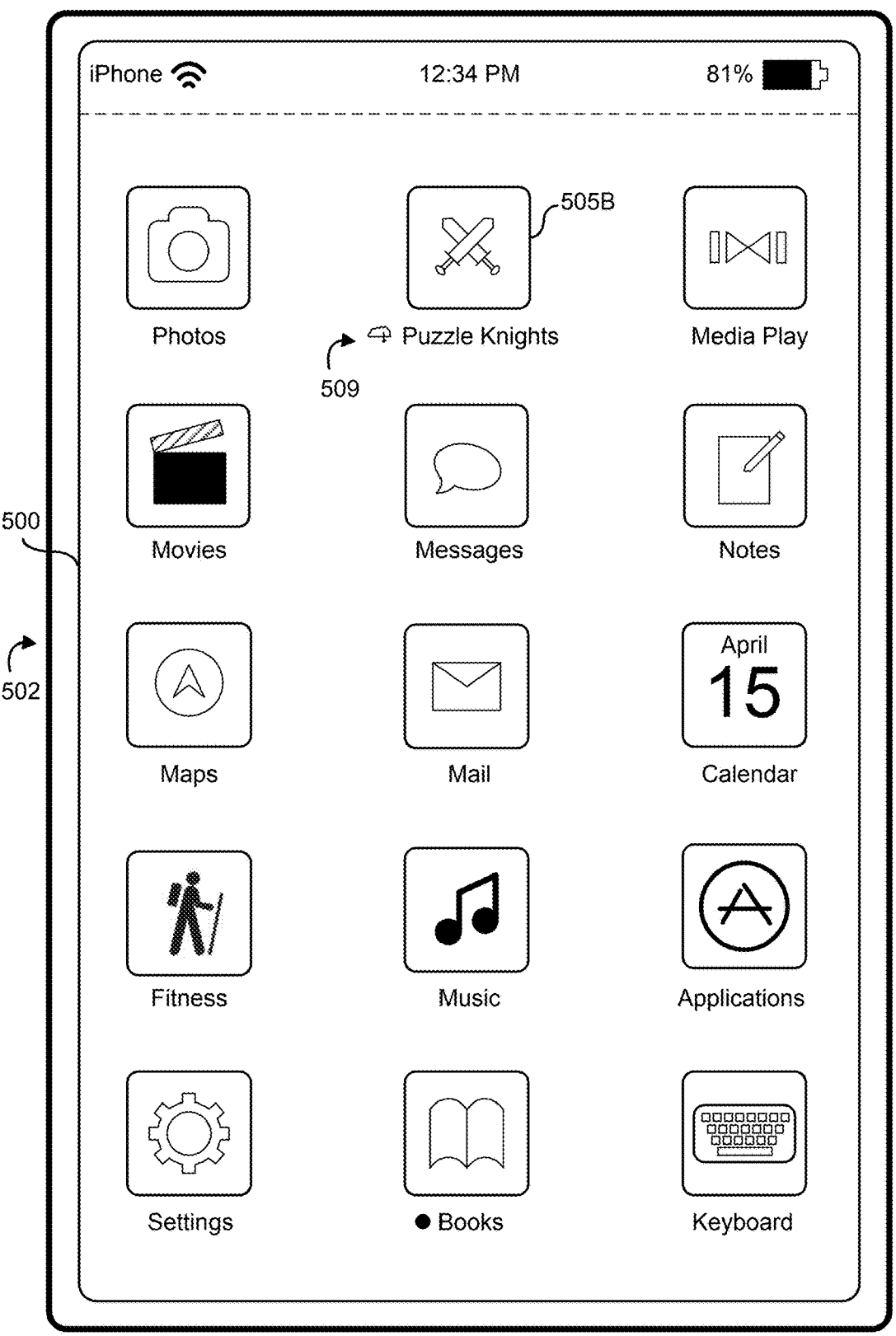
Figure 5A:
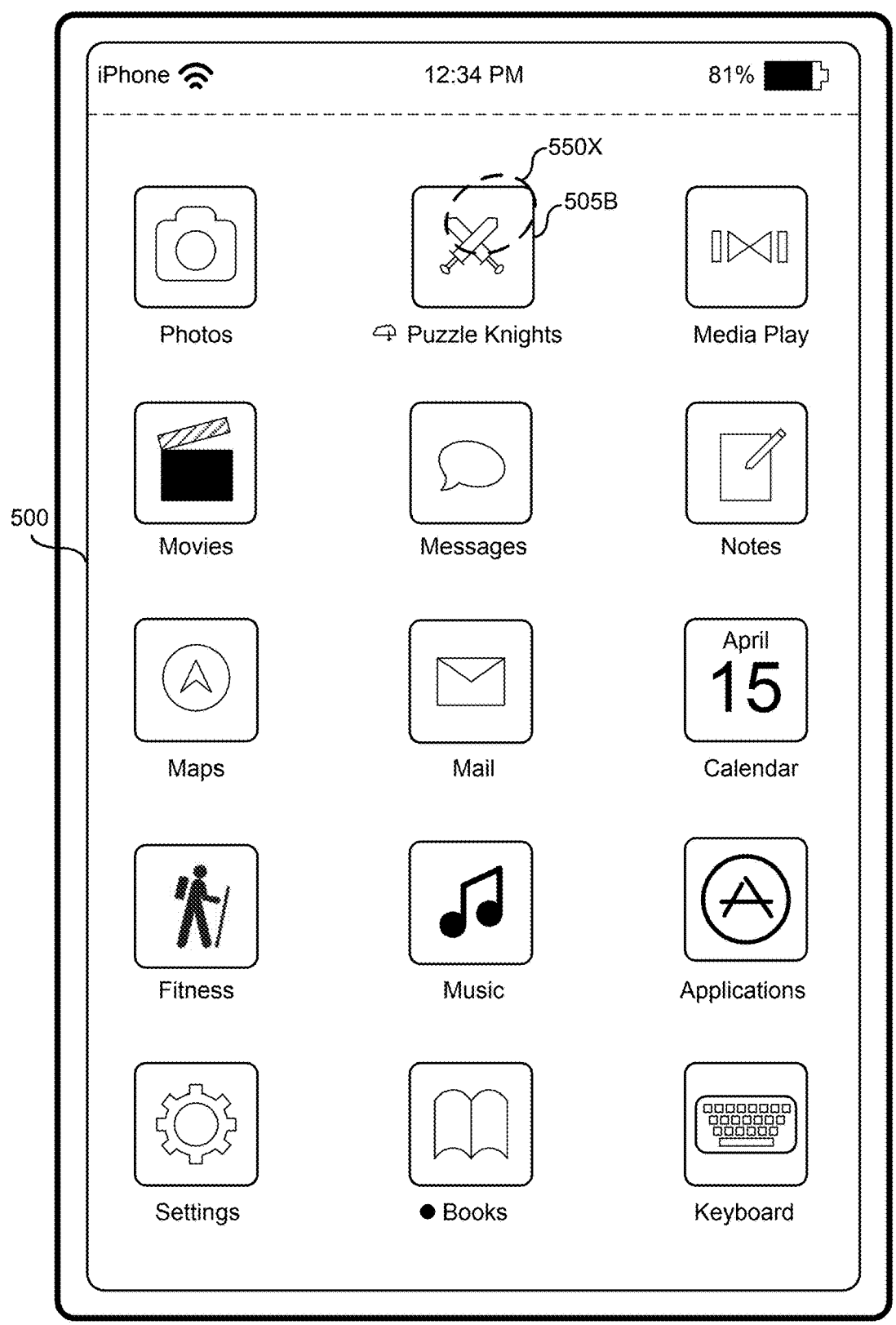
Figure 5A:
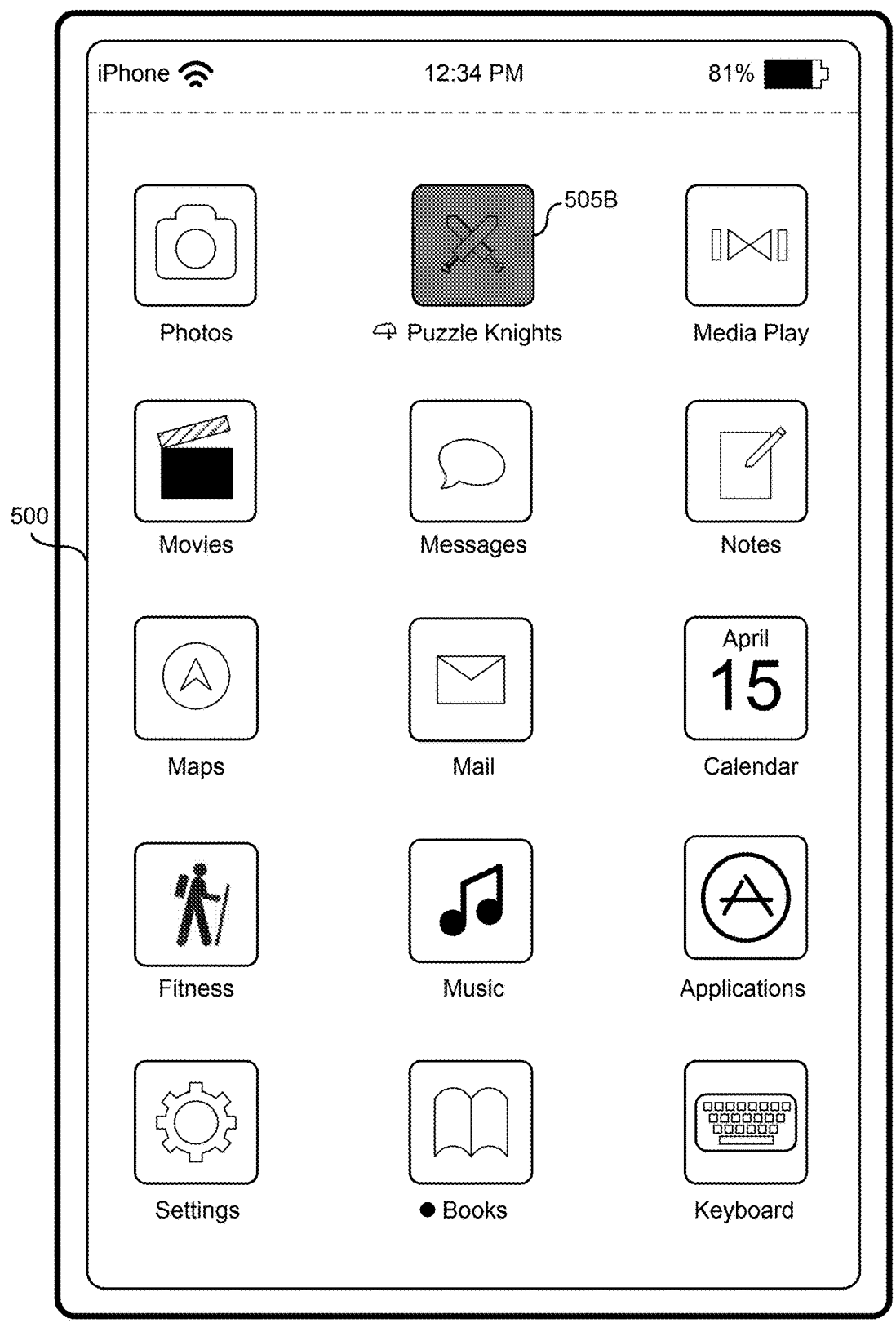
Figure 5A:
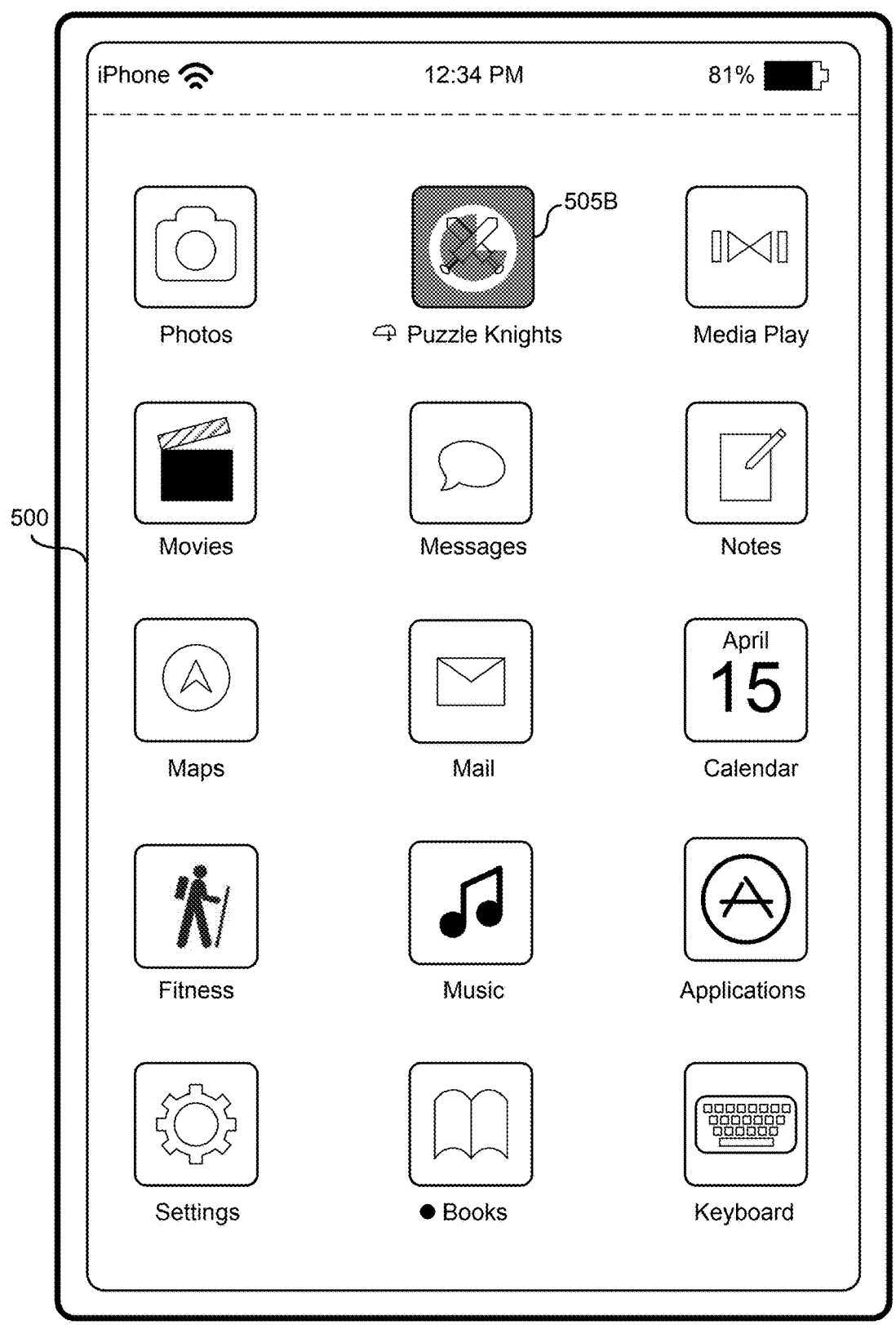
Figure 5A:
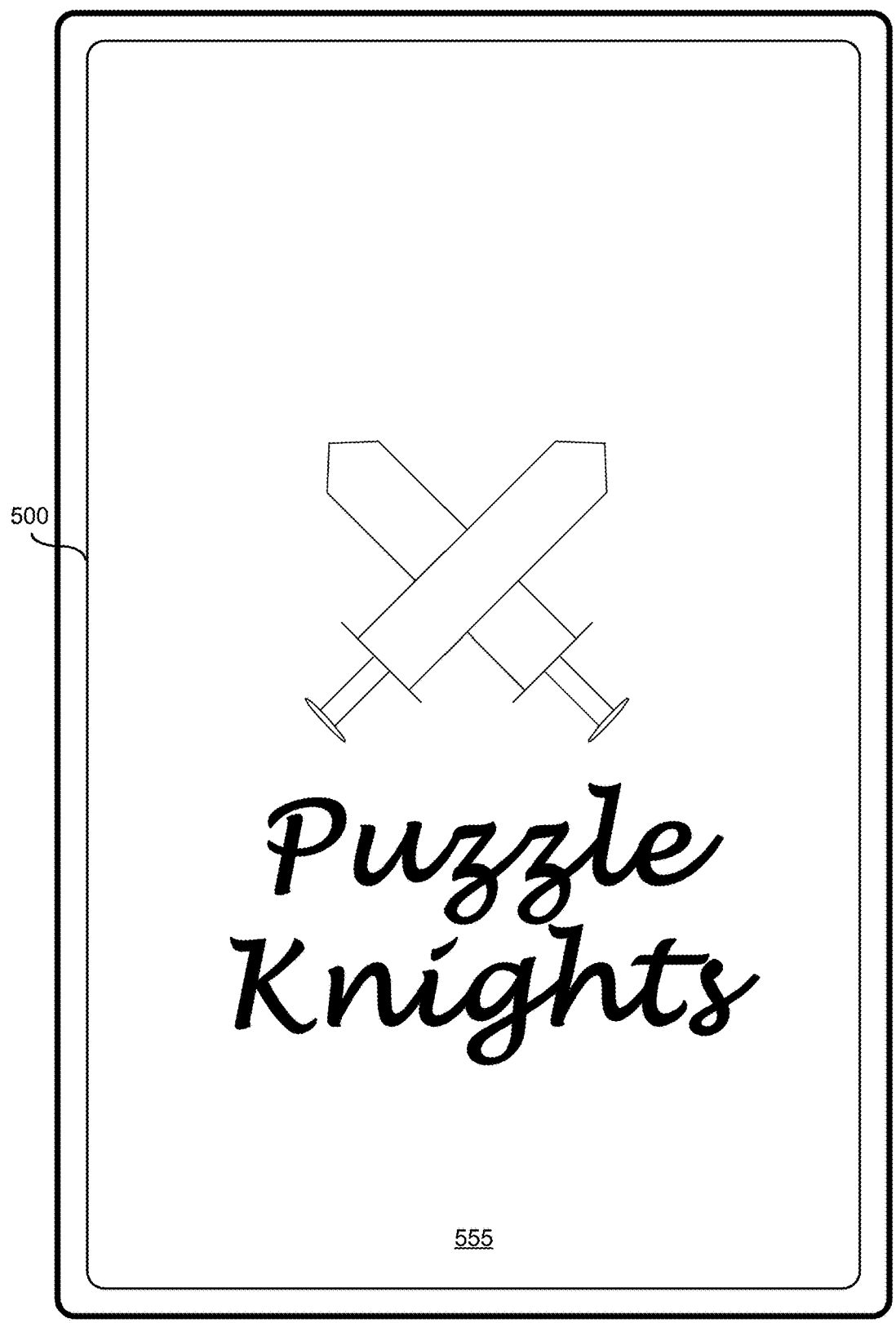
Figure 5A:
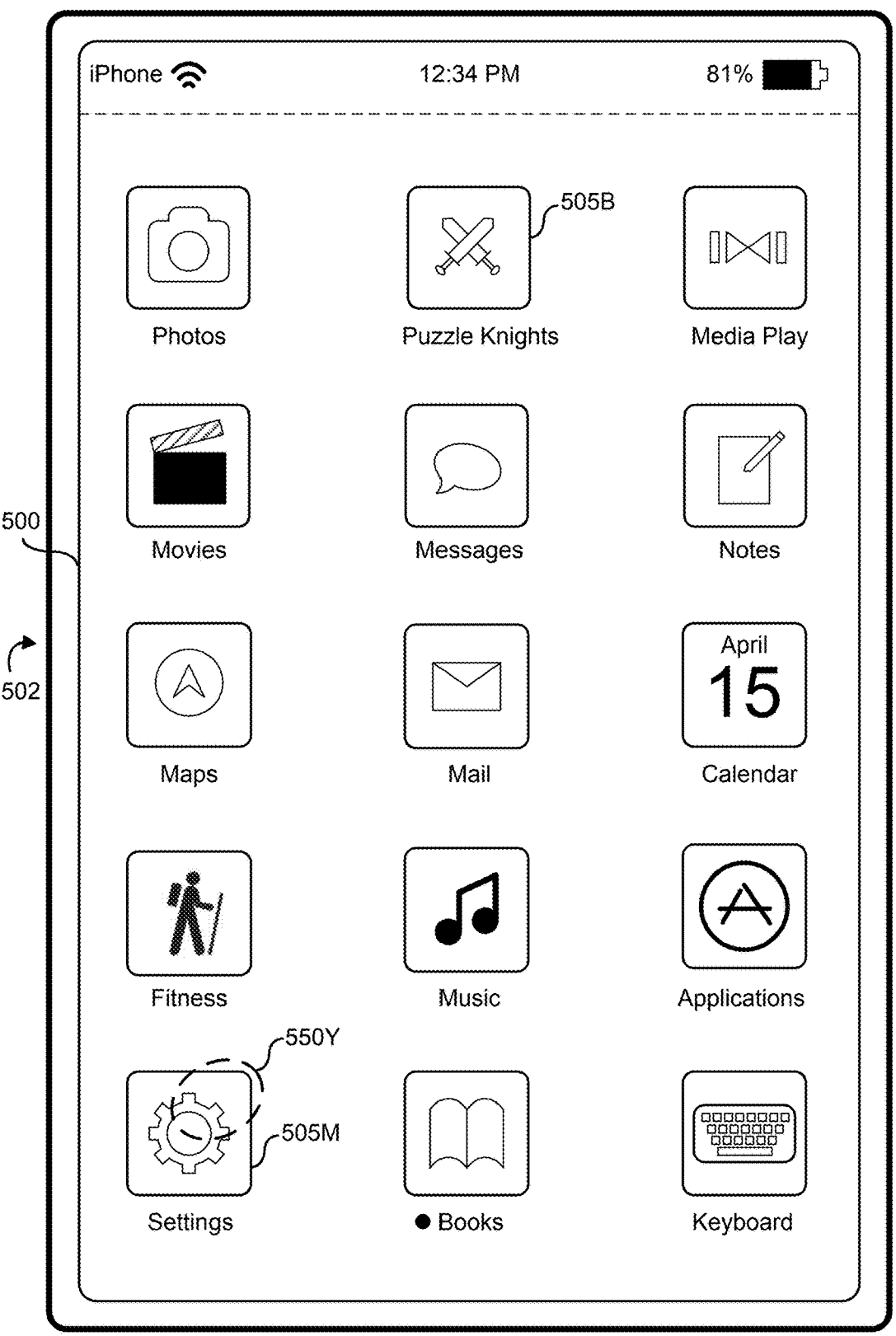
Figure 5A:
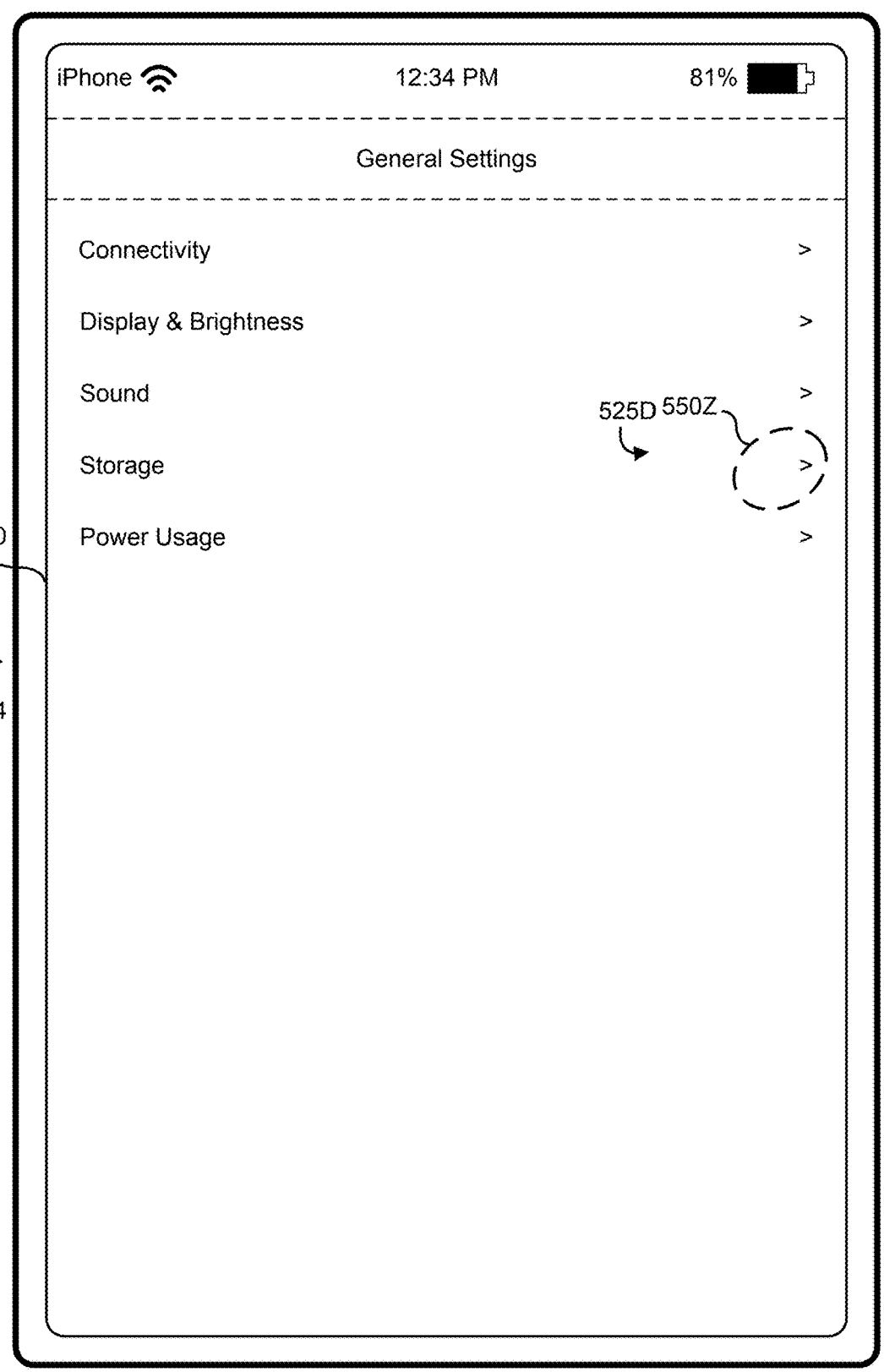
Figure 5A:
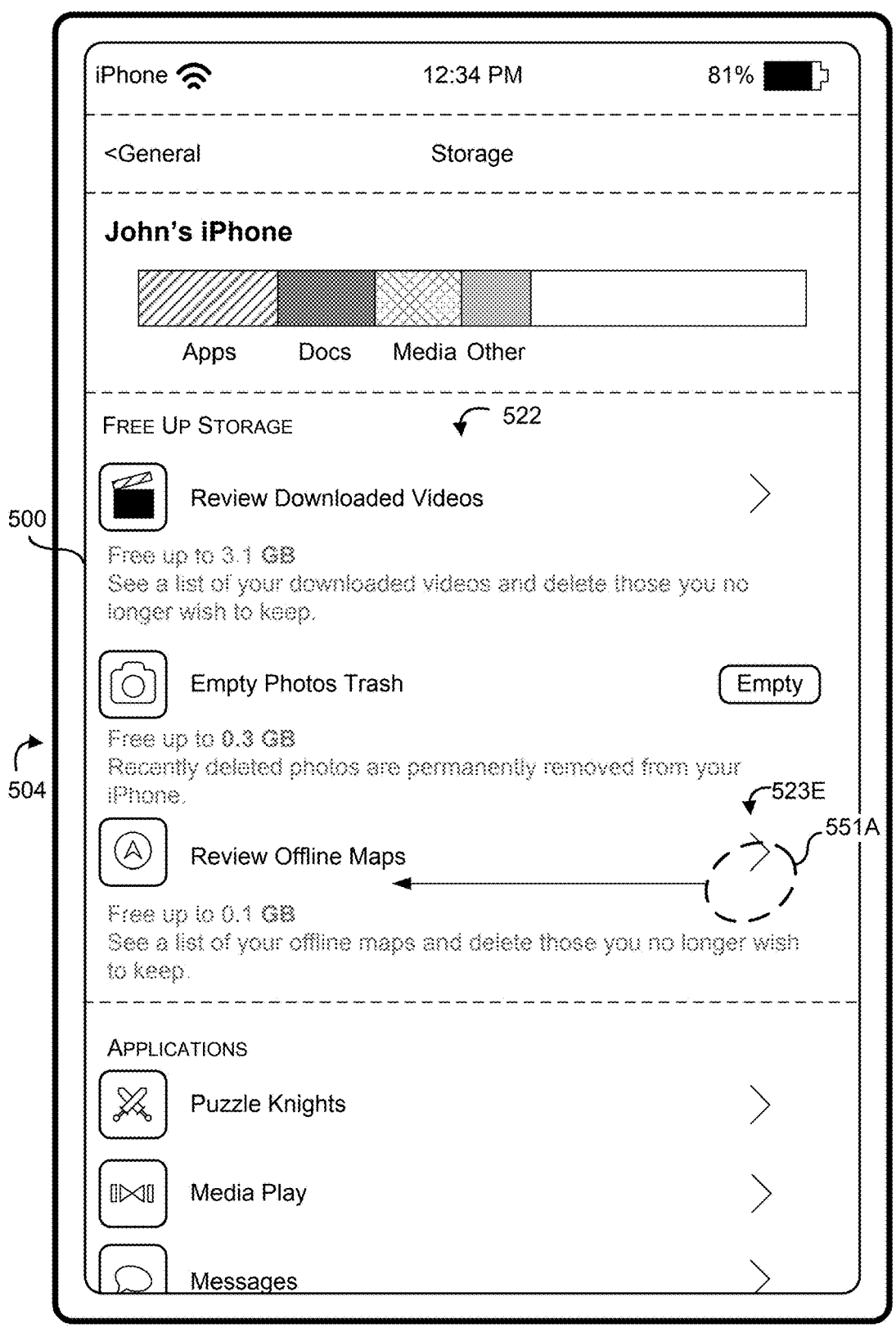
Figure 5A:
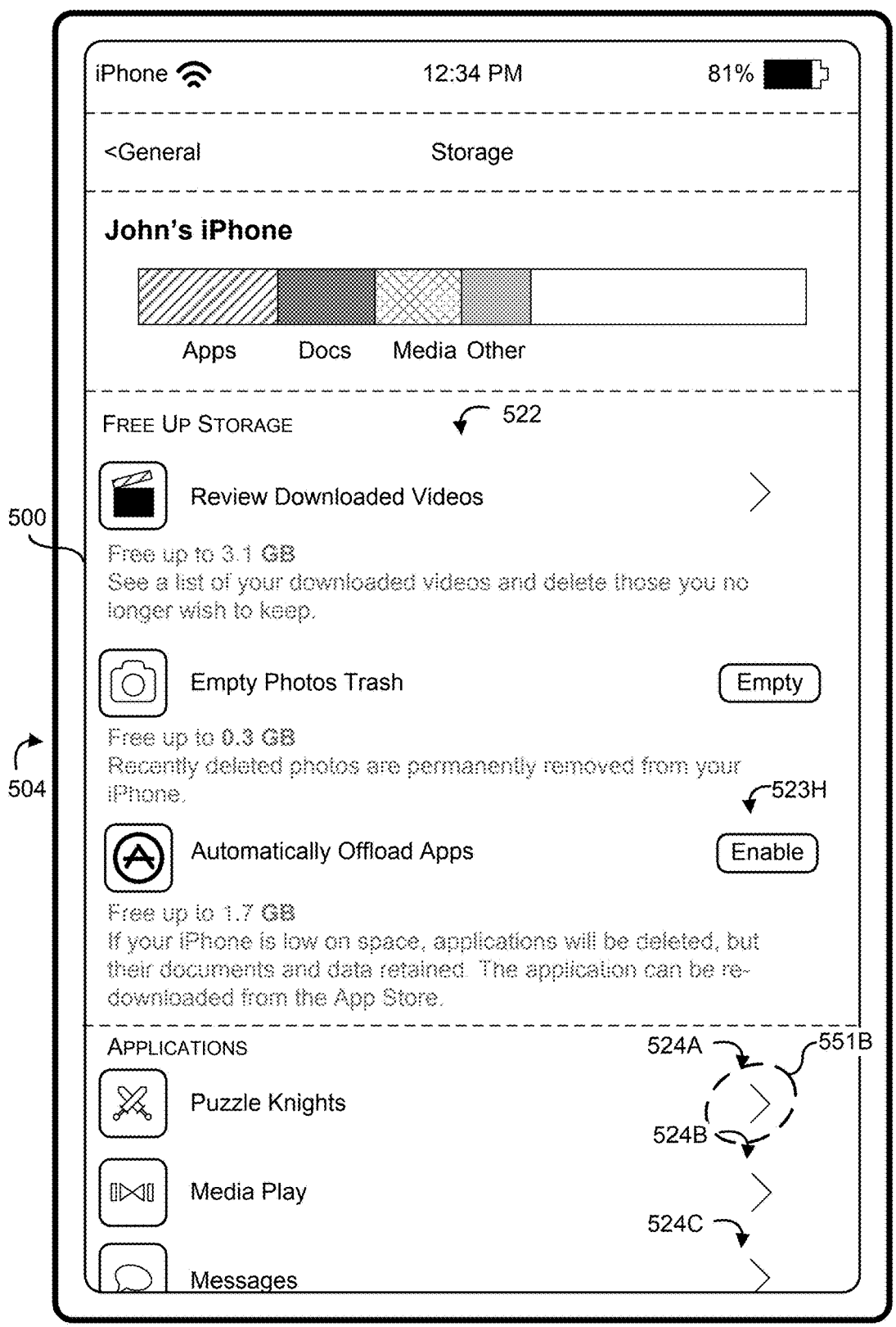
Figure 5A:
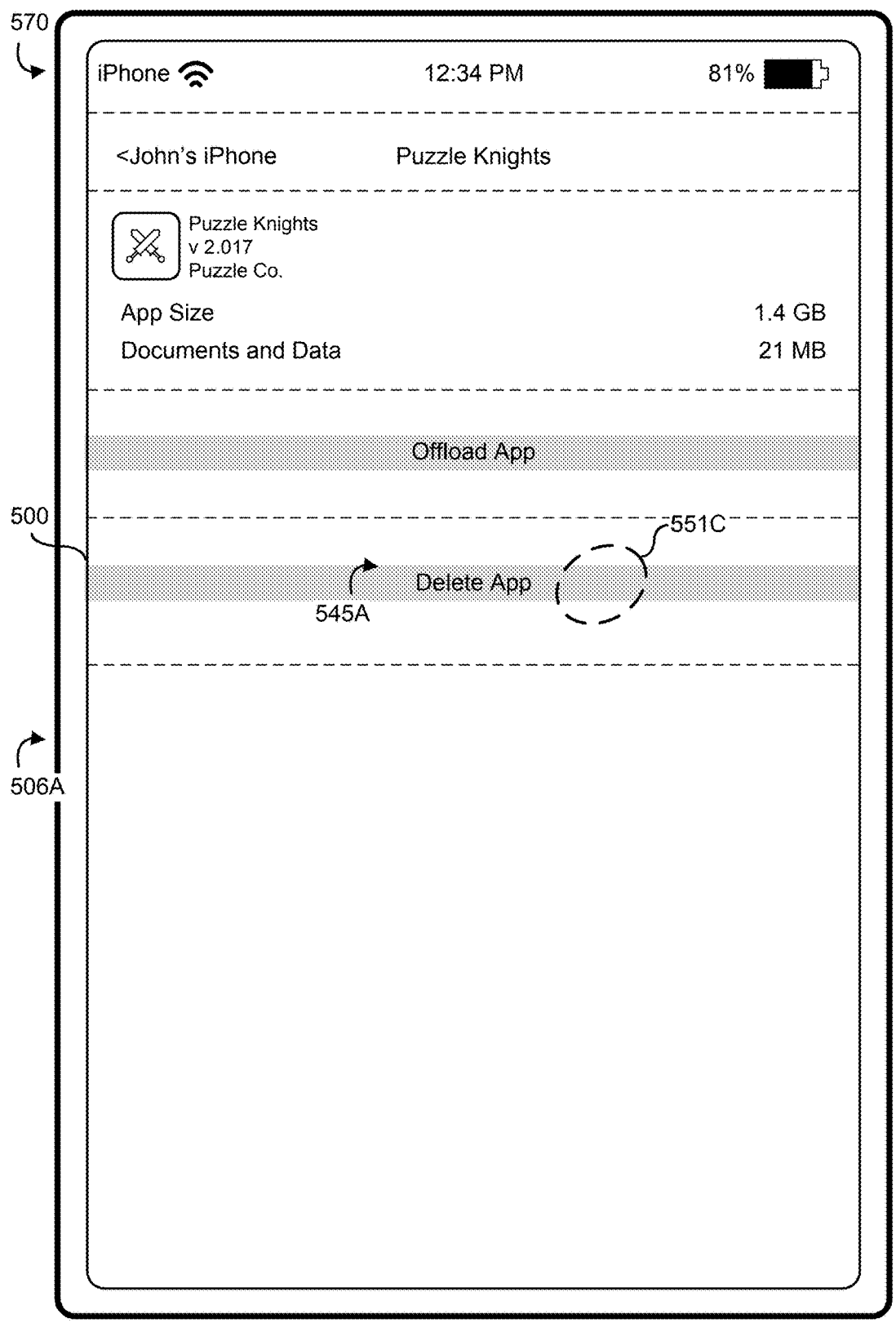
Figure 5A:
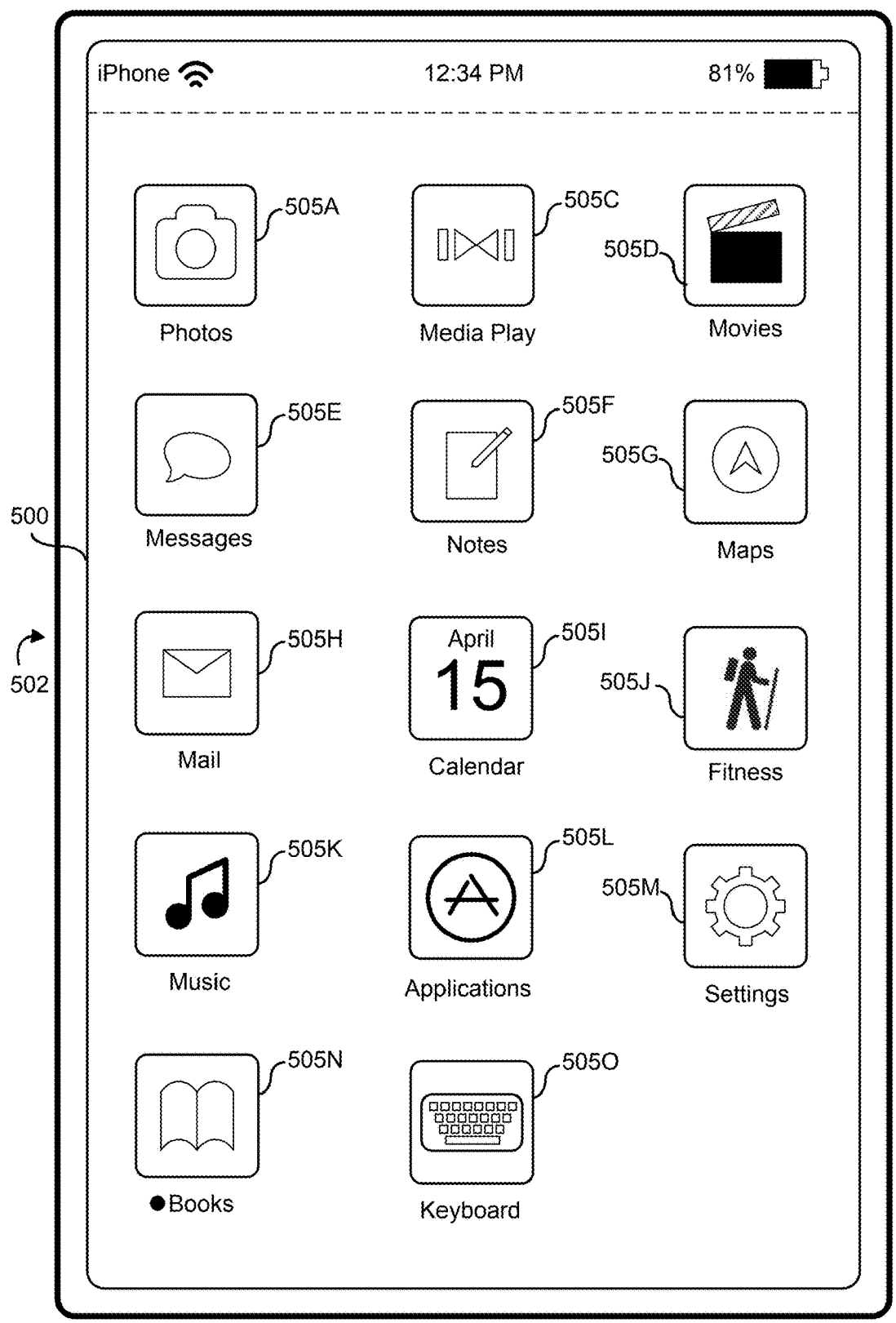
Figure 5A:
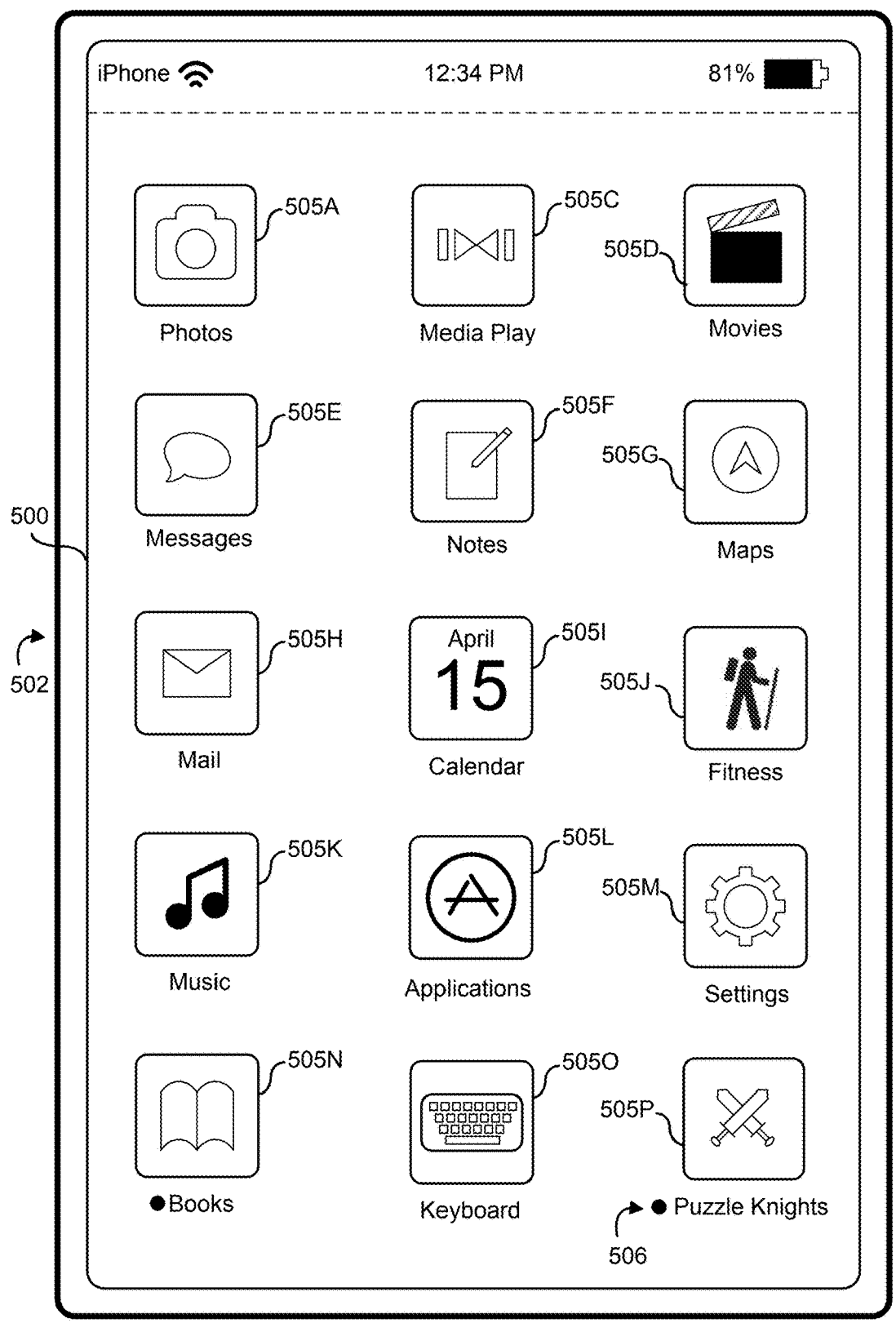
Figure 6A:
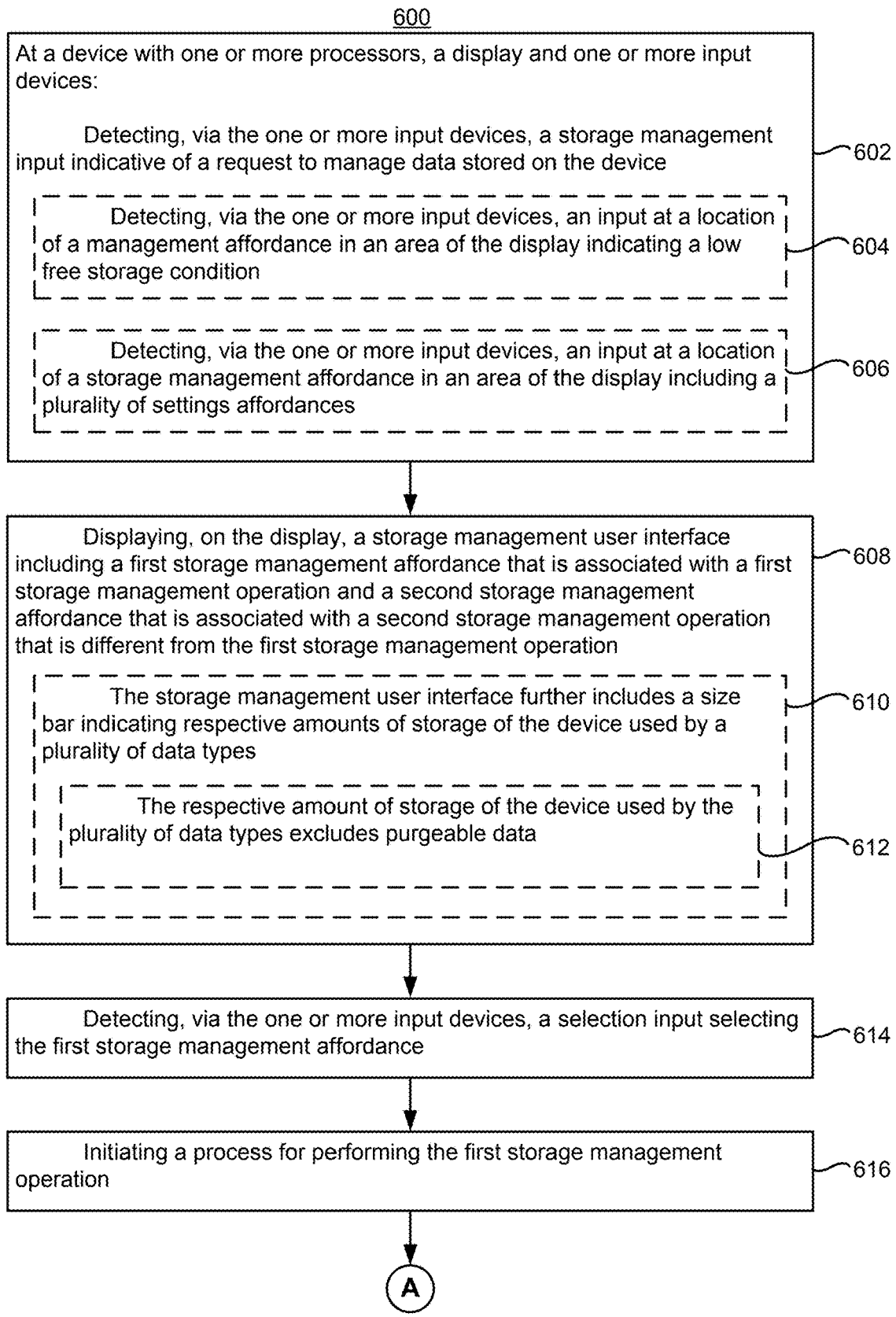
Figure 6B:
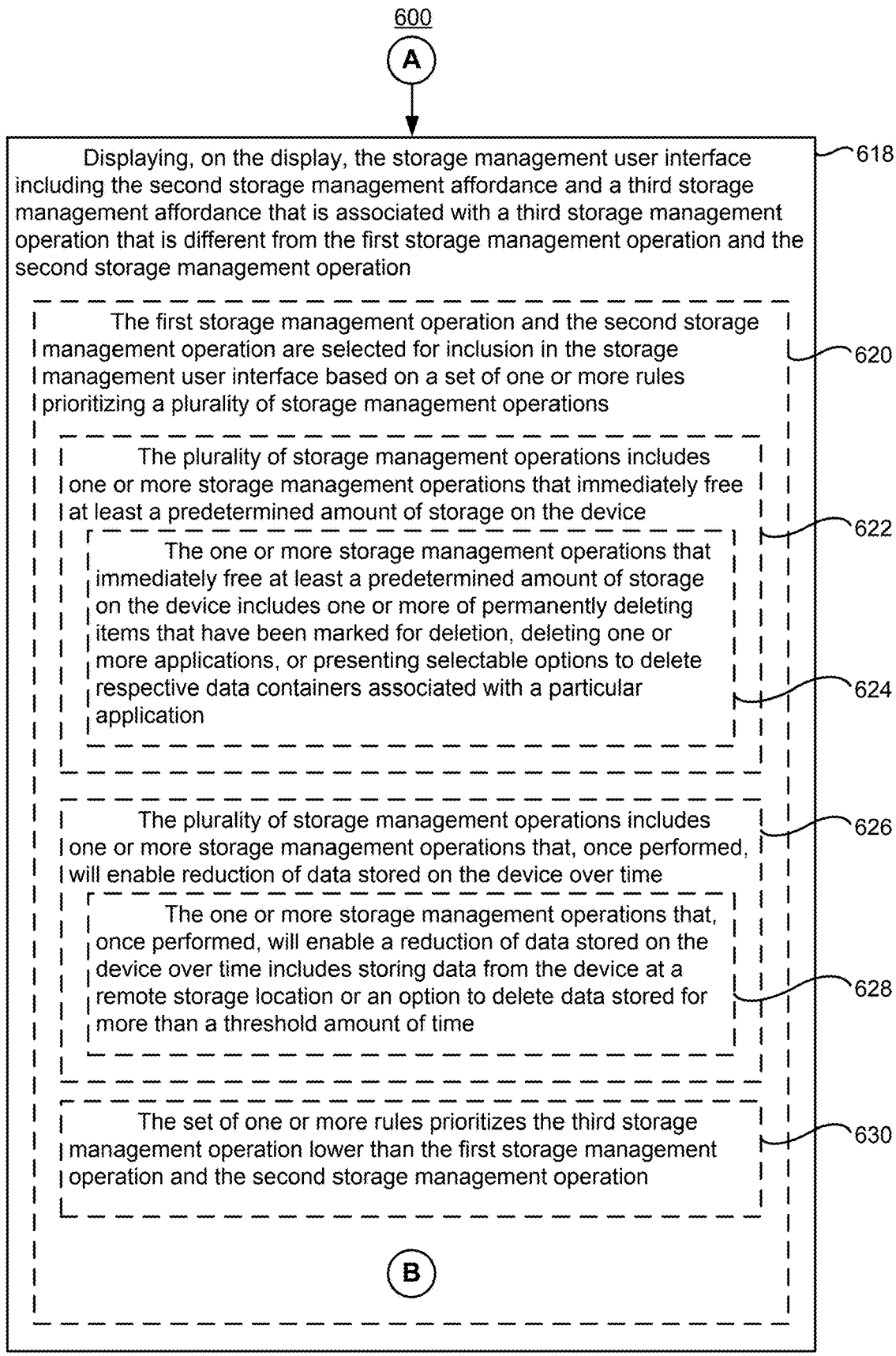
Figure 6D:
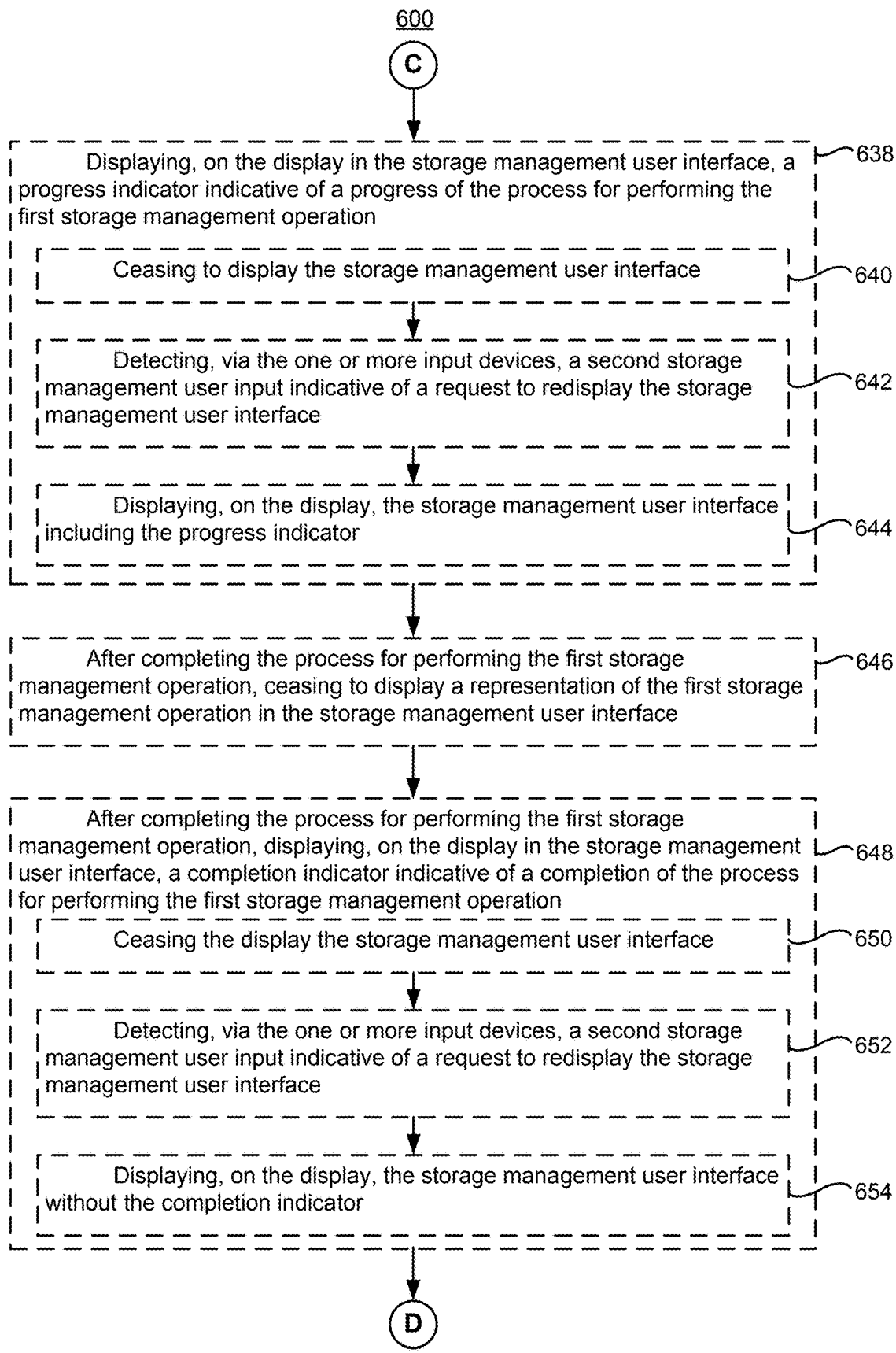
Figure 6E:
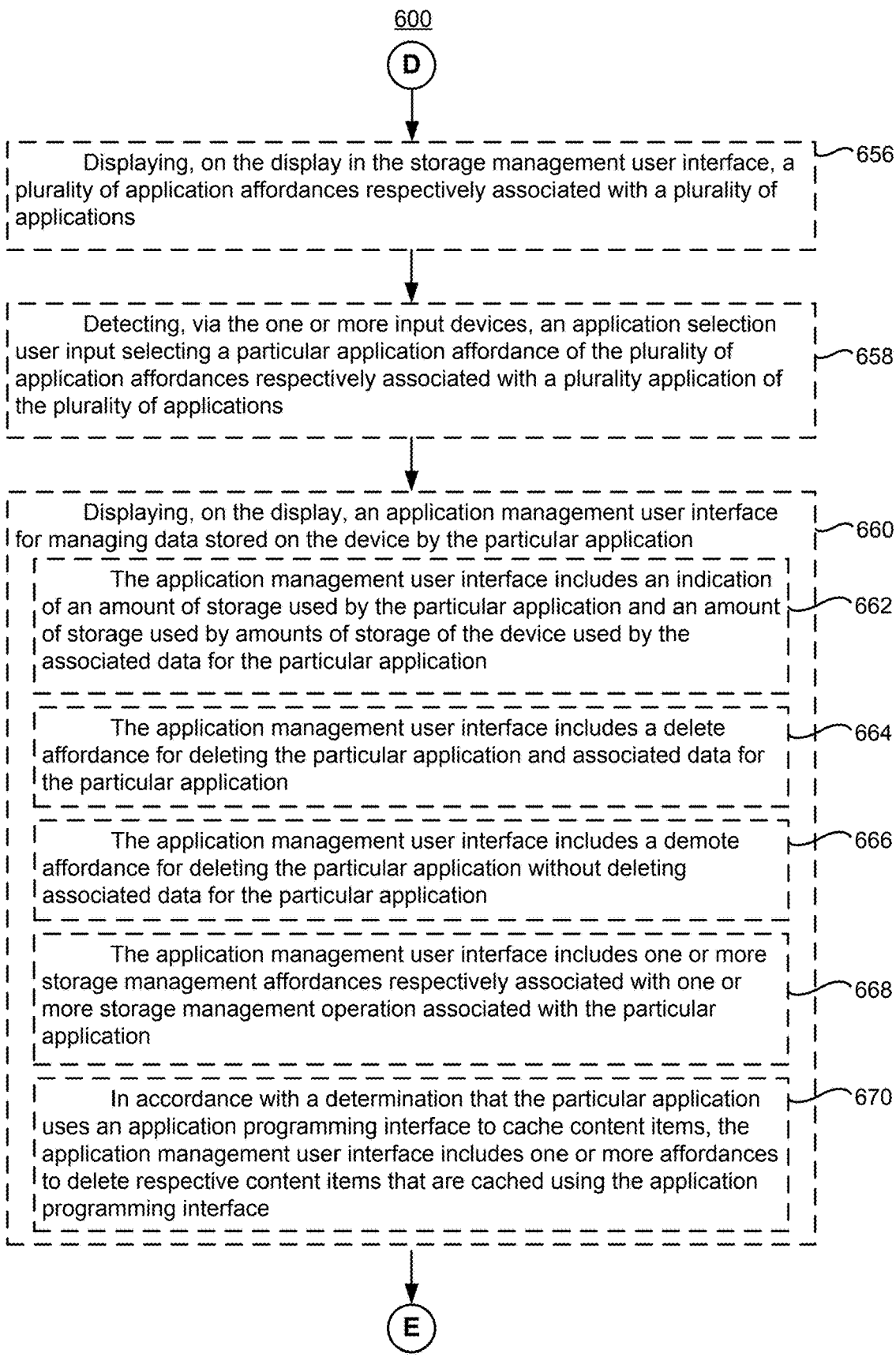
Figure 6F:
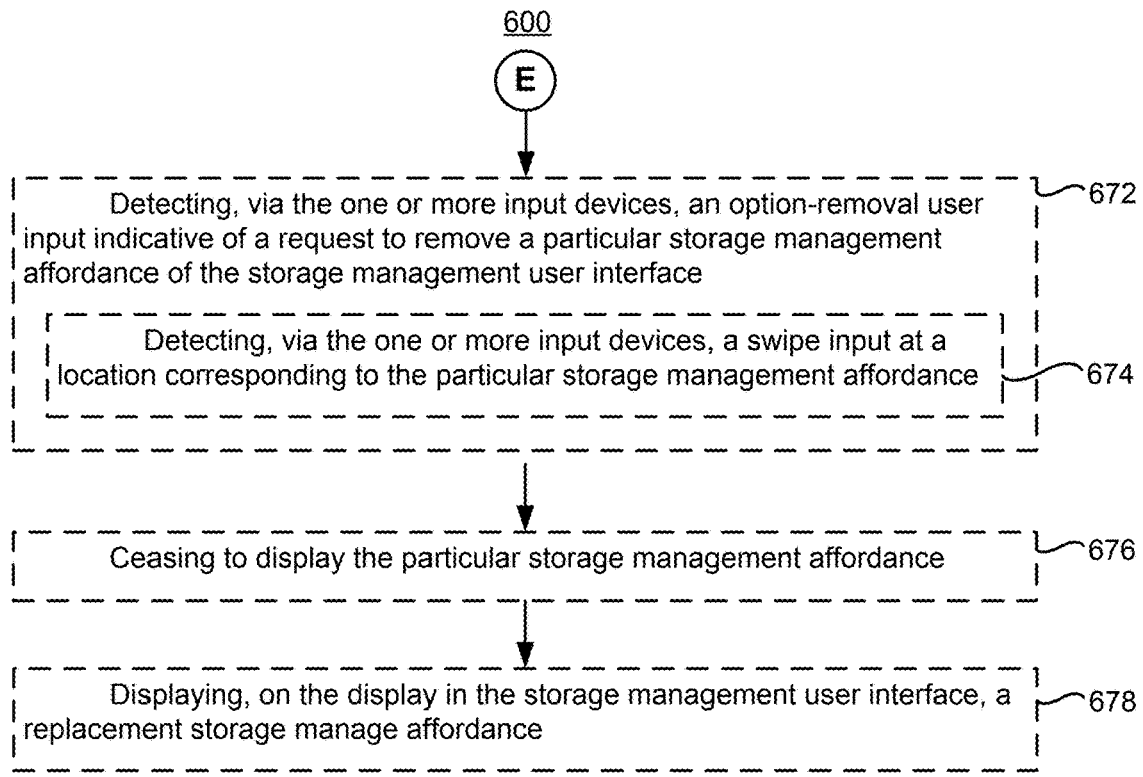

FIG. 5Z illustrates the user interface 500 of FIG. 5Y in response to detecting the swipe 550R at the location of one of the affordances 546B to delete one of the video files. In FIG. 5Z, the affordances 546B cease to include an affordance for the selected video file, indicating that the video file has been deleted. FIG. 5Z illustrates a contact 550S detected at the location of a return affordance 536 of the video player management user interface 506B.

FIG. 5AA illustrates the user interface 500 of FIG. 5Z in response to detecting the contact 550S at the location of the return affordance 536 of the video player management user interface 506B. The user interface 500 includes the storage management user interface 504 of FIG. 5X. FIG. 5AA illustrates a contact 550T detected at the location of an application affordance 524C associated with a messenger application.

FIG. 5AB illustrates the user interface 500 of FIG. 5AA in response to detecting the contact 550T at the location of the application affordance 524C associated with the messenger application. In FIG. 5AB, the user interface 500 includes a messenger management user interface 506C (displayed below the device bar 501). The messenger management user interface 506C is an application management user interface for managing data stored on the device by the messenger application.

The messenger management user interface 506C includes a metadata region 541C displaying information regarding the messenger application. The messenger management user interface 506C includes an application size indication 542C of the amount of storage of the device 100 used by the messenger application itself and an associated data size indication 543C of the amount of storage of the device 100 used by the messenger application for associated data. In various implementations, the associated data includes save files, game states, login information, player info, media content, documents (such as messages with or without attachments), etc.

The messenger management user interface 506C includes a demote affordance 544C for deleting the messenger application without deleting associated data for the messenger application (e.g., messages). The messenger management user interface 506C includes a delete affordance 545C for deleting the messenger application and associated data for the messenger application.

The messenger management user interface 506C includes a number of recommendations 547C and corresponding storage management affordances respectively associated with one or more storage management operation associated with the messenger application. For example, in FIG. 5AB, the recommendations 547C include a storage management affordance 523F for initiating a process for deleting messaging conversations older than 30 days and a storage management affordance 523G for initiating a process for reviewing large message attachments for deletion. In another application management user interface, other storage management affordances may be presented. For example, in various implementations, a photo management user interface includes the storage management affordance 523A that initiates a process for moving photographs to a cloud storage or the storage management affordance 523D that initiates a process for permanently deleting photos marked for deletion.

In place of the affordances 546B of the video player management user interface 506B, the messenger management user interface 506C includes a navigable hierarchy 548C of affordances representing data items of associated data of the messenger application. Such affordances can be manipulated (as described above with respect to the affordances 546B) to delete respective data items of associated data.

FIG. 5AB illustrates a contact 550U detected at the location of a return affordance 536 of the messenger management user interface 506C.

FIG. 5AC illustrates the user interface 500 of FIG. 5AB in response to detecting the contact 550U at the location of the return affordance 536 of the messenger management user interface 506C. The user interface 500 includes the storage management user interface 504 of FIG. 5X. FIG. 5AC illustrates a contact 550V detected at the location of an application affordance 524A associated with a game application.

FIG. 5AD illustrates the user interface 500 of FIG. 5AC in response to detecting the contact 550V at the location of the application affordance 524A associated with the game application. In FIG. 5AD, the user interface 500 includes a game management user interface 506A (displayed below the device bar 501). The game management user interface 506A is an application management user interface for managing data stored on the device by the game application.

The game management user interface 506A includes a metadata region 541A displaying information regarding the game application. The game management user interface 506A includes an application size indication 542A of the amount of storage of the device 100 used by the game application itself and an associated data size indication 543A of the amount of storage of the device 100 used by the game application for associated data. In various implementations, the associated data includes save files, game states, login information, player info, media content, documents, etc.

The game management user interface 506A includes a demote affordance 544A for deleting the game application without deleting associated data for the game application. The game management user interface 506A includes a delete affordance 545A for deleting the game application and associated data for the game application.

FIG. 5AD illustrates a contact 550W at the location of the demote affordance 544A.

FIG. 5AE illustrates the user interface 500 of FIG. 5AD in response to detecting the contact 550W at the location of the demote affordance 544A. The application size indication 542A of the amount of storage of the device 100 used by the game application has been reduced to 0 MB, but the associated data size indication 543A is unchanged, indicating that the game application itself has been deleted from the device 100 without deleting the associated data for the game application from the device 100. Further, the demote affordance 544A ceases to be displayed as the game application has already been deleted. In various implementations, the size of the game application if redownloaded is also displayed.

FIG. 5AF illustrates the user interface 500 of FIG. 5AE in response to detecting a request to display the application launching interface 502. In various implementations, the request to display the respective portion of the application launching interface is depression of a physical button, such as "home" or menu button 204 of FIG. 2. In response to detecting the request to display the application launching interface 502, the user interface 500 includes the application launching interface 502.

Even though the game application is deleted from the device, the application launching interface 502 includes the representation 505B of the game application in its designated location in the respective portion of the application launching user interface 502 (e.g., the same location as shown in FIG. 5A). The representation 505B of the game application includes a demotion indicia 509 (e.g., a cloud icon in FIG. 5AF) in association with the representation of the application indicating that the game application has been deleted from the device 100, but the associated data for the game application remains stored on the device 100. In various implementations, the representation 505B can be manipulated in a manner as though the game application was still installed on the device. For example, the representation 505B can be moved to other locations of the application launching user interface 502 or placed into folders of the application launching user interface 502.

FIG. 5AG illustrates the user interface 500 of FIG. 5AF with a contact 550X detected at the designated location of the representation 505B of the game application.

FIG. 5AH illustrates the user interface 500 of FIG. 5AG in response to detecting the contact 550X at the designated location of the representation 505B of the game application. In FIG. 5AH, the representation 505B of the game application is changed (e.g., dimmed in FIG. 5AH) to indicate that the game application is being downloaded to the device 100.

FIG. 5AI illustrates the user interface 500 of FIG. 5AH at a time point during the downloading of the game application. In FIG. 5AI, the representation 505B of the game application is changed to indicate a progress of downloading the game application to the device 100.

FIG. 5AJ illustrates the user interface 500 of FIG. 5AI once the game application has been downloaded to the device 100 and the stored associated data is associated with the downloaded game application. In FIG. 5AJ, the user interface 500 includes a game user interface 555 of the game application, indicating that the game application has launched. Thus, in various implementations, a single contact (e.g., the contact 550X in FIG. 5AG) re-downloads the game application, associates the stored associated data with the re-downloaded game application, and launches the game application.

In various implementations, the application is redownloaded and launched in response to the same user input so that, for a fast internet connection the user will be able to interact with the application as though it had not been demoted. In some embodiments, when the application is redownloaded and opened, it is opened with the user's application data for that application still accessible. In some embodiments, when the application is redownloaded and opened it is reopened in the state that it was in when the user demoted the application (e.g., with the same user interface or portion of a user interface displayed).

FIG. 5AK illustrates the user interface 500 of FIG. 5AJ in response to detecting a request to display the application launching interface 502. In various implementations, the request to display the respective portion of the application launching interface is depression of a physical button, such as "home" or menu button 204 of FIG. 2. In response to detecting the request to display the application launching interface 502, the user interface 500 includes the application launching interface 502. In FIG. 5AK, the demotion indicia 509 ceases to be displayed, indicating that the application is fully installed on the device 100. FIG. 5AK illustrates a contact 550Y detected at the location of the representation 505M of the settings application.

FIG. 5AL illustrates the user interface 500 of FIG. 5AK in response to detecting the contact 550Y at the location of the representation 505M of the settings application. In FIG. 5AL, the application launching interface 502 is replaced with the general settings user interface 504. FIG. 5AL illustrates a contact 550Z at the location of the storage management affordance 525D of the general settings user interface 504.

FIG. 5AM illustrates the user interface 500 of FIG. 5AL in response to detecting the contact 550Z at the location of the storage management affordance 525D. In FIG. 5AM, the general settings user interface 504 is replaced with the storage management user interface 503. FIG. 5AM illustrates a swipe 551A detected at a location of one of the recommendations 522 corresponding to the storage management affordance 523E for initiating a process for reviewing offline maps for deletion.

FIG. 5AN illustrates the user interface 500 of FIG. 5AL in response to detecting the swipe 551A. In FIG. 5AN, the recommendations 522 of the storage management user interface 503 have changed in that the storage management affordance 523E for initiating a process for reviewing offline maps for deletion is replaced with a storage management affordance 523H for initiating a process to enable automatic demotion of applications.

When automatic demotion of applications is enabled, the device 100 demotes applications (e.g., deletes the application without deleting associated data for the application) without instruction from a user. In various implementations, the automatic demotion of applications is based on one or more of an amount of free storage of the device, a size of an application (and, optionally the size of associated data in relation thereto), or a time of last-use of an application (e.g., when the application was last launched). In various implementations, the time of last-use includes use of the application as an extension even if the application has not been launched on the device. For example, a fitness application (having a representation 505J in FIG. 5A) used recently on a connected device, such as a watch, has a time of last-use corresponding to its use on the connected device. As another example, a custom keyboard application (having a representation 5050 in FIG. 5A) used recently in a messenger application has a time of last-use corresponding to its use in the messenger application.

Thus, in various implementations, the device 100 selects an application for demotion when the amount of free storage of the device is less than a threshold amount. In various implementations, the device 100 is more likely to select a larger application than a smaller application. In various implementations, the device 100 is more likely to select an application that has a more remote time of last-use than an application that has a more recent time of last-use.

FIG. 5AN illustrates a contact 551B detected at the location of the application affordance 524A associated with the game application.

FIG. 5AO illustrates the user interface 500 of FIG. 5AN in response to detecting the contact 551B at the location of the application affordance 524A associated with the game application. In FIG. 5AO, the user interface 500 includes the game management user interface 506A of FIG. 5AC. FIG. 5AO illustrates a contact 551C detected at the location of the delete affordance 545A. In response to detecting the contact 551C at the location of the delete affordance 545A, the device 100 deletes the game application and deletes the associated data for the application. In some circumstances, such as when the application is demoted, the device deletes only the associated data for the application (because the application is already deleted).

FIG. 5AP illustrates the user interface 500 of FIG. 5AO in response to detecting the detecting a request to display the application launching interface 502. In various implementations, the request to display the respective portion of the application launching interface is depression of a physical button, such as "home" or menu button 204 of FIG. 2. In response to detecting the request to display the application launching interface 502, the user interface 500 includes the application launching interface 502.

In FIG. 5AP, the representations 505A and 505C-5050 do not include the representation 505B for the game application as the application (and its associated data) have been deleted from the device 100.

FIG. 5AQ illustrates the user interface 500 of FIG. 5AP after the game application has been reinstalled. The user interface 500 includes the application launching interface 502 including representations 505A and 505C-5050. The application launching interface 502 includes a new representation 505P for the game application, not in the designated location of FIG. 5A, but in a predefined location for newly installed applications. Further, in FIG. 5AP, the new representation 505P includes a recency indicator 506 indicated that the game application has been newly installed.

FIGS. 6A-6F illustrate a flow diagram of a method 600 of managing data stored on a device in accordance with some embodiments. The method 600 is performed at an electronic device (e.g., the portable multifunction device 100 in FIG. 1A, or the device 300 in FIG. 3) with one or more processors, a display, and one or more input devices. In some embodiments, the display is a touch-screen display and at least one of the input devices is integrated with the display. In some embodiments, the display is separate from the one or more input devices. Some operations in method 600 are, optionally, combined and/or the order of some operations is, optionally, changed.

As described below, the method 600 provides an intuitive way to manage data stored on a device. The method reduces the cognitive burden on a user when managing data stored on a device, thereby creating a more efficient human-machine interface. For battery-operated electronic devices, enabling a user to manage data stored on a device faster and more efficiently conserves power and increases the time between battery charges.

The device detects (602), via the one or more input devices, a storage management input indicative of a request to manage data stored on the device. For example, in FIG. 5B, the device detects a contact 550A at a location of a management affordance 508B of a notification window 507. As another example, in FIG. 5E, the device detects a contact 550C at a location of a storage management affordance 525D of a settings user interface 504.

In some embodiments, in detecting the storage management input, the device detects (604), via the one or more input devices, an input at a location of a management affordance in an area of the display indicating a low free storage condition. For example, in FIG. 5B, the device detects a contact 550A at a location of a management affordance 508B of a notification window that indicates a low free storage condition. In some embodiments, in detecting the storage management input, the device detects (606), via the one or more input devices, an input at a location of a storage management affordance in an area of the display including a plurality of settings affordances. For example, in FIG. 5E, the device detects a contact 550C at a location of a storage management affordance 525D of a settings user interface 504 that includes a plurality of settings affordances 525A-525E.

In response to detecting the storage management input, the device displays (608), on the display, a storage management user interface including a first storage management affordance that is associated with a first storage management operation and a second storage management affordance that is associated with a second storage management operation that is different from the first storage management operation. The storage management user interface provides an efficient mechanism for a user to manage storage, thus reducing the amount of user interaction to perform storage management operations. The reduction in user interaction reduces wear-and-tear of the device. The reduction in user interaction also results in faster initiation of the performance of the storage management operations and, thus, reduces power drain to perform the storage management operations, increasing battery life of the device. Further, providing an efficient mechanism for a user to manage storage increases the likelihood that a user will perform such management and improve performance of the device. For example, in FIG. 5C, the device displays a storage management user interface 503 that includes a first storage management affordance 523A associated with a first storage management operation (e.g., moving photographs to a cloud storage) and a second storage management affordance 523B associated with a second storage management operation (e.g., reviewing downloaded videos for deletion) that is different from the first storage management operation.

In some embodiments, the storage management user interface further includes (610) a size bar indicating respective amounts of storage of the device used by a plurality of data types. Providing an indication to a user of the respective amounts of storage used by a plurality of data types efficiently guides the user to perform storage management operations with maximum effect, causing less data to be stored on the device. With less data stored on the device, memory reads are faster and more storage is available for use as virtual processor cache, speeding up other operations. Further, by storing less data on the device, fewer or smaller (and less expensive) storage devices are needed on the device. For example, in FIG. 5C, the storage management user interface 503 includes a size bar 521 that indicates respective amount of storage of the device used by applications, documents, media content, and other data. In some embodiments, the respective amount of storage of the device used by the plurality of data types excludes (612) purgeable data. For example, in FIG. 5C, the size bar 521 does not reflect storage of the device used by data the device can delete without further authorization by the user, such as data that is already stored in the cloud.

While displaying the storage management user interface, the device detects (614), via the one or more input devices, a selection input selecting the first storage management affordance. For example, in FIG. 5H, the device detects a contact 550E at the location of the storage management affordance 523A that initiates a process for moving photographs to a cloud storage.

In response to detecting the selection input, the device initiates (616) a process for performing the first storage management operation. For example, in FIG. 5I, in response to detecting the contact 550E at the location of the storage management affordance 523A, the device has initiated the process for moving photographs to a cloud storage, as indicated by the progress indicator 526.

After initiating the process for performing the first storage management operation, the device displays (618), on the display, the storage management user interface including the second storage management affordance and a third storage management affordance that is associated with a third storage management operation that is different from the first storage management operation and the second storage management operation. Including a third storage management affordance in the storage management user interface efficiently provides an option for a user to perform additional storage management operations and reduce the amount data stored on the device. With less data stored on the device, memory reads are faster and more storage is available for use as virtual processor cache, speeding up other operations. For example, in FIG. 5I, the device displays the storage management user interface 503 that includes the second storage management affordance 523B associated with a second storage management operation (e.g., reviewing downloaded videos for deletion) and a third storage management affordance 523E associated with a third storage management operation (e.g., reviewing offline maps for deletion) that is different from the first storage management operation and the second storage management operation.

In some embodiments, the first storage management operation and the second storage management operation are selected (620) for inclusion in the storage management user interface based on a set of one or more rules prioritizing a plurality of storage management operations. Prioritizing a plurality of storage operations for inclusion in the storage management user interface uses the space on the screen more efficiently, resulting in a more efficient human-machine interface (as a user need not manipulate the user interface to find affordances for performing selected storage management operations. For battery-operated electronic devices, a more efficient human-machine user interface conserves power and increases the time between battery charges. Further, a more efficient human-machine user interface reduces the amount of user interaction with the device and reduces wear-and-tear of the device. By using less space on the screen, a smaller (and less expensive) screen can provide the same usability. For example, in FIG. 5C, the storage management operation of moving photos to a cloud storage, the storage management operation of reviewing downloaded videos for deletion, and the storage management operation of permanently deleting notes marked for deletion are included to the exclusion of the storage management operation of permanently deleting photos marked for deletion (shown in FIG. 5H) and the storage management operation of reviewing offline maps for deletion (shown in FIG. 5I).

In some embodiments, the plurality of storage management operations includes (622) one or more storage management operations that immediately free at least a predetermined amount of storage on the device. In some embodiments, the one or more storage management operations that immediately free at least a predetermined amount of storage on the device includes (624) one or more of permanently deleting items that have been marked for deletion, deleting one or more applications, or presenting selectable options to delete respective data containers associated with a particular application. For example, in FIG. 5C, the storage management user interface 503 includes a storage management affordance 523C associated with a storage management operation of permanently deleting notes that have marked for deletion. In FIG. 5AN, the storage management user interface 503 includes a storage management affordance 523H associated with a storage management operation of deleting one or more applications. In Figure SI, the storage management user interface 503 includes a storage management affordance 523E associated with a storage management operation presenting selectable options to delete respective data containers associated with a particular application.

In some embodiments, the plurality of storage management operations includes (626) one or more storage management operations that, once performed, will enable reduction of data stored on the device over time. In some embodiments, the one or more storage management operations that, once performed, will enable a reduction of data stored on the device over time includes (628) storing data from the device at a remote storage location or an option to delete data stored for more than a threshold amount of time. For example, in FIG. 5C, the storage management user interface 503 includes a storage management affordance 523A associated with a storage management operation for storing data (e.g., photos) from the device at a remote storage location. As another example, in FIG. 5AB, the device displays a storage management affordance 523F associated with a storage management operation for deleting data (e.g., messages) stored for more than a threshold amount of time (e.g., 30 days).

In some embodiments, the set of one or more rules prioritizes (630) the third storage management operation lower than the first storage management operation and the second storage management operation. For example, in FIG. 5C, the storage management affordance 523E associated with a third storage management operation (e.g., reviewing offline maps for deletion) is not shown, but the storage management affordance 523E is shown in FIG. 5I.

In some embodiments, the set of one or more rules includes a rule that prioritizes (632) the plurality of storage management operations based on respective amounts of storage of the device freed by different storage management operations in the plurality of storage management operations. Prioritizing storage management operations that reduce more space increases the likelihood that such operations will be performed, reducing the amount of data stored by the device. With less data stored on the device, memory reads are faster and more storage is available for use as virtual processor cache, speeding up other operations. Further, by storing less data on the device, fewer or smaller (and less expensive) storage devices are needed on the device. For example, in FIG. 5C, the storage management affordance 523C that initiates a process for permanently deleting notes marked for deletion (freeing 0.6 GB) is displayed, whereas a storage management affordance that initiates a process for permanently deleting photos marked for deletion (shown later in FIG. 5G and freeing 0.3 GB) is not displayed.

In some embodiments, the set of one or more rules includes a rule that prioritizes (634) the plurality of storage management operations based on respective timeframes in which storage of the device is freed by the different storage management operations in the plurality of storage management operations. Prioritizing storage management operations that, when performed, enable a reduce of data stored on the device over time increase the likelihood that such operations will be performed, reducing the amount of data stored by the device with only a single user interaction. Thus, with minimal battery usage and wear-and-tear, less data is stored on the device resulting in faster memory reads and more storage available for use as virtual processor cache. For example, in FIG. 5C, the storage management affordance 523A that initiates a process for moving photographs to a cloud storage is displayed, whereas a storage management affordance that initiates a process for permanently deleting photos marked for deletion (shown later in FIG. 5G) is not displayed.

In some embodiments, the set of one or more rules includes a rule that prioritizes (636) the plurality of storage management operations based on respective data loss of the different storage management operations in the plurality of storage management operations. For example, in FIG. 5C, the storage management affordance 523A that initiates a process for moving photographs to a cloud storage (an operation without data loss as the photographs can be retrieved from the cloud storage to the device) is displayed, whereas a storage management affordance that initiates a process for permanently deleting photos marked for deletion (shown later in FIG. 5G and an operation with data loss as the deleted photos cannot be recovered) is not displayed.

In some embodiments, after initiating the process for performing the first storage management operation, the device displays (638), on the display in the storage management user interface, a progress indicator indicative of a progress of the process for performing the first storage management operation. For example, in FIG. 5I, the device displays, in the storage management user interface 503, a progress indicator 526 indicative of a progress of the process for moving photos from the device to the cloud.

In some embodiments, after initiating the process for performing the first storage management operation, the device ceases (640) to display the storage management user interface. For example, in FIG. 5J, in response to detecting the contact 550F at the location of a return affordance 527 of the storage management user interface 503, the device ceases to display the storage management user interface 503 (and, instead, displays the settings user interface 504). The device detects (642), via the one or more input devices, a second storage management user input indicative of a request to redisplay the storage management user interface. For example, in FIG. 5J, the device detects a contact 550G at the location of the storage management affordance 525D. In response to detecting the second storage management user input, the device displays (644), on the display, the storage management user interface including the progress indicator. Continuing to display the storage management affordance (with a progress indicator) when the storage management user interface is redisplayed provides a more efficient human-machine interface by reducing interaction with the device to, e.g., unnecessarily attempt to initiate performance of the storage management operation already being performed. Reduced interaction with the device increases the time between battery charges and reduces wear-and-tear to the device. For example, in FIG. 5K, in response to detecting the contact 550G at the location of the storage management affordance 525D, the device displays the storage management user interface 504 including the progress indicator 526.

In some embodiments, after completing the process for performing the first storage management operation, the device ceases (646) to display a representation of the first storage management operation in the storage management user interface. Ceasing to display the storage management affordance for a storage management operation that is completed provides a more efficient human-machine interface by increasing the screen space available to display other storage management affordances. For example, in FIG. 5L, after the process for moving photos to a cloud storage is complete, the device ceases to display the recommendation to move photos to a cloud storage. Further, the device ceases to display the progress indicator 526 of that recommendation.

In some embodiments, after completing the process for performing the first storage management operation, the device displays (648), on the display in the storage management user interface, a completion indicator indicative of a completion of the process for performing the first storage management operation. For example, in FIG. 5M, the device displays the completion indicator 527 indicative of completion of the process for performing movement of photos to a cloud storage.

In some embodiments, after completing the process for performing the first storage management operation, the device ceases (650) to display the storage management user interface. For example, in FIG. 5O, in response to detecting the contact 550I at the location of a return affordance 527 of the storage management user interface 503, the device ceases to display the storage management user interface 503 (and, instead, displays the settings user interface 504). The device detects (652), via the one or more input devices, a second storage management user input indicative of a request to redisplay the storage management user interface. For example, in FIG. 5P, the device detects a contact 550J at the location of the storage management affordance 525D. In response to detecting the second storage management user input, the device displays (654), on the display, the storage management user interface without the completion indicator. For example, in FIG. 5Q, in response to detecting the contact 550J at the location of the storage management affordance 525D, the device displays the storage management user interface 504 without the recommendation to move photos to a cloud storage. Further, the device ceases to display the completion indicator 527 of that recommendation.

In some embodiments, the device displays (656), on the display in the storage management user interface, a plurality of application affordances respectively associated with a plurality of applications. For example, in FIG. 5X, the device displays the storage management user interface 504 including a plurality of application affordances 524A-524C respectively associated with a plurality of applications.

In some embodiments, the device detects (658), via the one or more input devices, an application selection user input selecting a particular application affordance of the plurality of application affordances respectively associated with a plurality application of the plurality of applications. For example, in FIG. 5X, the device detects a contact 550Q at the location of an application affordance 524B associated with a video player application. As another example, in FIG. 5AA, the device detects a contact 550T at the location of an application affordance 524C associated with a messenger application.

In some embodiments, in response to detecting the application selection user input, the device displays (660), on the display, an application management user interface for managing data stored on the device by the particular application. Displaying an application management user interface provides an efficient human-machine interface for managing data stored on the device by a particular application, reducing the amount of interaction with the device to reduce the amount of data stored on the device. Reducing the amount of interaction with the device converses power and reduces wear-and-tear on the device. Reducing the amount of data stored on the device results in faster memory reads and speedier processor performance. For example, in FIG. 5Y, the device displays a video player management user interface 506B, an application management user interface for managing data stored on the device by the video player application. As another example, in FIG. 5AB, the device displays a messenger management user interface 506C, an application management user interface for managing data stored on the device by the messenger application.

In some embodiments, the application management user interface includes (662) includes an indication of an amount of storage used by the particular application and an amount of storage used by amounts of storage of the device used by the associated data for the particular application. For example, in FIG. 5Y, the video player management user interface 506B includes an application size indication 542B of the amount of storage of the device 100 used by the video player application itself and an associated data size indication 543B of the amount of storage of the device 100 used by the video player application for associated data.

In some embodiments, the application management user interface includes (664) includes a delete affordance for deleting the particular application and associated data for the particular application. For example, in FIG. 5Y, the video player management user interface 506B includes a delete affordance 545B for deleting the video player application and associated data for the video player application.

In some embodiments, the application management user interface includes (666) a demote affordance for deleting the particular application without deleting associated data for the particular application. For example, in FIG. 5Y, the video player management user interface 506B includes a demote affordance 544B for deleting the video player application without deleting associated data for the particular application. Details regarding the demote affordance and demoting applications are described below with respect to FIGS. 7A-7B.

In some embodiments, the application management user interface includes (668) one or more storage management affordances respectively associated with one or more storage management operation associated with the particular application. For example, in FIG. 5AB, the messenger management user interface 506C includes a number of recommendations 547C and corresponding storage management affordances respectively associated with one or more storage management operation associated with the messenger application.

In some embodiments, in accordance with a determination that the particular application uses an application programming interface to cache content items, the application management user interface includes (670) one or more affordances to delete respective content items that are cached using the application programming interface. For example, in FIG. 5Y, the video player management user interface 506C includes affordances 546B to delete respective video files that are cached using the application programming interface.

In some embodiments, the device detects (672), via the one or more input devices, an option-removal user input indicative of a request to remove a particular storage management affordance of the storage management user interface. In some embodiments, the device detects (674), via the one or more input devices, a swipe input at a location corresponding to the particular storage management affordance. For example, in FIG. 5F, the device detects a swipe 550D at the recommendation 522 including the storage management affordance 523C.

In some embodiments, in response to detecting the option-removal user input, the device ceases (676) to display the particular storage management affordance and displays (678), on the display in the storage management user interface, a replacement storage management affordance. For example, in FIG. 5H, the device ceases to display the storage management affordance 523C and displays, in the storage management user interface 504, the storage management affordance 523D.

It should be understood that the particular order in which the operations in FIGS. 6A-6F have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6F. For example, the user interfaces and constituent affordances described above with reference to method 600 optionally have one or more of the characteristics of the user interfaces and constituent affordances described herein with reference to other methods described herein (e.g., method 700). For brevity, these details are not repeated here.

FIGS. 7A-7B illustrate a flow diagram of a method 700 of demoting an application in accordance with some embodiments. The method 700 is performed at an electronic device (e.g., the portable multifunction device 100 in FIG. 1A, or the device 300 in FIG. 3) with one or more processors, a display, and one or more input devices. In some embodiments, the display is a touch-screen display and at least one of the one or more input devices are integrated with the display. In some embodiments, the display is separate from the one or more input devices. Some operations in method 700 are, optionally, combined and/or the order of some operations is, optionally, changed.

As described below, the method 700 provides an intuitive way to demote an application. The method reduces the cognitive burden on a user when demoting an application, thereby creating a more efficient human-machine interface. For battery-operated electronic devices, enabling a user to demote an application faster and more efficiently conserves power and increases the time between battery charges.

While an application is installed on the device and a representation of the application has a designated location in a respective portion of an application launching user input, the device detects (702), via the one or more input devices, an application-demotion request to delete the application from the device without deleting the associated data for the application. Deleting the application from the device reduces the amount of data stored on the device. With less data stored on the device, memory reads are faster and more storage is available for use as virtual processor cache, speeding up other operations. Further, by storing less data on the device, fewer or smaller (and less expensive) storage devices are needed on the device. For example, in FIG. 5AD, the device detects a contact 550W at the location of a demote affordance 544A for deleting a game application without deleting associated data for the game application.

In some embodiments, in detecting the application-demotion request, the device detects (704), via the one or more input devices, selection of an application-demotion affordance associated with the application. For example, in FIG. 5AD, the device detects a contact 550W at the location of a demote affordance 544A for deleting a game application without deleting associated data for the game application.

In some embodiments, in detecting the application-demotion request, the device detects (706), via the one or more input devices, selection of an option to enable automatic demotion of applications. Enabling automatic demotion of an application increases the likelihood that an application will be demoted, reducing the amount of data stored on the device. Reducing the amount of data stored on the device increases the speed of memory reads and processing using virtual processor cache. For example, in FIG. 5AN, the device displays a storage management affordance 523H for initiating a process to enable automatic demotion of applications. In some embodiments, the automatic demotion of applications is based on (708) one or more of an amount of free storage of the device, a size of an application, and a time of last-use of an application. As described above, when automatic demotion of applications is enabled, the device demotes applications without instruction from a user. In various implementations, the automatic demotion of applications is based on one or more of an amount of free storage of the device, a size of an application, or a time of last-use of an application. In some embodiments, the time of last-use is based on (710) use of the application as an extension even if the application has not been launched on the device. For example, a fitness application (having a representation 505J in FIG. 5A) used recently on a connected device, such as a watch, has a time of last-use corresponding to its use on the connected device. As another example, a custom keyboard application (having a representation 5050 in FIG. 5A) used recently in a messenger application has a time of last-use corresponding to its use in the messenger application.

In response to detecting the application-demotion request, the device deletes (712) the application from the device without deleting the associated data for the application. For example, in FIG. 5AE, the game application has been deleted (as indicated by the application size indicator 542A indicating a storage use of 0 MB) from the device, but the associated data from the application has not been deleted (as indicated by the associated data size indication 543A indicative a storage use of 21 MB).

After deleting the application from the device, the device detects (714) a request to display the respective portion of the application launching interface. For example, in various implementations, the request to display the respective portion of the application launching interface is depression of a physical button, such as "home" or menu button 204 of FIG. 2.

In response to detecting the request to display the respective portion of the application launching user interface, the device displays (716), on the display, the respective portion of the application launching user interface, including displaying the representation of the application in the designated location in the respective portion of the application launching user interface. Continuing to display the representation of the application in the designated location provides an efficient mechanism for the user to redownload the application without, e.g., navigating to an application store, search for the application, download the application, and reposition the representation at a user-preferred location. The reduction in user interaction reduces wear-and-tear of the device. The reduction in user interaction also reduces power drain to redownload the application, increasing battery life of the device. For example, in FIG. 5AF, the device displays the application launching user interface 502 with the representation 505B of the game application in its designated location (e.g., the same location as illustrated in FIG. 5A).

In some embodiments, the device displays (718) a demotion indicia in association with the representation of the application. For example, in FIG. 5AF, the device displays the demotion indicia 509 (e.g., a cloud icon in FIG. 5AF) in association with the representation 505A of the game application indicating that the game application has been deleted from the device, but the associated data for the game application remains stored on the device.

In some embodiments, after deleting the application from the device, the device detects (720), via the one or more input devices, a user input at the designated location. For example, in FIG. 5AG, the device detects a contact 550X at the designated location of the representation 505B of the game application.

In some embodiments, in response to detecting the user input at the designated location, the device downloads (722) the application and associates, with the application, the associated data for the application. For example, in FIG. 5AH and FIG. 5AI, the representation 505B of the game application is changed (e.g., dimmed) to indicate that the application is being downloaded.

In some embodiments, in response to detecting the user input at the designated location, the device launches (724) the application. By redownloading and launching the application with a single user input, user interaction with the device is reduced, conversing power and reducing wear-and-tear on the device. For example, in FIG. 5AJ, the device displays a game user interface 555 of the game application, indicating that the game application has launched.

In some embodiments, the device detects (726), via the one or more input devices, an application-uninstallation request to delete the application from the device and delete the associated data for the application. For example, in FIG. 5AO, the device detects a contact 551C at the location of the delete affordance 545A.

In some embodiments, in response to detecting the application-uninstallation request, the device deletes (728) the associated data for the application. In implementations, if the application is still on the device, the device deletes the application as well. For example, in FIG. 5AP, the representation 505B of the game application is missing, indicating that the game application (and its associated data) has been deleted.

In some embodiments, after deleting the associated data for the application, the device detects (730) a request to display the respective portion of the application launching user interface. For example, in various implementations, the request to display the respective portion of the application launching interface is depression of a physical button, such as "home" or menu button 204 of FIG. 2.

In some embodiments, in response to detecting the request to display the respective portion of the application launching user interface, the device displays (732) the respective portion of the application launching user interface without displaying the representation of the application in the designated location in the respective portion of the application launching user interface. For example, in FIG. 5AP, the device displays the application launching user interface 502 without displaying the representation 505B of the game application.

It should be understood that the particular order in which the operations in FIGS. 7A-7B have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7B. For example, the user interfaces and constituent affordances described above with reference to method 700 optionally have one or more of the characteristics of the user interfaces and constituent affordances described herein with reference to other methods described herein (e.g., method 600). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device with one or more processors, a display, and one or more input devices:
while an application is installed on the device and a representation of the application has a designated location in a respective portion of an application launching user interface, concurrently displaying:
an application-demotion affordance for deleting, the application from the device without deleting associated data for the application, and
an application-deletion affordance for deleting the application from the device and deleting the associated data for the application;
detecting, via the one or more input devices, a user input;
in response to detecting the user input:
in accordance with a determination that the user input includes selection of the application-deletion affordance, deleting the application and deleting the associated data for the application; and
in accordance with a determination that the user input includes selection of the application-demotion affordance, deleting the application from the device without deleting the associated data for the application; and
while the application is deleted from the device without deleting the associated data for the application:
detecting a request to display the respective portion of the application launching user interface; and
in response to detecting the request to display the respective portion of the application launching user interface, displaying, on the display, the respective portion of the application launching user interface, including displaying the representation of the application in the designated location in the respective portion of the application launching user interface.

2. The method of claim 1, wherein, while the application is deleted from the device without deleting the associated data for the application, displaying the representation of the application includes displaying a demotion indicia in association with the representation of the application.

3. The method of claim 1, further comprising:
while the application is deleted from the device without deleting the associated data for the application, detecting, via the one or more input devices, a user input at the designated location; and
in response to detecting the user input at the designated location, downloading the application and associating, with the application, the associated data for the application.

4. The method of claim 3, further comprising, in response to detecting the user input at the designated location, launching the application.

5. The method of claim 1, further comprising:
while the application is deleted from the device without deleting the associated data for the application, detecting, via the one or more input devices, a user input selecting the application-deletion affordance; and
in response to detecting the user input selecting the application-deletion affordance, deleting the associated data for the application from the device.

6. The method of claim 5, further comprising, while the application is deleted from the device and the associated data for the application is deleted from device:
detecting a request to display the respective portion of the application launching user interface; and
in response to detecting the request to display the respective portion of the application launching user interface, displaying the respective portion of the application launching user interface without displaying the representation of the application in the designated location in the respective portion of the application launching user interface.

7. The method of claim 1, further comprising detecting, via the one or more input devices, selection of an option to enable automatic demotion of applications.

8. The method of claim 7, wherein the automatic demotion of applications is based on one or more of an amount of free storage of the device, a size of an application, and a time of last-use of an application.

9. The method of claim 8, wherein the time of last-use is based on use of an extension of the application.

10. An electronic device comprising:
a display,
one or more input devices; and
one or more processors configured to:
while an application is installed on the device and a representation of the application has a designated location in a respective portion of an application launching user interface, concurrently display:
an application-demotion affordance for deleting, the application from the device without deleting associated data for the application, and
an application-deletion affordance for deleting the application from the device and deleting the associated data for the application;
detect, via the one or more input devices, a user input;
in response to detecting the user input
in accordance with a determination that the user input includes selection of the application-deletion affordance, delete the application and delete the associated data for the application; and
in accordance with a determination that the user input includes selection of the application-demotion affordance, delete the application from the device without deleting the associated data for the application; and
while the application is deleted from the device without deleting the associated data for the application:
detect a request to display the respective portion of the application launching user interface; and
in response to detecting the request to display the respective portion of the application launching user interface, display, on the display, the respective portion of the application launching user interface, including displaying the representation of the application in the designated location in the respective portion of the application launching user interface.

11. The electronic device of claim 10, wherein, while the application is deleted from the device without deleting the associated data for the application, the one or more processors are configured to display the representation of the application by displaying a demotion indicia in association with the representation of the application.

12. The electronic device of claim 10, wherein the one or more processors are further configured to:
while the application is deleted from the device without deleting the associated data for the application, detect, via the one or more input devices, a user input at the designated location; and
in response to detecting the user input at the designated location, download the application and associate, with the application, the associated data for the application.

13. The electronic device of claim 12, wherein the one or more processors are further configured to, in response to detecting the user input at the designated location, launch the application.

14. The electronic device of claim 10, wherein the one or more processors are further configured to:
while the application is deleted from the device without deleting the associated data for the application, detect, via the one or more input devices, a user input selecting the application-deletion affordance; and
in response to detecting the user input selecting the application-deletion affordance, delete the associated data for the application from the device.

15. The electronic device of claim 14, wherein the one or more processors are further configured to, while the application is deleted from the device and the associated data for the application is deleted from the device:
detect a request to display the respective portion of the application launching user interface; and
in response to detecting the request to display the respective portion of the application launching user interface, display the respective portion of the application launching user interface without displaying the representation of the application in the designated location in the respective portion of the application launching user interface.

16. The electronic device of claim 10, wherein the one or more processors are configured to detect, via the one or more input devices, selection of an option to enable automatic demotion of applications.

17. The electronic device of claim 16, wherein the automatic demotion of applications is based on one or more of an amount of free storage of the device, a size of an application, and a time of last-use of an application.

18. The electronic device of claim 17, wherein the time of last-use is based on use of an extension of the application.

19. The method of claim 1, wherein the concurrently displaying further comprises displaying:
an application size value indicating a first amount of storage used by the application; and
an associated data size value indicating a second amount of storage used by the associated data.

20. A non-transitory computer readable storage medium storing one or more programs, the one or more programs comprising instructions, which, when executed by an electronic device with a display, and one or more input devices, cause the electronic device to:
while an application is installed on the device and a representation of the application has a designated location in a respective portion of an application launching user interface, concurrently display:

an application-demotion affordance for deleting, the application from the device without deleting associated data for the application, and an application-deletion affordance for deleting the application from the device and deleting the associated data for the application;

detect, via the one or more input devices, a user input;

in response to detecting the user input in accordance with a determination that the user input includes selection of the application-deletion affordance, delete the application and delete the associated data for the application; and in accordance with a determination that the user input includes selection of the application-demotion affordance, delete the application from the device without deleting the associated data for the application; and while the application is deleted from the device without deleting the associated data for the application:

detect a request to display the respective portion of the application launching user interface; and in response to detecting the request to display the respective portion of the application launching user interface, display, on the display, the respective portion of the application launching user interface, including displaying the representation of the application in the designated location in the respective portion of the application launching user interface.

21. The non-transitory computer readable storage medium of claim 20, wherein, while the application is deleted from the device without deleting the associated data for the application, the one or more programs further cause the electronic device to display the representation of the application by displaying a demotion indicia in association with the representation of the application.

22. The non-transitory computer readable storage medium of claim 20, wherein the one or more programs further cause the electronic device to:

while the application is deleted from the device without deleting the associated data for the application, detect, via the one or more input devices, a user input at the designated location; and in response to detecting the user input at the designated location, download the application and associate, with the application, the associated data for the application.

* * * * *